(12) United States Patent
Hartman et al.

(10) Patent No.: US 10,843,180 B2
(45) Date of Patent: Nov. 24, 2020

(54) DELAYED CURE MICRO-ENCAPSULATED CATALYSTS

(71) Applicant: PRC-DeSoto International, Inc., Sylmar, CA (US)

(72) Inventors: Madeline Hartman, Boston, MA (US); Lawrence G. Anderson, Allison Park, PA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 74 days.

(21) Appl. No.: 16/149,564

(22) Filed: Oct. 2, 2018

(65) Prior Publication Data

US 2020/0101451 A1     Apr. 2, 2020

(51) Int. Cl.

| | | |
|---|---|---|
| *B01J 33/00* | (2006.01) | |
| *B01J 31/06* | (2006.01) | |
| *B01J 31/02* | (2006.01) | |
| *B01J 20/10* | (2006.01) | |
| *B01J 35/00* | (2006.01) | |
| *B01J 37/00* | (2006.01) | |
| *C08G 75/02* | (2016.01) | |
| *C09D 5/00* | (2006.01) | |
| *C09D 181/02* | (2006.01) | |
| *C09K 3/10* | (2006.01) | |
| *B01J 37/04* | (2006.01) | |

(52) U.S. Cl.
CPC ............ *B01J 33/00* (2013.01); *B01J 20/103* (2013.01); *B01J 31/0237* (2013.01); *B01J 31/06* (2013.01); *B01J 35/0013* (2013.01); *B01J 37/0072* (2013.01); *B01J 37/04* (2013.01); *C08G 75/02* (2013.01); *C09D 5/00* (2013.01); *C09D 181/02* (2013.01); *C09K 3/1012* (2013.01); *B01J 2231/005* (2013.01); *B01J 2531/002* (2013.01); *C08G 2150/00* (2013.01)

(58) Field of Classification Search
None
See application file for complete search history.

(56) References Cited

U.S. PATENT DOCUMENTS

| | | |
|---|---|---|
| 3,517,082 A | 6/1970 | Cockerham |
| 4,366,307 A | 12/1982 | Singh et al. |
| 4,609,762 A | 9/1986 | Morris et al. |
| 4,623,711 A | 11/1986 | Morris et al. |
| 4,738,898 A | 4/1988 | Vivant |
| 5,225,472 A | 7/1993 | Cameron et al. |
| 6,172,179 B1 | 1/2001 | Zook et al. |
| 6,509,418 B1 | 1/2003 | Zook et al. |
| 6,525,168 B2 | 2/2003 | Zook et al. |
| 6,586,107 B2 | 7/2003 | Klug et al. |
| 7,009,032 B2 | 3/2006 | Bojkova et al. |
| 7,671,145 B2 | 3/2010 | Sawant et al. |

(Continued)

FOREIGN PATENT DOCUMENTS

| | | |
|---|---|---|
| JP | 11240932 | 9/1999 |
| JP | 62-53354 A | 5/2015 |

(Continued)

*Primary Examiner* — Jeffrey D Washville
(74) *Attorney, Agent, or Firm* — William R. Lambert

(57) ABSTRACT

Controlled release polyurea microcapsules can be prepared from a combination of polyisocyanates using emulsion polymerization. Encapsulated catalysts prepared using the polyurea microcapsules can be used to control the cure rate of coatings and sealants.

17 Claims, 9 Drawing Sheets

(56) References Cited

U.S. PATENT DOCUMENTS

| | | |
|---|---|---|
| 7,875,666 B2 | 1/2011 | Gilmore et al. |
| 7,879,955 B2 | 2/2011 | Rao et al. |
| 8,138,273 B2 | 3/2012 | Rao et al. |
| 8,466,220 B2 | 6/2013 | Rao et al. |
| 8,513,339 B1 | 8/2013 | Keledjian et al. |
| 8,541,513 B2 | 9/2013 | Hobbs et al. |
| 8,729,216 B2 | 5/2014 | Hobbs et al. |
| 8,952,124 B2 | 2/2015 | Rao et al. |
| 8,993,691 B2 | 3/2015 | Anderson et al. |
| 9,056,949 B2 | 6/2015 | Cai et al. |
| 9,079,833 B2 | 7/2015 | Klobes et al. |
| 9,382,642 B2 | 7/2016 | Yarlagadda et al. |
| 9,422,451 B2 | 8/2016 | Rao et al. |
| 9,540,540 B2 | 1/2017 | Rao et al. |
| 9,663,619 B2 | 5/2017 | Echigoya et al. |
| 2005/0010003 A1 | 1/2005 | Sawant et al. |
| 2006/0270796 A1 | 11/2006 | Sawant et al. |
| 2007/0173602 A1* | 7/2007 | Brinkman ......... C08F 222/1006 524/592 |
| 2010/0010133 A1 | 1/2010 | Zook et al. |
| 2011/0319559 A1 | 12/2011 | Kania et al. |
| 2012/0040104 A1 | 2/2012 | Keledjian et al. |
| 2012/0234255 A1 | 9/2012 | Bernardini et al. |
| 2012/0238707 A1 | 9/2012 | Hobbs et al. |
| 2013/0270726 A1 | 10/2013 | Oxley |
| 2013/0313734 A1* | 11/2013 | Yao ........................... B01J 13/14 264/4.7 |
| 2013/0330292 A1 | 12/2013 | Lei et al. |
| 2013/0345389 A1* | 12/2013 | Cai ........................ C08G 75/02 528/376 |
| 2014/0051789 A1 | 2/2014 | Rao et al. |
| 2014/0135253 A1 | 5/2014 | Bellouard-Drevet et al. |
| 2015/0252230 A1 | 9/2015 | Keledjian et al. |
| 2016/0152775 A1 | 6/2016 | Tobis et al. |
| 2016/0158121 A1 | 6/2016 | Lei et al. |
| 2016/0192645 A1 | 7/2016 | Zhang et al. |
| 2017/0014259 A1 | 1/2017 | Quigley et al. |
| 2017/0114208 A1 | 4/2017 | Rao et al. |
| 2017/0281985 A1 | 10/2017 | Feng et al. |
| 2017/0325448 A1 | 11/2017 | Shukla et al. |
| 2017/0326522 A1 | 11/2017 | Burakowska-Meise et al. |
| 2018/0042825 A1 | 2/2018 | Lei et al. |
| 2018/0215974 A1 | 8/2018 | Virnelson |

FOREIGN PATENT DOCUMENTS

| | | |
|---|---|---|
| WO | 2005016510 | 2/2005 |
| WO | 2018/031532 A1 | 2/2018 |
| WO | 2018/085650 A1 | 5/2018 |

* cited by examiner

15-MAH-152-1

15-MAH-152-2

Table 5: Weight (gm) of constituents for various polyurea encapsulated amine catalysts

| | A | B | C | D | E | F | G | H | I | J | K | L | M | N |
|---|---|---|---|---|---|---|---|---|---|---|---|---|---|---|
| Silicon dioxide nanopowder | 4.5 | 4.5 | 4.5 | 30.0 | 30.0 | 30.0 | 30.0 | 4.5 | 4.5 | 4.5 | 4.5 | 4.5 | 0 | 0 |
| Calcium carbonate | 0 | 0 | 0 | 0 | 0 | 0 | 0 | 0 | 0 | 0 | 0 | 0 | 5.3 | 2.6 |
| Diethylene triamine | 1.5 | 1.5 | 1.5 | 10.0 | 10.0 | 7.5 | 0 | 1.5 | 1.5 | 1.5 | 1.5 | 1.5 | 1.5 | 1.5 |
| Polyethyleneimine | 1.5 | 1.5 | 1.5 | 10.0 | 10.0 | 7.5 | 10.0 | 1.5 | 1.5 | 1.5 | 1.5 | 1.5 | 1.5 | 1.5 |
| Isophorone diisocyanate | 4.0 | 2.7 | 1.3 | 26.3 | 26.3 | 26.3 | 8.7 | 3.9 | 0 | 0 | 0 | 5.3 | 3.9 | 3.9 |
| Hexamethylene diisocyanate | 0 | 0 | 0 | 6.6 | 6.6 | 6.6 | 19.8 | 1.0 | 3.3 | 2.0 | 1.0 | 0 | 1.0 | 1.0 |
| IPDI Trimer | 4.2 | 8.3 | 12.5 | 16.3 | 16.3 | 0 | 0 | 0 | 4.2 | 8.3 | 12.5 | 0 | 0 | 0 |
| HB-40 | 2.4 | 2.4 | 2.4 | 16.3 | 16.3 | 16.3 | 16.3 | 2.4 | 2.4 | 2.4 | 2.4 | 2.4 | 2.4 | 2.4 |
| Polycat® 8 | 7.3 | 7.3 | 7.3 | 32.5 | 0 | 48.8 | 48.8 | 7.3 | 7.3 | 7.3 | 7.3 | 7.3 | 7.3 | 7.3 |
| N,N-dimethylbenzylamine | 0 | 0 | 0 | 0 | 48.8 | 0 | 0 | 0 | 0 | 0 | 0 | 0 | 0 | 0 |
| Tris(dimethylaminomethyl)phenol | 0 | 0 | 0 | 16.3 | 0 | 0 | 0 | 0 | 0 | 0 | 0 | 0 | 0 | 0 |
| Total | 25.4 | 28.2 | 31.1 | 147.9 | 147.9 | 142.9 | 143.6 | 22.2 | 24.8 | 27.6 | 30.8 | 22.5 | 23.0 | 20.3 |

FIG. 10

Table 6: Weight percent of constituents for various polyurea encapsulated amine catalysts

| | A | B | C | D | E | F | G | H | I | J | K | L | M | N |
|---|---|---|---|---|---|---|---|---|---|---|---|---|---|---|
| Silicon dioxide nanopowder | 17.8 | 16.0 | 14.5 | 20.3 | 20.3 | 21.0 | 20.9 | 20.3 | 18.2 | 16.3 | 14.6 | 20.0 | 0 | 0 |
| Calcium carbonate | 0 | 0 | 0 | 0 | 0 | 0 | 0 | 0 | 0 | 0 | 0 | 0 | 23.0 | 13.0 |
| Diethylene triamine | 5.9 | 5.3 | 4.8 | 6.8 | 6.8 | 5.2 | 7.0 | 6.8 | 6.1 | 5.4 | 4.9 | 6.7 | 6.5 | 7.4 |
| Polyethyleneimine | 5.9 | 5.3 | 4.8 | 6.8 | 6.8 | 5.2 | 7.0 | 6.8 | 6.1 | 5.4 | 4.9 | 6.7 | 6.5 | 7.4 |
| Isophorone diisocyanate | 15.6 | 9.4 | 4.3 | 17.7 | 17.7 | 18.4 | 6.1 | 17.8 | 0 | 0 | 0 | 23.3 | 17.1 | 19.4 |
| Hexamethylene diisocyanate | 0 | 0 | 0 | 4.5 | 4.5 | 4.6 | 13.8 | 4.5 | 13.3 | 7.3 | 3.3 | 0 | 4.4 | 4.9 |
| IPDI Trimer | 16.4 | 29.4 | 40.2 | 0 | 0 | 0 | 0 | 0 | 17.0 | 30.1 | 40.7 | 0 | 0 | 0 |
| HB-40 | 9.6 | 8.7 | 7.8 | 11.0 | 11.0 | 11.4 | 11.3 | 11.0 | 9.9 | 8.9 | 7.9 | 10.8 | 10.6 | 12.0 |
| Polycat® 8 | 28.8 | 25.9 | 23.5 | 22.0 | 0 | 34.1 | 34.0 | 32.9 | 29.5 | 26.5 | 23.8 | 32.5 | 31.8 | 36.0 |
| N,N-dimethylbenzylamine | 0 | 0 | 0 | 0 | 33.0 | 0 | 0 | 0 | 0 | 0 | 0 | 0 | 0 | 0 |
| Tris(dimethylaminomethyl) phenol | 0 | 0 | 0 | 11.0 | 0 | 0 | 0 | 0 | 0 | 0 | 0 | 0 | 0 | 0 |
| Total | 100 | 100 | 100 | 100 | 100 | 100 | 100 | 100 | 100 | 100 | 100 | 100 | 100 | 100 |

DELAYED CURE MICRO-ENCAPSULATED CATALYSTS

FIELD

The present disclosure relates to polyurea microcapsules and encapsulated catalysts. Polyurea microcapsules containing an encapsulated catalyst can be used to control the cure rate of coatings and sealants.

BACKGROUND

For certain applications it is desirable that a coating or sealant composition has a long working time and at the end of the working time, cures rapidly. A long working time facilitates the ability of the coating or sealant to be mixed in large quantities and to be applied to large surface areas.

Microcapsules having a polyurea shell have been described and it is known that the composition of a polyurea shell can be tailored to control the release rate of an encapsulated material.

Certain coatings and sealants, such as those used in the aerospace industry, must meet a number of demanding performance requirements and must maintain the properties following exposure to stress conditions. It is desirable to control the curing rate of such sealants without compromising or degrading the performance of the cured coating or sealant.

SUMMARY

According to the present invention, microcapsules comprise a polyurea shell at least partially encapsulating a core, wherein the polyurea shell comprises a reaction product of reactants comprising: a combination of polyisocyanates, wherein the combination of polyisocyanates comprises an alicyclic diisocyanate and an acyclic diisocyanate; and a crosslinker, wherein the crosslinker comprises a polyamine.

According to the present invention, methods of making an encapsulated catalyst comprise: mixing a solution comprising water and an emulsion stabilizer at high shear to provide a first mixture; adding a composition to the first mixture to provide a second mixture, wherein the composition comprises: a combination of polyisocyanates, wherein the combination of polyisocyanates comprises an alicyclic diisocyanate and an acyclic diisocyanate; a catalyst; and a plasticizer; mixing the second mixture at high shear; adding a crosslinker and a weight stabilizer to the mixed second mixture to provide a third mixture; mixing the third mixture at high shear to provide microcapsules comprising the catalyst encapsulated within a polyurea shell; and making the third mixture at an elevated temperature or mixing the third mixture with a tin catalyst to cure the polyurea shell.

BRIEF DESCRIPTION OF THE DRAWINGS

Those skilled in the art will understand that the drawings described herein are for illustration purposes only. The drawings are not intended to limit the scope of the present disclosure.

FIG. 10 is a table (Table 5) showing the weight of constituents for various polyurea encapsulated amine catalysts.

FIG. 11 is a table (Table 6) showing the weight percent of constituents for various polyurea encapsulated amine catalysts.

DETAILED DESCRIPTION

Figure 1A:
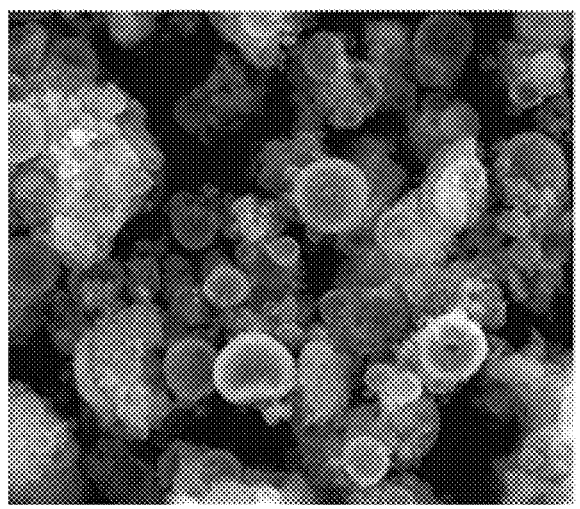
FIGS. 1A and 1B show scanning electronic microscope (SEM) images of examples of 25HDI/75IPDI and 75HDI/25IPDI microcapsules provided by the present disclosure, respectively.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is attached to another chemical moiety through the carbon atom.

A hydrocarbon group includes saturated and unsaturated groups. For example, a hydrocarbyl group includes hydrocarbyl groups having any degree of level of saturation such as having exclusively carbon-carbon single bonds, groups having one or more carbon-carbon double bonds, groups having one or more carbon-carbon triple bonds, and groups having combinations of carbon-carbon single, double, and triple bonds. Where a specific level of saturation is intended, the terms alkane, alkene, alkynyl are specifically used.

"Alkanediyl" refers to a diradical of a saturated or unsaturated branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of two carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methanediyl (—CH$_2$—), ethane-1,2-diyl (—CH$_2$CH$_2$), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$), hexane-1,6-diyl (—CH$_2$CH$_2$CH$_2$CH$_2$CH$_2$CH$_2$), heptane-1,7-diyl, octane-1,8-diyl, nonane-1,9-diyl, decane-1,10-diyl, and dodecane-1,12-diyl.

"Alkanecycloalkane" refers to a saturated or unsaturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$ arenediyl, $C_{6-10}$ arenediyl, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{7-18}$ alkanearene, $C_{7-16}$ alkanearene, $C_{7-13}$ alkanearene, $C_{7-8}$ alkanearene, $C_{7-13}$ alkanearene, $C_{7-10}$ alkanearene, or $C_{7-9}$ alkanearene. Examples of alkanearene groups include diphenyl methane.

"Alkanearenediyl" refers to a diradical of an alkanearene group. An alkanearenediyl group is $C_{7-18}$ alkanearenediyl, $C_{7-16}$ alkanearenediyl, $C_{7-13}$ alkanearenediyl, $C_{7-8}$ alkanearenediyl, $C_{7-13}$ alkanearenediyl, $C_{7-10}$ alkanearenediyl, or $C_{7-9}$ alkanearenediyl. Examples of alkanearenediyl groups include diphenyl methane-4,4'-diyl.

"Alkenyl" group refers to the structure —CR=C(R)$_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure CH=CH$_2$.

"Alkoxy" refers to a OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_6$ arenediyl, or benzenediyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heteroalkyl" refers to $C_{2-20}$ alkyl group in which one or more of the carbon atoms and associated hydrogen atoms are replaced with a heteroatom, such as N, O, S, or P, or an heteroatom and associated hydrogen atom such as —NH—. In a heteroalkyl, the one or more heteroatoms can comprise N or O. Heteroalkyl includes alkoxy. A $C_{2-4}$ heteroalkyl can have one to three carbon atoms and from one to three heteroatoms such as, for example, —CH$_2$—SH, —S—SH, —CH$_2$—O—CH$_3$, —S—CH$_2$—CH$_2$—OH and others. A $C_2$ heteroalkyl can be, for example, —CH$_2$—OH and —S—CH$_3$. A heteroalkyl group can be, for example, $C_{2-20}$ heteroalkyl, $C_{2-16}$, $C_{2-12}$, $C_{2-10}$, $C_{2-8}$, $C_{2-6}$, or $C_{2-4}$ heteroalkyl. Chain lengths are counted based on the theoretical number of carbon atoms without replacement of heteroatoms, "Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

"Substituted" refers to a group in which one or more hydrogen atoms are each independently replaced with the same or different substituent(s). A substituent can comprise halogen, —S(O)$_2$OH, —SH, —SR where R is $C_{1-6}$ alkyl, —COOH, —NO$_2$, —NR$_2$ where each R independently comprises hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, or —C(O)R where R is $C_{1-6}$ alkyl. A substituent can be —OH, —NH$_2$, or $C_{1-3}$ alkyl.

"Formed from" or "prepared from" denotes open, e.g., comprising, claim language. As such, it is intended that a composition "formed from" or "prepared from" a list of recited components include a composition comprising at least the recited components or the reaction product of at least the recited components, and can further comprise other, non-recited components used to form or prepare the composition.

"Reaction product of" means a chemical reaction product(s) of at least the recited reactants and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a dithiol HS—[R]$_n$—SH is —[R]$_n$—.

A "core" of a compound or a prepolymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

A "core" of a polyfunctionalizing agent B(—V)$_z$ refers to the moiety B. B can include the polyfunctionalizing agent with the terminal functional group V.

"Michael acceptor" refers to an alkene activated by the presence of an EWG group α to a double bond or an α,β-unsaturated carbonyl compound.

"Prepolymer" refers to oligomers, homopolymers, and copolymers. For thiol-terminated prepolymers, molecular weights are number average molecular weights "Mn" as determined by end group analysis using iodine titration, unless indicated otherwise. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer can be combined with a curing agent to provide a curable composition, which can cure to provide a cured polymer network. Prepolymers are liquid at room temperature (25° C.) and pressure (760 torr; 101 kPa).

A prepolymer includes multiple repeating subunits bonded to each other that can be the same or different. The multiple repeating subunits make up the backbone of the prepolymer.

A "curable composition" refers to a composition that comprises at least two reactants capable of reacting to form a cured composition. For example, a curable composition can comprise thiol-terminated sulfur-containing prepolymer and a polyepoxide capable of reacting to form a cured polymer. A curable composition may include a catalyst for the curing reaction and other components such as, for example, fillers, pigments, and adhesion promoters. A curable composition may be curable at room temperature (25° C.) or may require exposure to elevated temperature such as a temperature above room temperature (25° C.) or other condition(s) to initiate and/or to accelerate the curing reaction. A curable composition may initially be provided as a two-part composition including, for example, a separate base component and an accelerator component. The base component can contain one of the reactants participating in the curing reaction such as a thiol-terminated sulfur-containing prepolymer and the accelerator component can contain a curing agent such as a polyepoxide. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec) at 25° C. A Class B sealant composition, which is suitable for fillet seal applications, can be characterized by a viscosity from 4,500 poise to 20,000 poise (450 Pa-sec to 2,000 Pa-sec) at 25° C. A Class C sealant composition, which is suitable for fay seal applications, can be characterized by a viscosity from 500 poise to 4,500 poise (50 Pa-sec to 450 Pa-sec) at 25° C. The viscosity of the compositions is measured as described herein. After the two components of a sealant system are combined and mixed, the curing reaction can proceed and the viscosity of the curable composition can increase and at some point, will no longer be workable, as described herein. The duration between when the two components are mixed to form the curable composition to the time when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, partially cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A, determined according to ASTM D2240. For coating applications, a curable composition can have a viscosity, for example, from 200 cps to 800 cps (0.2 Pa-sec to 0.8 Pa-sec) at 25° C. For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.08 Pa-sec) at 25° C.

"Derived from" as in "a moiety derived from a compound" refers to a moiety that is generated upon reaction of a parent compound with a reactant. For example, a bis (alkenyl) compound $CH_2=CH-R-CH=CH_2$ can react with another compound such as two compounds having thiol groups to produce the moiety $-(CH_2)_2-R-(CH_2)_2-$ derived from the reaction of the alkenyl groups with the thiol groups. For example, for a parent diisocyanate having the structure $O=C=N-R-N=C=O$, a moiety derived from the diisocyanate has the structure $-C(O)-NH-R-NH-C(O)-$.

"Derived from the reaction of —V with a thiol" refers to a moiety $-V'-$ that results from the reaction of a thiol group with a moiety comprising a terminal group reactive with a thiol group. For example, a group V— can comprise $CH_2=CH-CH_2-O-$, where the terminal alkenyl group $CH_2=CH-$ is reactive with a thiol group —SH. Upon reaction with a thiol group, the moiety $-V'-$ is $-CH_2-CH_2-CH_2-O-$.

Specific gravity and density of compositions and sealants is determined according to ISO 2781.

Specific gravity and density of fillers is determined according to ISO 787 (Part 10).

Shore A hardness is measured using a Type A durometer in accordance with ASTM D2240.

Tensile strength and elongation are measured according to ISO 37.

Viscosity is measured using a Brookfield CAP 2000 viscometer, with a No. 6 spindle, at speed of 300 rpm, and a temperature of 25° C.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

BET is be determined using the method described in ASTM D1993-18.

Particle diameter is determined according to ASTM D1921.

"Diisocyanate" refers to an organic component having two isocyanate groups $-N=C=O$. A diisocyanate can include aliphatic diisocyanates, alicyclic diisocyanates, and/or aromatic diisocyanates. A diisocyanate can have a molecular weight of, for example, less than 1,500 Daltons, less than 1,250 Daltons, less than 1,000 Daltons, less than 750 Daltons, or less than 500 Daltons. Diisocyanates are capable of forming a covalent bond with a reactive group such as hydroxyl, thiol, or amine functional group.

"Polyfunctionalizing agent" refers to a compound having reactive functionality of three or more, such as from 3 to 6. A polyfunctionalizing agent can have three reactive functional groups and can be referred to as a trifunctionalizing agent. Polyfunctionalizing agents can be used as precursors for synthesizing the sulfur-containing prepolymers and/or can be used as a reactant in the polymer curing composition to increase the crosslinking density of the cured polymer network. A polyfunctionalizing agent can have reactive terminal thiol groups, reactive terminal alkenyl groups, or a combination thereof. A polyfunctionalizing agent can have a calculated molecular weight, for example, less than 2,000 Daltons, less than 1,800 Daltons, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, or less than 200 Daltons. For example, a polyfunctionalizing agent can have a calculated molecular weight from 100 Daltons to 2,000 Daltons, from 200 Daltons to 2,000 Daltons, from 200 Daltons to 1,800 Daltons, from 300 Daltons to 1,500 Daltons, or from 300 Daltons to 1,000 Daltons.

A polyfunctionalizing agent can have the structure of Formula (1):

$$B(-V)_z \qquad (1)$$

where B is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, $-R-SH$ or $-R-CH=CH_2$, where R can be, for example, $C_{2-10}$ alkanediyl, $C_{2-10}$ heteroalkanediyl, substituted $C_{2-10}$ alkanediyl, or substituted $C_{2-10}$ heteroalkanediyl.

When the moiety V is reacted with another compound the moiety $-V^1-$ results and is said to be derived from the reaction with the other compound. For example, when V is $-R-CH=CH_2$ and is reacted, for example, with a thiol group, the moiety $V^1$ is $-R-CH_2-CH_2-$ is derived from the reaction.

In polyfunctionalizing agents of Formula (1), B can be, for example $C_{2-8}$ alkane-triyl, $C_{2-8}$ heteroalkane-triyl, $C_{5-8}$ cycloalkane-triyl, $C_{5-8}$ heterocycloalkane-triyl, substituted $C_{5-8}$ cycloalkene-triyl, $C_{5-8}$ heterocycloalkane-triyl, $C_6$ arene-triyl, $C_{4-5}$ heteroarene-triyl, substituted $C_6$ arene-triyl, or substituted $C_{4-5}$ heteroarene-triyl.

In polyfunctionalizing agents of Formula (1), B can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris (prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable mercapto-acrylate polythiol polyfunctionalizing agents include pentaerythritol tetra-acrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy)diethanethiol, 1,8-dimercapto-3,6-dioxaoctane, and combinations of any of the foregoing.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate:

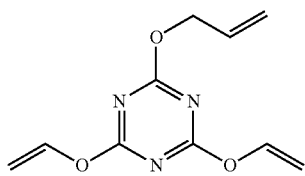 [SMILES: C=CCOc1nc(OC=C)nc(OC=C)n1]

results in a moiety having the structure:

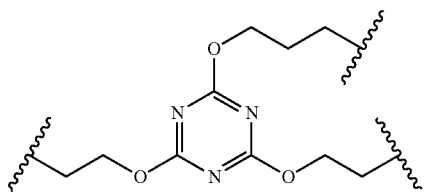

where the segments are bonded to the other reactants.

"Polythiol polyfunctionalizing agent" refers to a polythiol having, for example, from 3 to 6 terminal thiol groups. A polythiol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polythiol polyfunctionalizing agents can be represented by the formula $B(-V)_z$, where B represents a core of a z-valent polyfunctionalizing agent $B(-V)_z$, z is an integer from 3 to 6; and each —V is a moiety comprising a terminal thiol (—SH) group.

"Composition" is intended to encompass a combination or mixture comprising the specified components in the specified amounts, as well as any product which results, directly or indirectly, from the combination of the specified ingredients in the specified amounts.

As used herein, the term "cure" or "cured" as used in connection with a composition, e.g., "composition when cured" or a "cured composition", means that any curable or crosslinkable components of the composition are at least partially reacted or crosslinked.

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards, unless indicated otherwise.

"Microcapsule" refers to a substantially spherical core-shell structure. The diameter of a microcapsule can be within a range, for example, from 1 μm to 50 μm, from 2 μm to 40 μm, from 4 μm to 30 μm, or from 5 μm to 25 μm.

Reference is now made to certain compounds, compositions, and methods of the present invention. The disclosed microcapsules, compounds, compositions, and methods are not intended to be limiting of the claims. To the contrary, the claims are intended to cover all alternatives, modifications, and equivalents.

For certain applications it can be desirable that coatings and sealants have a long working time and a short additional cure time. After combining the reactive components to form a curable composition such as a thiol-terminated sulfur-containing prepolymer, a polyepoxide, and a catalyst, the curable composition will begin to cure and the viscosity of the curing composition will increase over time.

The various times and durations associated with a curing sealant are reflected in the curing profile. After the reactive sealant components are mixed, the viscosity of the curing sealant composition increases and the composition begins to gel. At some point, the curing sealant can no longer be applied to a surface using an intended method. This is referred to as the end of the working time. The "working time" is defined as the duration from when the sealant composition is first mixed to the time when the sealant can no longer be practically applied to a surface and is no longer workable. By no longer workable is meant that the composition can no longer be practically applied to a surface using the intended application method. For example, a Class C sealant is designed for application by a roller or combed tooth spreader, and at the end of the working time the sealant cannot be practically applied to a surface using a roller or combed tooth spreader. For example, a Class C sealant that exhibits an initial viscosity from 500 poise to 4,500 poise (50 Pa-sec to 450 Pa-sec) may not be workable when the viscosity is greater than 5,000 poise (500 Pa-sec), 6,000 poise (600 Pa-sec), 7,000 poise (700 Pa-sec), or 8,000 poise (800 Pa-sec).

After the curable composition is applied to a surface, adhesion to the surface develops and the exposed surface of the curing composition becomes tack free. Tack free time can be determined according to AS5127/1 (5.8) (Aerospace Standard Test Methods for Aerospace Sealants) and reflects the duration until a cotton swab does not adhere to the curing surface. Over time, the composition partially cures to a hardness of Shore 10A, and then with additional time fully cures to a hardness, for example, of at least Shore 30A. Hardness can be determined according to AS5127/1 (5.9).

The duration from when the curable composition is first mixed to the time the curing composition exhibits a hardness of at least Shore 30A is referred to as the "cure time". The duration from the end of the working time until the composition is partially cured, i.e., exhibits a hardness of Shore 30A, is referred to as the "additional cure time." At this point the partially cured sealant will resist modest abrasion and impact. The duration from the when the curable composition is first mixed until the composition is fully cured is referred to as the "time to full cure." A sealant is fully cured when the hardness reaches a maximum and does not continue to increase. After the "cure time" it can take several weeks for a sealant to fully cure. A fully cured sealant can exhibit a hardness, for example, of at least Shore 40A, a hardness greater than Shore 45A, or greater than Shore 50A.

The "cure time" is the sum of the "working time" and the "additional time to cure." Then, over time the hardness of the sealant continues to increase to a maximum value. The sealant is considered to be fully cured when the hardness of the sealant reaches a maximum value and does not continue to appreciably increase. The duration between when the sealant is first mixed to when the sealant is fully cured is referred to as the "time to full cure."

As provided by the present disclosure, the diffusion or release of an encapsulated material from a polyurea microcapsule can be controlled, in part, by selecting the composition of the polyurea shell. Encapsulated materials such as amine catalysts can be released from the polyurea microcapsule at temperatures from 20° C. to 25° C. When added to curable coating and sealant compositions the encapsulated catalyst releases at a rate that provides an extended working time and a short time to cure after the end of the working time. The composition of the polyurea shell as well as other factors can be selected and combined with a suitable curable composition to provide a desired curing profile.

Polyepoxide-cured, thiol-terminated sulfur-containing prepolymer-based sealants cured in the presence of encapsulated amine catalysts provided by the present disclosure exhibit extended working time and, when fully cured, meet the demanding performance requirements of aerospace sealant applications such as AMS 3281 (Aerospace Material Specification). Examples of other relevant aerospace sealant specifications include Mil-S-22473E, AMS 3265B, AMS 3269, AMS 3279, and AMS 3277.

Microcapsules provided by the present disclosure comprise a polyurea shell surrounding a core. Encapsulants such as catalysts can be incorporated into the core of the polyurea microcapsules. Release of an encapsulated material from the core can depend on the composition of the polyurea shell. The rate of release can be determined, for example, by the type of polyisocyanate used to form the shell, the type of polyamine used to form the shell, the crosslinking density, the encapsulated material within the core, and other materials within the core such as plasticizers. The polyurea microcapsules provided by the present disclosure can release the encapsulant at temperatures from 20° C. to 25° C. and therefore release of the catalyst within the core does not require an external source of energy to release the encapsulant. When used in a coating or sealant composition the encapsulated catalysts can be slowly released from the polyurea microcapsules, delay the curing reaction, and extend the working time of the coating or sealant. After the end of the working time the coating or sealant can cure rapidly to provide a cured composition that meets desired performance criteria.

A polyurea microcapsule can have a diameter within a range, for example, from 1 µm to 50 µm, from 2 µm to 40 µm, from 4 µm to 30 µm, or from 5 µm to 25 µA polyurea microcapsule and encapsulated catalyst provided by the present disclosure can be prepared by emulsion polymerization. A polyurea shell can comprise the reaction product of reactants comprising a combination of polyisocyanates, and a polyamine or a combination of polyamines.

A polyisocyanate used to prepare a polyurea microcapsule can comprise a combination of diisocyanates. The combination of diisocyanates can comprise an alicyclic diisocyanate and an acyclic diisocyanate.

In addition to an alicyclic diisocyanate and an acyclic diisocyanate, a polyisocyanate can comprise a polyisocyanate having a polyisocyanate or combination of polyisocyanates having an average isocyanate functionality from 3 to 6, or from 3 to 4. A polyisocyanate can comprise an isocyanate trimer such as an isocyanate trimer derived from an alicyclic diisocyanate and/or an isocyanate trimer derived from an acyclic diisocyanate.

For example, a polyisocyanate can comprise a combination of diisocyanates and a triisocyanate or combination of triisocyanates.

For example, a polyisocyanate can comprise a combination of an alicyclic diisocyanate or combination of alicyclic diisocyanates. An alicyclic diisocyanate can comprise isophorone diisocyanate, and an acyclic diisocyanate can comprise hexamethylene diisocyanate. A polyisocyanate can comprise isophorone diisocyanate trimer, hexamethylene diisocyanate trimer, or a combination thereof.

An alicyclic diisocyanate includes diisocyanates having a carbocyclic ring structure which may be saturated or unsaturated, and which does not include aromatic ring systems.

An acyclic diisocyanate includes acyclic diisocyanates and branched diisocyanate that does not include a carbocyclic ring or an aromatic ring structure.

Examples of suitable alicyclic polyisocyanates include isophorone diisocyanate (IPDI; 3-isocyanato methyl-3,5,5-trimethylcyclohexyl diisocyanate), 1,4-cyclohexyl diisocyanate (CHDI), methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo [2.2.1]-heptane, isophorone diisocyanate (IPDI), trans-1,4-cyclohexylenediisocyanate, 4,4'-methylene dicyclohexyl diisocyanate ($H_{12}$MDI), 1,1'-methylenebis(4-isocyanatocyclohexane), octahydro-4,7-methano-1H-indenedimethyl diisocyanate, bis(isocyanatomethyl)cyclohexane, 1,3-bis(isocyanatomethyl)cyclohexane, 2,5(6)-bis(isocyanatomethyl) cyclo[2.2.1.]heptane, 1,3,3-trimethyl-1-(isocyanatomethyl)-5-isocyanatocyclohexane, bis(4-isocyanatocyclohexyl) methane, 1,6-hexamethylene diisocyanate (HDI), 1,5-diisocyanato-pentane, 2,4-diisocyanato-1-methyl cyclohexane, 1,3-bis(isocyanato methyl)cyclohexane, 1,4-bis(isocyanato methyl)cyclohexane, 1,1'-methylene-bis-(4-isocyanatocyclohexane), 4,4'-methylene-bis-(cyclohexyl diisocyanate)

(4,4-methylene dicyclohexyl diisocyanate ($H_{12}MDI$)), hydrogenated toluene diisocyanate, 4,4'-isopropylidene-bis-(cyclohexyl isocyanate), 1,4-cyclohexyl diisocyanate (CHDI), and 4,4'-dicyclohexylmethane diisocyanate (Desmodur® W).

An alicyclic diisocyanate can comprise isophorone diisocyanate (IPDI).

Examples of suitable acyclic diisocyanates include hexamethylene diisocyanate, 1,4-diisoyanatobutane, 1,8-diisocyanato-2,4-dimethyloctane, 1,5-diisocyanato-2-methylpentane, ethyl-2,6-diisocyanatohexanoate, 2,2,4-trimethylhexane 1,6-diisocyanate, 2,4,4-trimethylhexane 1,6-diisocyanate, trans-1,4-cyclohexylene diisocyanate, 2,2,4-trimethylhexamethylene diisocyanate (TMDI), 1,6-hexamethylene diisocyanate (HDI), 1,6-hexamethylene diisocyanate, 1,5-diisocyanato-2-methylpentane, 1,6-diisocyanato-2,2,4-trimethylhexane, 1,6-diisocyanato-2,4,4-trimethylhexane, 1,4-diisocyanatobutanone, tri-methyl-hexamethylene diisocyanate, 1,8-diisocyanatooctane, 1,12-diisocyanatododecane, and 1,8-diisocyanto-2,4-dimethyloctane.

An acyclic diisocyanate can comprise 1,6-hexamethylene diisocyanate (HDI).

A polyisocyanate used to prepare the shell of a polyurea microcapsule can comprise a diisocyanate trimer. For example, a diisocyanate trimer, can comprise an acyclic diisocyanate trimer, an alicyclic diisocyanate trimer, or a combination thereof. An acyclic diisocyanate trimer can comprise a trimer derived from any of the acyclic diisocyanates disclosed herein. An alicyclic diisocyanate trimer can comprise a trimer derived from any of the alicyclic diisocyanates disclosed herein.

Examples of suitable diisocyanate trimers include isophorone diisocyanate trimer and hexamethylene diisocyanate trimer.

A diisocyanate trimer can comprise a diisocyanate trimer having the structure of Formula (9):

$$B\{-R^4-N=C=O\}_3 \quad (9)$$

where, each $R^4$ can independently be selected from $C_{1-10}$ alkanediyl, $C_{5-8}$ cycloalkanediyl, $C_{6-18}$ alkanecycloalkanediyl, $C_{2-10}$ heteroalkanediyl, $C_{5-8}$ heterocycloalkanediyl, $C_{6-10}$ heteroarenediyl, $C_{6-18}$ heteroalkanecycloalkanediyl, substituted $C_{1-10}$ alkanediyl, substituted $C_{5-8}$ cycloalkanediyl, substituted $C_{6-18}$ alkanecycloalkanediyl, substituted $C_{2-10}$ heteroalkanediyl, and substituted $C_{5-8}$ heterocycloalkanediyl, and $B(-R^4-)_3$ has the structure:

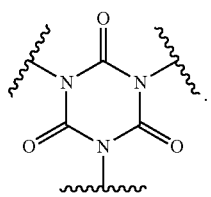 [SMILES: *n1c(=O)n(*)c(=O)n(*)c1=O]

For example, a diisocyanate trimer can have the structure:

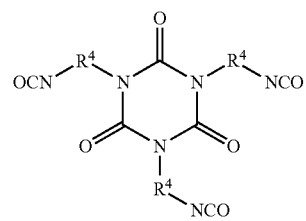

wherein each $R^4$ can independently be selected from $C_{1-10}$ alkane-diyl, $C_{5-8}$ cycloalkanediyl, $C_{6-18}$ alkanecycloalkanediyl, $C_{2-10}$ heteroalkane-diyl, $C_{5-8}$ heterocycloalkanediyl, $C_{6-18}$ heteroalkanecycloalkane-diyl, $C_{7-18}$ heteroalkanearene-diyl, substituted $C_{1-10}$ alkane-diyl, substituted $C_{5-8}$ cycloalkanediyl, substituted $C_{6-18}$ alkanecycloalkane-diyl, substituted $C_{2-10}$ heteroalkane-diyl, and substituted $C_{5-8}$ heterocycloalkanediyl.

A diisocyanate trimer can be prepared by reacting a diisocyanate or combination of diisocyanates in the presence of a trimerization catalyst such as a tertiary amine catalyst, such as N,N'-dimethylcyclohexylamine.

A polyisocyanate can comprise an alicyclic diisocyanate and an acyclic diisocyanate. The ratio of the alicyclic polyisocyanate to acyclic diisocyanate can be selected to control the rate of release of an encapsulated material from the polyurea encapsulant.

For example, the equivalents ratio of alicyclic diisocyanate to acyclic diisocyanate can be from 1:10 to 10:1, from 1:7 to 7:1, 1:4 to 4:1, such as from 1:3 to 3:1, or from 1:2 to 2:1.

For example, the wt % ratio of alicyclic diisocyanate to acyclic diisocyanate can be from 1:10 to 10:1, from 1:7 to 7:1, 1:4 to 4:1, such as from 1:3 to 3:1, or from 1:2 to 2:1.

A polyurea shell can comprise from 1 eq % to 99 eq % of an alicyclic diisocyanate, and from 1 eq % to 99 eq % of an acyclic diisocyanate, where eq % is based on the total isocyanate equivalents. For example, a polyurea shell can comprise from 10 eq % to 90 eq % of an alicyclic diisocyanate, and from 10 eq % to 90 eq % of an acyclic diisocyanate; from 15 eq % to 85 eq % of an alicyclic diisocyanate, and from 15 eq % to 85 eq % of an acyclic diisocyanate; from 20 eq % to 80 eq % of an alicyclic diisocyanate, and from 20 eq % to 80 eq % of an acyclic diisocyanate; or from 25 eq % to 75 eq % of an alicyclic diisocyanate, and from 25 eq % to 75 eq % of an acyclic diisocyanate, where eq % is based on the total isocyanate equivalents.

Polyisocyanates used to prepare polyurea microcapsules can comprise, for example, from 10 eq % to 90 eq % of an alicyclic polyisocyanate, and from 10 eq % to 90 eq % of an acyclic diisocyanate, wherein eq % is based on the total equivalents of the polyisocyanate.

Polyisocyanates used to prepare polyurea microcapsules can comprise, for example, from 10 eq % to 90 eq % alicyclic polyisocyanate, from 20 eq % to 80 eq % of an alicyclic polyisocyanate, from 30 eq % to 70 eq %, or from 40 eq % to 60 eq % of an alicyclic polyisocyanate; and from 10 eq % to 90 eq % of an alicyclic polyisocyanate, from 20 eq % to 80 eq %, from 30 eq % to 70 eq %, or from 40 eq % to 60 eq % of an acyclic diisocyanate, wherein eq % is based on the total equivalents of the isocyanate.

A polyurea shell can comprise from 1 eq % to 99 eq % of IPDI, and from 1 eq % to 99 eq % of HDI, where eq % is based on the total isocyanate equivalents. For example, a polyurea shell can comprise from 10 eq % to 90 eq % of IPDI, and from 10 eq % to 90 eq % of HDI; from 15 eq % to 85 eq % of IPDI, and from 15 eq % to 85 eq % of HDI; from 20 eq % to 80 eq % of a IPDI, and from 20 eq % to 80 eq % of HDI; or from 25 eq % to 75 eq % of IPDI, and from 25 eq % to 75 eq % of HDI, where eq % is based on the total isocyanate equivalents.

The eq %/eq % of an alicyclic diisocyanate and acyclic diisocyanate can be written, for example, as 25HDI/75IPDI, which means that of the 100% isocyanates equivalents, 25% are derived from HDI and 75% are derived from IPDI. Similarly, 75HDI/25IPDI means that of the 100% isocyanate equivalents, 75% are derived from HDI and 25% are derived from IPDI.

Polyisocyanates used to prepare polyurea microcapsules can comprise, for example, from 10 wt % to 90 wt % of an alicyclic polyisocyanate, and from 10 wt % to 90 wt % of an acyclic diisocyanate, wherein wt % is based on the total weight of the polyisocyanate.

Polyisocyanates used to prepare polyurea microcapsules can comprise, for example, from 20 wt % to 80 wt % of an alicyclic polyisocyanate, from 30 wt % to 70 wt %, or from 40 wt % to 60 wt % of an alicyclic polyisocyanate; and from 20 wt % to 80 wt % of an alicyclic polyisocyanate, from 30 wt % to 70 wt %, or from 40 wt % to 60 wt % of an acyclic diisocyanate, wherein wt % is based on the total weight of the polyisocyanate.

Polyisocyanates used to prepare a polyurea microcapsule can comprise, for example, from 10 wt % to 90 wt %, from 20 wt % to 80 wt % of an alicyclic polyisocyanate, and from 30 wt % to 70 wt %, or from 40 wt % to 60 wt % of an acyclic diisocyanate, wherein wt % is based on the total weight of the polyisocyanate.

Polyisocyanates used to prepare a polyurea microcapsule can comprise, for example, from 30 wt % to 70 wt %, or from 40 wt % to 60 wt % of isophorone diisocyanate; and from 10 wt % to 90 wt %, from 20 wt % to 80 wt % of a hexamethylene diisocyanate, wherein wt % is based on the total weight of the polyisocyanate.

A polyurea shell can comprise, for example, from 35 wt % to 60 wt %, from 38 wt % to 57 wt %, from 40 wt % to 55 wt %, from 42 wt % to 53 wt %, from 44 wt % to 51 wt %, or from 46 wt % to 50 wt % of a combination of polyisocyanates, where wt % is based on the total weight of the polyurea shell. The total weight of the polyurea shell includes the weight of the emulsion stabilizer, the weight stabilizer, the polyamine, and the polyisocyanates.

A polyurea shell can comprise, for example, from 65 wt % to 95 wt % of a combination of polyamines, from 67 wt % to 93 wt %, from 70 wt % to 90 wt %, from 72 wt % to 88 wt %, or from 75 wt % to 85 wt %, where wt % is based on the total weight of the polyisocyanates and the polyamines used to form the polyurea shell.

A polyamine used to prepare polyurea microcapsules can comprise a polyamine or a combination of polyamines A polyamine is reacted with the polyisocyanate to provide the polyurea shell.

A polyamine can comprise a diamine, a combination of diamines, a triamine, a combination of triamines, a polymeric polyamine, a combination of polymeric polyamines, or a combination of any of the foregoing.

Examples of suitable polyamines include diamines such as 4,4'-methylenebis(3-chloro-2,6-diethylaniline) (Lonzacure®M-CDEA), 2,4-diamino-3,5-diethyl-toluene, 2,6-diamino-3,5-diethyl-toluene and mixtures thereof (collectively diethyltoluenediamine or DETDA), a sulfur-containing diamine, such as Ethacure®300, 4,4'-methylene-bis-(2-chloroaniline) and mixtures thereof. Other suitable diamines include 4,4'-methylene-bis(dialkylaniline), 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), 4,4'-methylene-bis(2,6-diethyl-3-chloroaniline), and combinations of any of the foregoing.

Examples of suitable polyamines also include ethyleneamines, such as, ethylenediamine (EDA), diethylenetriamine (DETA), triethylenetetramine (TETA), tetraethylenepentamine (TEPA), pentaethylenehexamine (PEHA), piperazine, piperidine, substituted piperidine, diethylenediamine (DEDA), 2-amino-1-ethylpiperazine, and combinations thereof. A polyamine can comprise one or more isomers of $C_{1-3}$ dialkyl toluenediamine, such as, 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and combinations thereof. In certain embodiments, a polyamine may be selected from methylene dianiline, trimethyleneglycol di(para-aminobenzoate), and combinations thereof.

Suitable diamines are available under the tradename Jeffamine® (Huntsman).

Examples of suitable triamines include polyetheramines (Jeffamine® from Huntsman).

Examples of suitable polymeric polyamines include [poly(tetramethylene ether glycol]/(polypropylene glycol) copolymers available from Huntsman.

A combination of polyamines used to synthesize a polyurea shell can be characterized by an average amine functionality from 2 to 6, from 2 to 4, from 2 to 3, or 2.

A polyamine can include a triamine or a combination of triamines and a polymeric polyamine or a combination of polymeric polyamines.

A polyamine can include, for example, diethylene triamine.

A polyurea shell can comprise, for example, from 5 wt % to 40 wt %, from 5 wt % to 30 wt %, from 5 wt % to 15 wt %, from 6 wt % to 14 wt %, from 5 wt % to 13 wt %, from 6 wt % to 12 wt %, from 7 wt % to 11 wt %, or from 8 wt % to 10 wt % of a polyamine or combination of polyamines, where wt % is based on the total weight of the polyurea shell. The total weight of the polyurea shell includes the weight of the emulsion stabilizer, the weight stabilizer, the polyamine, and the polyisocyanates.

A polyurea shell can comprise, for example, from 10 wt % to 30 wt % of a polyamine or combination of polyamines, from 12 wt % to 28 wt %, from 14 wt % to 26 wt %, from 16 wt % to 24 wt %, or from 18 wt % to 22 wt %, where wt % is based on the total weight of the polyisocyanates and the polyamines used to form the polyurea shell.

The core of polyurea encapsulants provided by the present disclosure can comprise a catalyst.

The catalyst can be selected depending on the curing chemistry of the system the polyurea encapsulant is intended to be used with.

For example, for curing compositions employing a thiol-epoxy curing chemistry, a suitable catalyst comprises an amine catalyst or combination of amine catalysts Amine catalysts are also useful in reactions between polythiols and polyfunctional Michael acceptors, polythiols and polyalkenyls, and polythiols and polyisocyanates.

An amine catalyst can be a primary amine catalyst, a combination of primary amine catalysts, a second amine catalyst, a combination of secondary amine catalysts, a tertiary amine catalyst, a combination of tertiary amine catalysts, or a combination of any of the foregoing.

An amine catalyst can comprise a tertiary amine catalyst or combination of tertiary amine catalysts.

An amine catalyst can comprise, for example, tris(dimethylaminomethyl)phenol, N,N-dimethylcyclohexylamine, dimethylbenzylamine, dodecyl-dimethylamine, or a combination of any of the foregoing.

Examples of suitable primary amine catalysts include $C_{3-10}$ aliphatic primary amines such as heptane amine, hexylamine, and octamine.

Examples of suitable secondary amine catalysts include, for example, cycloaliphatic diamines such as Jefflink® 754 and aliphatic diamines such as Clearlink® 1000.

Examples of suitable tertiary amine catalysts include, for example, N,N-dimethylethanolamine (DMEA), diaminobicyclooctane (DABCO), triethylene diamine (TEDA), bis(2-dimethylaminoethyl)ether (BDMAEE), N-ethylmorpholine, N',N'-dimethylpiperazine, N,N,N',N',N"N"-pentamethyl-diethylene-triamine (PMDETA), N,N'-dimethylcyclohexylamine (DMCHA), N,N-dimethylbenzylamine (DMBA), N,N-dimethylethylamine, N,N,N',N",N"'-pentamethyl-dipropylene-triamine (PMDPTA), triethylamine, and 1-(2-hydroxypropyl) imidazole, 2,4,6-tris(dimethylaminomethyl)phenol, bis-(2-dimethylaminoethyl)ether, N,N,N'-trimethyl-N'-hydroxyethyl-bis(aminoethyl)ether, N'-(3-(dimethylamino)propyl)-N,N-dimethyl-1,3-propanediamine, and combinations of any of the foregoing.

Other suitable amine catalysts include amidine catalysts such as tetramethylguanidine (TMG), dizabicyclononene (DBN), 1,8-diazabicyclo[5.4.0]undecene-7 (DBU) and imidazoles; and bicyclic guanidines such as 1,5,7-triazabicyclo[4.4.0]dec-5-ene (TBD), and 7-methyl-1,5,7-triazabicyclo[4.4.0]dec-5-ene (MTBD).

In general, it is desirable that highly effective amine catalysts be selected. Because the polyurea encapsulant can potentially degrade the physical properties of a cured coating or sealant, it is desirable that a minimal effective amount of an encapsulated amine catalyst provided by the present disclosure be incorporated into a curable composition. The amount of encapsulated amine catalyst required can be reduced by using highly effective amine catalysts for a particular curing chemistry and/or using the encapsulated amine catalyst in conjunction with a non-encapsulated amine catalyst.

Compositions and sealants provided by the present disclosure can comprise, for example, from 0.1 wt % to 1 wt %, from 0.2 wt % to 0.9 wt %, from 0.3 wt % to 0.7 wt %, or from 0.4 wt % to 0.6 wt % of an amine catalyst or combination of amine catalysts, where wt % is based on the total weight of the composition.

Compositions may comprise one or more different types of amine catalyst.

A core can comprise one or more additional constituents in addition to a catalyst.

For example, a core can comprise a plasticizer or combination of plasticizers.

A plasticizer can be used to solubilize the catalyst and to control the permeability of the polyurea shell.

Examples of suitable plasticizers include phthalate esters, chlorinated paraffins, and hydrogenated terphenyls. Examples of suitable plasticizers include HB-40®, modified polyphenyl (Solutia, Inc.) and tung oil (Campbell & Co.).

A plasticizer can comprise a partially hydrogenated terphenyl plasticizer.

A plasticizer can comprise a mixture of 74-87 wt % hydrogenated terphenyl, 10-18 wt % partially hydrogenated quarterphenyls and higher polyphenyls, and 3-8 wt % terphenyl), where wt % is based on the total weight of the plasticizer, such as HB-40 (Eastman Chemical Co.

The core of a polyurea encapsulant can comprise a weight ratio of catalyst to plasticizer, for example, from 1:1 to 5:1, from 1.5:1 to 4.5:1, from 2:1 to 4:1, or from 2.5:1 to 3.5:1.

The core of a polyurea encapsulant can comprise, for example, from 60 wt % to 90%, from 65 wt % to 85 wt %, or from 70 wt % to 80 wt % of a catalyst, and from 10 wt % to 40 wt %, from 15 wt % to 35 wt % or from 20 wt % to 30 wt % of a plasticizer, where wt % is based on the combined weight of the catalyst and the plasticizer.

A polyurea encapsulated catalyst can have from 40 wt % to 80 wt % shell, and from 20 wt % 60 wt % core; from 45 wt % to 75 wt % shell, and from 25 wt % to 55 wt % core; from 50 wt % to 70 wt % shell, and from 30 wt % to 50 wt % core, or from 55 wt % to 65 wt % shell, and from 35 wt % to 45 wt % core, wherein wt % is based on the total weight of the polyurea encapsulated catalyst.

The core of a polyurea encapsulated catalyst can comprise an amine catalyst and a plasticizer. For example, a core can comprise from 50 wt % to 100 wt % of an amine and from 0 wt % to 50 wt % of a plasticizer, from 60 wt % to 90 wt % of an amine, and from 10 wt % to 40 wt % of a plasticizer, from 65 wt % to 85 wt % of an amine, and from 15 wt % to 35 wt % of a plasticizer, or from 70 wt % to 80 wt % of an amine, and from 20 wt % to 30 wt % of a plasticizer, where wt % is based on the total weight of amine and plasticizer.

A polyurea encapsulated catalyst can comprise, for example, from 10 wt % to 50 wt % of an amine catalyst, from 15 wt % to 45 wt %, from 20 wt % to 40 wt %, or from 25 wt % to 35 wt % of an amine catalyst, where wt % is based on the total weight of the polyurea encapsulated catalyst.

A polyurea microcapsule shell can comprise from 1 wt % to 20 wt % of a polyamine, from 3 wt % to 18 wt %, from 5 wt % to 15 wt %, from 7 wt % to 13 wt %, or from 9 wt % to 11 wt % of a polyamine, where wt % is based on the total weight of the polyurea microcapsule shell.

A polyurea microcapsule shell can comprise, for example, from 35 wt % to 65 wt % of a polyisocyanate, from 40 wt % to 60 wt %, from 45 wt % to 55 wt % or from 47 wt % to 53 wt % of a polyisocyanate, where wt % is based on the total weight of the polyurea microcapsule shell.

The equivalent ratio of isocyanate to amine (eq/eq) used to form the polyurea microcapsule shell can be, for example, from 0.5 to 1.3, from 0.6 to 1.2, from 0.7 to 1.1, or from 0.7 to 1.0.

Polyurea microcapsules and polyurea encapsulated catalysts provided by the present disclosure can be prepared using emulsion polymerization. The synthesis of encapsulants using emulsion polymerization is well-known and any suitable emulsion polymerization method can be used.

An example of a suitable emulsion polymerization method for synthesizing polyurea encapsulated catalysts can be summarized in a four-step process.

In a first step, water and an emulsion stabilizer can be combined and mixed at a high shear rate.

In a second step, the materials used to form the core such as a catalyst and a plasticizer, and the polyisocyanate can be added to the mixture produced in the first step, and the mixture mixed at a high shear rate.

In a third step, the crosslinking agent such as a polyamine and a weight stabilizer can be added and mixed at high shear rate. For example, a mixture can be mixed at a rate of 11,000 rpm using a T25 TURRAX® (IKA® Werke Staufen) dispersing instrument.

In the third step, a Lewis acid catalyst can be added to accelerate the reaction between the polyisocyanates and the polyamines Examples of suitable Lewis acid catalysts include $BH_3$, $BF_3$, $BCl_3$, $BBr_3$, $AlH_3$, $AlCl_3$, $Al(CH_3)_3$, $B(CH_3)_3$, $Be(CH_3)_2$, and $SO_3$. The isocyanate-amine reaction can be initiated using, for example, ferrous ammonium sulfate or other ferrous salt. The amount of ferrous salt initiator can be less than 0.2 wt %, less than 0.1 wt %, or less than 0.01 wt %, where wt % is based on the total weight of the mixture. The initiator can generate free radicals. Other examples of initiators include persulfate salts such as sodium peroxymonosulfate, potassium peroxymonosulfate, sodium persulfate, ammonium persulfate, and potassium persulfate; peroxides; and hydroperoxides.

In a fourth step, the mixture comprising microcapsules having a polyurea shell surrounding the core material are filtered and then heated at high temperature for several hours to fully cure the polyurea shell. For example, the solution containing the microcapsules can be beated at a temperature from 60° C. to 100° C., such as from 70° C. to 90° C., for from 10 hours to 22 hours. The heating time and temperature can be selected such that the polyurea shell is fully cured and the polyurea encapsulated catalyst remains viable.

The polyurea encapsulants are then dried by any suitable method such as baking in a circulation oven.

High shear mixing refers to a mixing rate, for example, from 1,000 rpm to 20,000 rpm.

Examples of suitable emulsion stabilizers include silica such as silica nanoparticles and calcium carbonate ($CaCO_3$). The emulsion stabilizers serve to nucleate the microcapsules.

For example, in addition to one or more polyisocyanates and one or more polyamines, a polymerizable emulsion can comprise an emulsion stabilizer. An emulsion stabilizer can comprise a weight stabilizer, a Pickering emulsion stabilizer, an ionic stabilizer, a non-ionic stabilizer, or a combination of any of the foregoing.

Examples of suitable weight stabilizers include a polyurethane dispersion, poly(vinyl alcohol), or a combination thereof. A suitable poly(vinyl alcohol) can be 88% hydrolyzed.

Examples of suitable Pickering emulsion stabilizers include inorganic compounds such as calcium carbonate, silica such as nanosilica or nanosilicon dioxide particles, or a combination thereof.

Examples of suitable ionic stabilizers include sodium dodecylbenzesulfonate (anionic), sodium lauryl sulfate (anionic), phosphate ester surfactants such as Dextrol™ and Strodex™ surfactants (available from Ashland Specialty Ingredients) (anionic), dioctyl sulfonsuccinate sodium salt (anionic), and a combination of any of the foregoing.

Examples of suitable non-ionic stabilizers include ethylene oxide adducts of octylphenyl such as Lutensol® OP10 (available from BASF, HLB 40), Span™ 60 (available from Croda Inc.; HLB 4.7; sorbitan stearate), Tween® 80 (HLB 15), BYK®-425 (urea-modified polyurethane), and a combination of any of the foregoing.

Other suitable emulsion stabilizers may also be used. The selection of an emulsion stabilizer or combination of emulsion stabilizers can affect the particle morphology and particle size. An emulsion stabilizer can comprise poly(vinyl alcohol), BYK®-425, nanosilica particles, or a combination of any of the foregoing.

The water/emulsion stabilizer mixture can comprise, for example, from 0.5 wt % to 4 wt %, from 1 wt % to 3.5 wt %, or from 1.5 wt % to 3 wt % of an emulsion stabilizer or combination of emulsion stabilizers, where wt % is based on the total weight of the water/emulsion stabilizer mixture.

The core materials can comprise a catalyst such as an amine catalyst and a plasticizer.

An example of suitable weight stabilizers include amine weight stabilizers. An example for an amine weight stabilizer is polyethyleneimine. An amine weight stabilizer comprises an amine group and can control the particle size.

A polymerization emulsion for preparing polyurea microcapsules can comprise, for example, from 75 wt % to 98 wt % water, from 80 wt % to 96 wt %, from 82 wt % to 94 wt % or from 84 wt % to 92 wt % water, where wt % is based on the total weight of the polymerization emulsion.

A polymerization emulsion can comprise, for example, from 0.1 wt % to 4 wt % of a stabilizer or combination of stabilizers, from 0.2 wt % to 3 wt %, or from 0.5 wt % to 2 wt % of a stabilizer or combination of stabilizers, where wt % is based on the total weight of the polymerization emulsion.

In addition to a combination of polyisocyanates and a polyamine, a microcapsule shell can comprise a polythiol monomer or combination of polythiol monomers, such as any of the polythiol monomers disclosed herein. A polymerization emulsion can comprise, for example, from 1 wt % to 10 wt % of a polythiol monomer, from 2 wt % to 9 wt %, or from 3 wt % to 8 wt % of a polythiol monomer, where wt % is based on the total weight of the polymerization mixture.

A polymerization emulsion can comprise, for example, from 75 wt % to 98 wt % water, from 80 wt % to 96 wt %, from 82 wt % to 94 wt % or from 84 wt % to 92 wt % water; from 0.1 wt % to 4 wt % of a stabilizer or combination of stabilizers, from 0.2 wt % to 3 wt %, or from 0.5 wt % to 2 wt % of a stabilizer or combination of stabilizers; 1 wt % to 10 wt % of a polythiol monomer, from 2 wt % to 9 wt %, or from 3 wt % to 8 wt % of a monomer 1; and from 0.5 wt % to 8 wt % of a polyalkenyl monomer, from 1 wt % to 7 wt %, from 1.5 wt % to 6.5 wt %, or from 2 wt % to 6 wt % of a polyalkenyl monomer, where wt % is based on the total weight of the polymerization mixture.

After the polyurea shell has been fully reacted the polyurea microcapsules can be dried and filtered to select a certain particle size, to remove fine particles, and/or to remove agglomerates. For example, the polyurea encapsulants can be filtered though a 50 μm sieve, through a 75 μm sieve, or a 100 μm sieve.

A method of making an encapsulated amine catalyst, comprises mixing a solution comprising water and an emulsion stabilizer at high shear to provide a first mixture; adding a composition to the first mixture and mixing at high shear to provide a second mixture, wherein the composition comprises: a polyisocyanate, wherein the polyisocyanate comprises an alicyclic polyisocyanate and an acyclic diisocyanate; and an amine catalyst; adding a polyamine to the second mixture and mixing at high shear to provide a third mixture; and reacting the polyisocyanate and the polyamine to provide microcapsules comprising a polyurea shell encapsulating the amine catalyst.

Encapsulated amine catalysts provided by the present disclosure can be used with any suitable composition in which the curing chemistry is catalyzed by an amine Examples of such systems include thiol-epoxy reactions, thiol-Michael acceptor reactions, thiol-ene reactions, and thiol-isocyanate reactions. The reactants can include prepolymers, monomers and combinations thereof. In the following description the reaction of thiol-terminated sulfur-containing prepolymers with polyepoxide, polyfunctional Michael acceptors, polyalkenyls, or polyisocyanates is disclosed. However, it should be appreciated that encapsulated amine catalysts provided by the present disclosure can be used to accelerate and control the cure of other thiol-terminated prepolymers with polyepoxide, polyfunctional Michael acceptors, polyalkenyls, or polyisocyanates; or polyepoxide-terminated prepolymers, polyfunctional Michael acceptor-terminated prepolymers, polyalkenyls-terminated prepolymers, or polyisocyanates-terminated prepolymers with polythiols.

Compositions provided by the present disclosure can comprise polyurea microcapsules provided by the present disclosure and a sulfur-containing prepolymer or combination of sulfur-containing prepolymers.

Polyurea microcapsules can be provided as dry, sifted powders (100% solids) that are directly mixed into a coating or sealant composition. Dried polyurea microcapsules can have a tendency to agglomerate.

Alternatively, a polymerization mixture containing polyurea microcapsules can be incorporated into a coating or sealant composition. The mixture containing polyurea microcapsules and solvents can contain, for example, from 5 wt % to 25 wt % solids, from 10 wt % to 20 wt % solids, or from 12 wt % to 18 wt % solids, where wt % is based on the total weight of the mixture, can be added to a coating or sealant composition, and the combined resin dried at room temperature (25° C.) to evaporate the solvent. This process can add stabilizers into the curable polymeric composition, which can degrade the properties of the cured coating or sealant.

In another method for adding polyurea microcapsules to a coating or sealant composition, after the polyurea microcapsules are synthesized, the particles can be allowed to settle from the mixture, and then separated from the solvent to provide a paste comprising the polyurea microcapsules. The paste, having a high solids content, for example, from 55 wt % to 75 wt %, from 60 wt % to 70 wt %, or from 62 wt % to 68 wt %, where wt % is based on the total weight of the paste, can then be added to the coating or sealant formulation. This process can minimize the introduction of stabilizers into the coating or sealant.

The mechanism by which core materials such as the catalyst are released from the polyurea encapsulant is not completely understood but is believed to be based on diffusion.

Regardless of the mechanism of release, the rate of release of a polyurea encapsulated catalyst can be controlled or determined by selecting the polyisocyanate reactants used to form the polyurea shell and the ratio of the alicyclic diisocyanate to the acyclic diisocyanate sued to form the polyurea shell.

For example, polyurea encapsulants having a lesser amount of an acyclic diisocyanate relative to the alicyclic diisocyanate will result in a faster catalyst release rate.

Polyurea encapsulated catalysts provided by the present disclose can be use in sealants. The polyurea encapsulated catalyst can be used as the only catalyst in the sealant, the only encapsulated catalyst in the sealant, or can be used in combination with other catalysts such as other encapsulated catalyst and/or non-encapsulated catalysts.

A polyurea encapsulated catalyst used in the sealant can include one type of polyurea encapsulated catalyst or more than one type of polyurea encapsulated catalyst. One type of polyurea encapsulated catalyst refers to the size such as average diameter, the composition of the shell, and/or the contents of the core. For example, a polyurea encapsulated catalyst having a different shell composition but the same average diameter and core content as another encapsulated catalyst are considered different type of polyurea encapsulated catalyst.

A sealant composition can comprise, for example, from 1 wt % to 20 wt % of polyurea encapsulated catalyst or combination of polyurea encapsulated catalysts, from 2 wt % to 14 wt %, from 3 wt % to 13 wt %, from 4 wt % to 12 wt %, from 5 wt % to 11 wt %, from 6 wt % to 10 wt %, or from 7 wt % to 9 wt %, where wt % is based on the total weight of the sealant composition. An encapsulated catalyst can include from 15 wt % to 45 wt % of an amine catalyst, from 20 wt % to 40 wt %, or from 25 wt % to 35 wt % of an amine catalyst, where wt % is based on the total weight of the encapsulated catalyst. Thus, a composition can comprise, for example, from 0.3 wt % to 5 wt %, from 0.7 wt % to 4.2 wt %, from 1 wt % to 3.9 wt %, from 1.2 wt % to 3.6 wt %, from 1.5 wt % to 3.3 wt %, from 1.8 wt % to 3 wt %, or from 2.1 wt % to 2.7 wt % of an amine catalyst associated with the polyureas encapsulated catalyst.

Encapsulated amine catalysts provided by the present disclosure can be incorporated into coating and sealant compositions. The amine catalyst can be released from the polyurea microcapsules over time to provide a composition that has an extended working time and, at the end of the working time, cures rapidly. Encapsulated amine catalysts provided by the present disclosure can be used with any suitable curable composition in which reaction of the reactants is accelerated by an amine catalyst. Examples of such systems include the reaction of polythiols with polyepoxides, polyisocyanates, polyalkenyls, and multifunctional Michael acceptors. The polythiol can include a polythiol prepolymer, a polythiol monomer, or a combination thereof. The polyepoxides, polyisocyanates, polyalkenyls, and multifunctional Michael acceptors can include prepolymers, monomers, or a combination thereof.

Sulfur-containing prepolymers are useful in aerospace coating and sealant applications in part because of the ability of the products such as coatings and sealants formed from the sulfur-containing prepolymers to retain their physical properties following exposure to aerospace fuel and other aerospace fluids. Suitable sulfur-containing prepolymers include, for example, polythioethers, polysulfides, sulfur-containing polyformals, monosulfides, and combinations of any of the foregoing. The sulfur-containing prepolymers may be terminated with suitable functional groups appropriate for a particular curing chemistry. For example, the sulfur-containing prepolymers may be thiol-terminated when using polyepoxy curing agents, polyalkenyl compounds, or when using Michael addition curing agents. A sulfur-containing prepolymer can be epoxy-terminated, isocyanate-terminated, Michael acceptor-terminated or alkenyl-terminated when polythiol terminated curing agents are used.

A sulfur-containing prepolymer can comprise, for example, a polythioether, a polysulfide, a sulfur-containing polyformal, a monosulfide, or a combination of any of the foregoing. A sulfur-containing prepolymer can comprise a polythioether, or a sulfur-containing polymer can comprise a polysulfide. A sulfur-containing prepolymer may comprise a mixture of different polythioethers and/or polysulfides, and the polythioethers and/or polysulfides may have the same or different functionality. A sulfur-containing prepolymer can have an average functionality from 2 to 6, from 2 to 4, from 2 to 3, from 2.3 to 2.8, or from 2.05 to 2.5. For example, a sulfur-containing prepolymer can be selected from a difunctional sulfur-containing prepolymer, a trifunctional sulfur-containing prepolymer, or a combination thereof. A sulfur-containing prepolymer can comprise a sulfur-containing polyformal.

Sulfur-containing prepolymers such as thiol-terminated polythioether prepolymers can be liquid at room temperature (25° C.) and can have a glass transition temperature $T_g$, for example, less than −20° C., less than −30° C., or less than −40° C., determined as described below.

Sulfur-containing prepolymers can be characterized by a number average molecular weight and/or a molecular weight distribution. Sulfur-containing prepolymers can exhibit a number average molecular weight within a range, for example, from 500 Daltons to 20,000 Daltons, from 2,000 Daltons to 5,000 Daltons, or from 1,000 Daltons to 4,000 Daltons. Sulfur-containing prepolymers can exhibit a polydispersity (Mw/Mn; weight average molecular weight/number average molecular weight), for example, ranging from 1 to 20, or from 1 to 5.

A sulfur-containing prepolymer can be thiol-terminated; accordingly, a sulfur-containing prepolymer may include a thiol-terminated polythioether, a thiol-terminated polysulfide, a thiol-terminated sulfur-containing polyformal, a thiol-terminated monosulfide, or a combination of any of the foregoing.

Compositions and sealant formulations provided by the present disclosure can comprise a polythioether prepolymer such as a thiol-terminated polythioether prepolymer.

Examples of thiol-terminated polythioethers are disclosed, for example, in U.S. Pat. No. 6,172,179. A thiol-terminated polythioether can comprise Permapol® P3.1E, and Permapol® L56086, or a combination of any of the foregoing, each of which is available from PPG Aerospace. Permapol® prepolymers are encompassed by the polythioether moieties and polythioether prepolymers of Formula (8), Formula (8a), and Formula (8b).

A polythioether prepolymer can comprise a polythioether comprising at least one moiety of Formula (8):

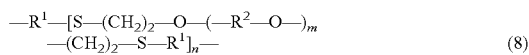
$$—R^1—[S—(CH_2)_2—O—(—R^2—O—)_m—(CH_2)_2—S—R^1]_n— \quad (8)$$

where,
each $R^1$ can be independently selected from $C_{2-10}$ n-alkanediyl, $C_{3-6}$ branched alkanediyl, $C_{6-8}$ cycloalkanediyl, $C_{6-10}$ alkanecycloalkanediyl, and —[—(CHR$^3$)$_p$—X—]$_q$—(CHR$^3$)$_r$—, where each $R^3$ can be selected from hydrogen and methyl;
each $R^2$ can be selected from $C_{2-10}$ n-alkanediyl, $C_{3-6}$ branched alkanediyl, $C_{6-8}$ cycloalkanediyl, $C_{6-14}$ alkanecycloalkanediyl, and —[—(CH$_2$)$_p$—X—]$_q$—(CH$_2$)$_r$—; and
each X can be independently selected from O, S, and —NR—, where R can be selected from hydrogen and methyl;
m is an integer from 0 to 50;
n is an integer from 1 to 60;
p is an integer from 2 to 6;
q is an integer from 1 to 5; and
r is an integer from 2 to 10.

In moieties of Formula (8), $R^1$ can be —[—(CHR$^3$)$_p$—X—]$_q$—(CHR$^3$)$_r$—, wherein each X can independently comprise O and S. In moieties of Formula (8), $R^1$ can be —[—(CHR$^3$)$_p$—X—]$_q$—(CHR$^3$)$_r$—, each X can be O or each X can be S.

In moieties of Formula (8), $R^1$ can be —[—(CH$_2$)$_p$—X—]$_q$—(CH$_2$)$_r$—, wherein each X can independently comprise O and S. In moieties of Formula (8), $R^1$ can be —[—(CH$_2$)$_p$—X—]$_q$—(CH$_2$)$_r$—, each X can be O or each X can be S.

In moieties of Formula (8), $R^1$ can be —[—(CH$_2$)$_p$—X—]$_q$—(CH$_2$)$_r$—, where p can be 2, X can be O, q can be 2, r can be 2, $R^2$ can be ethanediyl, m can be 2, and n can be 9.

In moieties of Formula (8), each $R^1$ can be derived from 1,8-dimercapto-3,6-dioxaoctane (DMDO), each $R^1$ can be derived from dimercaptodiethylsulfide (DMDS), or a combination thereof.

In moieties of Formula (8), each m can independently be an integer from 1 to 3. Each m can be the same and can be 1, 2, or 3.

In moieties of Formula (8), n can be an integer from 1 to 30, an integer from 1 to 20, an integer from 1 to 10, or an integer from 1 to 5. In addition, n may be any integer from 1 to 60.

In moieties of Formula (8), each p can independently be 2, 3, 4, 5, and 6. Each p can be the same and can be 2, 3, 4, 5, or 6.

In moieties of Formula (8), each q can independently be 1, 2, 3, 4, or 5. Each q can be the same and can be 1, 2, 3, 4, or 5.

In moieties of Formula (8), each r can independently be 2, 3, 4, 5, 6, 7, 8, 9, or 10.

In moieties of Formula (8), each r can be the same and can be 2, 3, 4, 5, 6, 7, 8, 9, or 10.

In moieties of Formula (8), each r can independently be an integer from 2 to 4, from 2 to 6, or from 2 to 8.

In moieties of Formula (8), each $R^2$ can independently comprise a $C_{2-10}$ n-alkanediyl group, a $C_{3-6}$ branched alkanediyl group, or a —[—(CH$_2$)$_p$—X—]$_q$—(CH$_2$)$_r$— group.

In moieties of Formula (8), each $R^2$ can independently comprise a $C_{2-10}$ n-alkanediyl group.

In moieties of Formula (8), each $R^2$ can independently comprise a —[—(CH$_2$)$_p$—X—]$_q$—(CH$_2$)$_r$— group, where each X can be O or S.

A thiol-terminated polythioether can comprise a thiol-terminated polythioether of Formula (8a), a thiol-terminated polythioether of Formula (8b), or a combination of any of the foregoing:

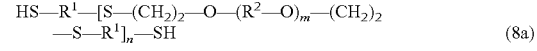
$$HS—R^1—[S—(CH_2)_2—O—(R^2—O)_m—(CH_2)_2—S—R^1]_n—SH \quad (8a)$$

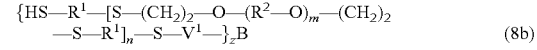
$$\{HS—R^1—[S—(CH_2)_2—O—(R^2—O)_m—(CH_2)_2—S—R^1]_n—S—V^1—\}_zB \quad (8b)$$

where,
each $R^1$ can be independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[—(CHR$^3$)$_p$—X]$_q$—(CHR$^3$)$_r$—, wherein,
p can be an integer from 2 to 6;
q can be an integer from 1 to 5;
r can be an integer from 2 to 10;
each $R^3$ can be independently selected from hydrogen and methyl; and
each X can be independently selected from O, S, and NR, where R can be selected from hydrogen and methyl;
each $R^2$ can be independently selected from $C_{1-10}$ alkanediyl, $C_{6-8}$ cycloalkanediyl, $C_{6-14}$ alkanecycloalkanediyl, and —[(CH$_2$)$_p$—X—]$_q$—(CH$_2$)$_r$—, wherein p, q, r, and X are as defined as for $R^1$;

m can be an integer from 0 to 50;

n can be an integer from 1 to 60;

B represents a core of a z-valent, polyfunctionalizing agent $B(—V)_z$ wherein, z is an integer from 3 to 6; and each V is a moiety comprising a terminal group reactive with a thiol; and each $V^1$ is derived from the reaction of V with a thiol.

In polythioether prepolymers of Formula (8a)-(8b), $R^1$ can be $—[—(CH_2)_p—X—]_q—(CH_2)_r—$, where p can be 2, X can be —O—, q can be 2, r can be 2, $R^2$ can be ethanediyl, m can be 2, and n can be 9.

In polythioether prepolymers of Formula (8a)-(8b), $R^1$ can be $C_{2-6}$ alkanediyl or $—[(CHR^3)_p—X—]_q—(CHR^3)_r—$.

In polythioether prepolymers of Formula (8a)-(8b), $R^1$ can be $—[—(CHR^3)_p—X—]_q—(CHR^3)_r—$, or X can be —O— or X can be —S—.

In polythioether prepolymers of Formula (8a)-(8b), $R^1$ can be $—[—(CH_2)_p—X—]_q—(CH_2)_r—$, or X can be —O— or X can be —S—.

In polythioether prepolymers of Formula (8a)-(8b), where $R^1$ is $—[—(CHR^3)_p—X—]_q—(CHR^3)_r—$, p can be 2, r can be 2, q can be 1, and X can be —S—; p can be 2, q can be 2, r can be 2, and X can be —O—; or p can be 2, r can be 2, q can be 1, and X can be —O—.

In polythioether prepolymers of Formula (8a)-(8b), where $R^1$ is $—[—(CH_2)_p—X—]_q—(CH_2)_r—$, p can be 2, r can be 2, q can be 1, and X is —S—; p can be 2, q can be 2, r can be 2, and X can be —O—; or p can be 2, r can be 2, q can be 1, and X can be —O—.

In polythioether prepolymers of Formula (8a)-(8b), where $R^1$ is $—[—(CHR^3)_p—X—]_q—(CHR^3)_r—$, each $R^3$ can be hydrogen, or at least one $R^3$ can be methyl.

In polythioether prepolymers of Formula (8a)-(8b), each $R^1$ can be the same, or at least one $R^1$ is different.

In polythioether prepolymers of Formula (8a)-(8b), each m can be 1, 2, 3, or 4; or m can be an integer from 1 to 10, from 1 to 6, or from 1 to 4. M can be an integer from 2 to 10, from 2 to 6, or from 2 to 4. In a polythioether prepolymers of Formula (8a)-(8b), m can be 1 to 50, or 2 to 40, or 1 to 10.

In polythioether prepolymers of Formula (8a)-(8b), n can be an integer from 1 to 30, an integer from 1 to 20, an integer from 1 to 10, or an integer from 1 to 5. In addition, n may be any integer from 1 to 60.

In polythioether prepolymers of Formula (8a)-(8b), each p can independently comprise 2, 3, 4, 5, or 6. Each p can be the same and can be 2, 3, 4, 5, or 6.

In polythioether prepolymers of Formula (8a)-(8b), each r can comprise 2, 3, 4, 5, 6, 7, or 8.

In polythioether prepolymers of Formula (8a)-(8b), each q can comprise 1, 2, 3, 4, or 5.

In thiol-terminated polythioether prepolymers of Formula (8a)-(8b) the prepolymers can comprise the reaction product of DMDO, diethylene glycol divinyl ether, and triallyl cyanurate (TAC), wherein $R^1$ is $—[(—CH_2—)_p—X—]_q—(CH_2)_r—$, wherein p is 2, q is 2, r is 2, and X is —O—; $R^2$ is $—(CH_2)_2—$ and m is 2; and $B(—V)_z$ has the structure of Formula (9):

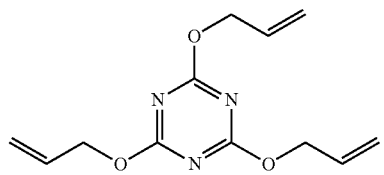

Various methods can be used to prepare thiol-terminated polythioethers of Formula (8), Formula (8a)-(8b). Examples of suitable thiol-terminated polythioethers, and methods for their production, are described in U.S. Pat. No. 6,172,179, which is incorporated by reference in its entirety. Such thiol-terminated polythioethers may be difunctional, that is, linear prepolymers having two terminal thiol groups, or polyfunctional, that is, branched prepolymers have three or more terminal thiol groups.

Suitable thiol-terminated polythioethers are commercially available, for example, as Permapol® P3.1e, Permapol® L56086, or a combination of any of the foregoing, available from PPG Aerospace, Sylmar, Calif.

A thiol-terminated polythioether prepolymer may comprise a mixture of different polythioethers and the polythioethers may have the same or different functionality. A thiol-terminated polythioether can have an average functionality from 2 to 6, from 2 to 4, from 2 to 3, from 2.05 to 2.8, from 2.3 to 2.8, or from 2.05 to 2.5. For example, a thiol-terminated polythioether can comprise a difunctional thiol-terminated polythioether, a trifunctional thiol-terminated polythioether, and a combination thereof.

A thiol-terminated polythioether can be prepared by reacting a polythiol and a polyalkenyl such as a divinyl ether, and the amounts of the respective reactants used to prepare the polythioethers are chosen to yield terminal thiol groups. Thus, in some cases, (n or >n, such as n+1) moles of a polythiol, such as a dithiol or a mixture of at least two different dithiols and 0.05×n moles to 1×n moles, such as 0.1×n moles to 0.8×n moles, of a thiol-terminated polyfunctionalizing agent may be reacted with (n) moles of a diene, such as a divinyl ether, or a mixture of at least two different dienes, such as at least two divinyl ethers. A thiol-terminated polyfunctionalizing agent can be present in the reaction mixture in an amount sufficient to provide a thiol-terminated polythioether having an average functionality of from 2.05 to 3, such as from 2.1 to 2.8, or from 2.1 to 2.6.

The reaction used to make thiol-terminated polythioethers may be catalyzed by a free radical catalyst. Suitable free radical catalysts include azo compounds, for example azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be initiated by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, a thiol-terminated polythioether can comprise the reaction product of reactants comprising:

(a) a dithiol of Formula (1):

$$HS—R^1—SH \qquad (1)$$

wherein,
R$^1$ can be selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_p$—X—]$_q$—(CHR$^3$)$_r$—; wherein,
each R$^3$ can be selected from hydrogen and methyl;
each X can be independently selected from —O—, —S—, —NH—, and —N(—CH$_3$)—;
p can be an integer from 2 to 6;
q can be an integer from 1 to 5; and
r can be an integer from 2 to 10; and
(b) a divinyl ether of Formula (3):

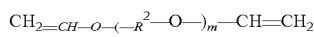  (3)

wherein,
m is an integer from 0 to 50;
each R$^2$ can be independently selected from C$_{1-10}$ alkanediyl, C$_{6-8}$ cycloalkanediyl, C$_{6-14}$ alkanecycloalkanediyl, and —[—(CHR$^3$)$_p$—X—]$_q$—(CHR$^3$)$_r$—, wherein p, q, r, R$^3$, and X are as defined for Formula (1).

Furthermore, the reactants may comprise (c) a polyfunctional compound such as a polyfunctional compound B(—V)$_z$, where B comprises a core of a z-valent polyfunctionalizing agent B(—V)$_z$; z is an integer from 3 to 6; and each —V can be independently a moiety comprising a terminal thiol group or a terminal alkenyl group.

Dithiols suitable for use in preparing thiol-terminated polythioethers can include those having the structure of Formula (1), other dithiols disclosed herein, or combinations of any of the dithiols disclosed herein.

In a dithiol of Formula (1), R$^1$ can be —[—(CHR$^3$)$_p$—X—]$_q$—(CHR$^3$)$_r$—.

In a dithiol of Formula (1), X can be —O— or —S—, and thus —[—(CHR$^3$)$_p$—X—]$_q$—(CHR$^3$)$_r$— in Formula (1) can be —[—(CHR$^3$)$_p$—O—]$_q$—(CHR$^3$)$_r$—, —[—(CHR$^3$)$_p$—S—]$_q$—(CHR$^3$)$_r$—, —[(—CH$_2$—)$_p$—O—]$_q$—(CH$_2$)$_r$—, or —[—(CH$_2$)$_p$—)$_s$—S—]$_q$—(CH$_2$)$_r$—. In a dithiol of Formula (1), p and r can be equal, such as where p and r can be both two.

In a dithiol of Formula (1), R$^1$ can be C$_{2-6}$ alkanediyl or —[—(CHR$^3$)$_p$—X—]$_q$—(CHR$^3$)$_r$—.

In a dithiol of Formula (1), R$^1$ can be —[—(CHR$^3$)$_p$—X—]$_q$—(CHR$^3$)$_r$—, X can be —O—, or X can be —S—.

In a dithiol of Formula (1), R$^1$ can be —[—(CH$_2$)$_p$—X—]$_q$—(CH$_2$)$_r$—, X can be —O—, or X can be —S—.

In a dithiol of Formula (1), where R$^1$ can be —[—(CHR$^3$)$_p$—X—]$_q$—(CHR$^3$)$_r$—, p can be 2, r can be 2, q can be 1, and X can be —S—; p can be 2, q can be 2, r can be 2, and X can be —O—; or p can be 2, r can be 2, q can be 1, and X can be —O—. In a dithiol of Formula (1), where R$^1$ is —[—(CH$_2$)$_p$—X—]$_q$—(CH$_2$)$_r$—, p can be 2, r can be 2, q can be 1, and X can be —S—; p can be 2, q can be 2, r can be 2, and X can be —O—; or p can be 2, r can be 2, q can be 1, and X can be —O—.

In a dithiol of Formula (1) where R$^1$ is —[—(CHR$^3$)$_p$—X—]$_q$—(CHR$^3$)$_r$—, each R$^3$ can be hydrogen, or at least one R$^3$ can be methyl.

In dithiols of Formula (1), each R$^1$ can be derived from 1,8-dimercapto-3,6-dioxaoctane (DMDO; 2,2-(ethane-1,2-diylbis(sulfanyl))bis(ethan-1-thiol)), or each R$^1$ can be derived from dimercaptodiethylsulfide (DMDS; 2,2'-thiobis(ethan-1-thiol)), and combinations thereof.

In a dithiol of Formula (1), each p can independently be 2, 3, 4, 5, and 6. Each p can be the same and is 2, 3, 4, 5, or 6.

In dithiols of Formula (1), each r can be 2, 3, 4, 5, 6, 7, or 8.

In dithiols of Formula (1), each q can be 1, 2, 3, 4, or 5.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

Other examples of suitable dithiols include dimercaptodiethylsulfide (DMDS; 2,2'-(ethane-1,2-diylbis(sulfanediyl)bis(ethane-1-thiol)) (in Formula (1), R$^1$ is —[—(CH$_2$)$_p$—X—]$_q$—(CH$_2$)$_r$— wherein p is 2, r is 2, q is 1, and X is —S—); dimercaptodioxaoctane (DMDO; 2,2'-(ethylenedioxy)diethanethiol) (in Formula (1), R$^1$ is —[—(CH$_2$)$_p$—X—]$_q$—(CH$_2$)$_r$—, wherein p is 2, r is 2, q is 1, and X is —O—); and 1,5-dimercapto-3-oxapentane (in Formula (1), R$^1$ is —[—(CH$_2$)$_p$—X—]$_q$—(CH$_2$)$_r$—, wherein p is 2, r is 2, q is 1, and X is —O—). It is also possible to use dithiols that include both a heteroatom in the carbon backbone and a pendent alkyl group, such as a pendent methyl group. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (3):

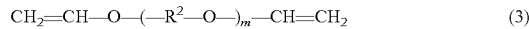  (3)

where m is 0 to 50 and R$^2$ in Formula (3) can be selected from C$_{2-6}$ n-alkanediyl, C$_{3-6}$ branched alkanediyl, C$_{6-8}$ cycloalkanediyl, C$_{6-10}$ alkanecycloalkanediyl, and —[—(CH$_2$)$_p$—X—]$_q$—(CH$_2$)$_r$—, where X is O or S, p is an integer from 2 to 6, q is an integer from 1 to 5, and r is an integer from 2 to 10. In a divinyl ether of Formula (3), R$^2$ can be C$_{2-6}$ n-alkanediyl, C$_{3-6}$ branched alkanediyl, C$_{6-8}$ cycloalkanediyl, C$_{6-10}$ alkanecycloalkanediyl, or —[—(CH$_2$)$_p$—X—]$_q$—(CH$_2$)$_r$—.

Suitable divinyl ethers include, for example, compounds having at least one oxyalkanediyl group, such as from 1 to 4 oxyalkanediyl groups, i.e., compounds in which m in Formula (3) is an integer ranging from 1 to 4. In Formula (3) m can be an integer ranging from 2 to 4. It is also possible to employ commercially available divinyl ether mixtures that are characterized by a non-integral average value for the number of oxyalkanediyl units per molecule. Thus, m in Formula (3) can also be a rational number values ranging from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) (R$^2$ in Formula (3) is ethanediyl and m is 1), butanediol divinyl ether (BD-DVE) (R$^2$ in Formula (3) is butanediyl and m is 1), hexanediol divinyl ether (HD-DVE) (R$^2$ in Formula (3) is hexanediyl and m is 1), diethylene glycol divinyl ether (DEG-DVE) (R$^2$ in Formula (3) is ethanediyl and m is 2), triethylene glycol divinyl ether (R$^2$ in Formula (3) is ethanediyl and m is 3), tetraethylene glycol divinyl ether (R$^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers.

Divinyl ethers in which $R^2$ in Formula (3) is $C_{3-6}$ branched alkanediyl may be prepared by reacting a polyhydroxyl compound with acetylene. Examples of branched divinyl ethers include compounds in which $R^2$ in Formula (3) is an alkyl-substituted methanediyl group such as $CH(CH_3)$, for which $R^2$ in Formula (3) is ethanediyl and m is 3 or an alkyl-substituted ethanediyl.

Other useful divinyl ethers include compounds in which $R^2$ in Formula (3) is polytetrahydrofuryl (poly-THF) or polyoxyalkanediyl, such as those having an average of about 3 monomer units.

Two or more types of dithiols and/or polyvinyl ether monomers of Formula (3) may be used. Thus, two dithiols of Formula (1) and one polyvinyl ether monomer of Formula (3), one dithiol of Formula (1) and two polyvinyl ether monomers of Formula (3), two dithiols of Formula (1) and two divinyl ether monomers of Formula (3), and more than two compounds of one or both Formula (1) and Formula (3), may be used to produce a variety of thiol-terminated polythioethers.

A polyvinyl ether monomer can comprise 20 mole percent to less than 50 mole percent of the reactants used to prepare a thiol-terminated polythioether, or 30 mole percent to less than 50 mole percent.

Relative amounts of dithiols and divinyl ethers can be selected to yield polythioethers having terminal thiol groups. Thus, a dithiol of Formula (1) or a mixture of at least two different dithiols of Formula (1), can be reacted with of a divinyl ether of Formula (3) or a mixture of at least two different divinyl ethers of Formula (3) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioethers may be prepared by combining at least one dithiol of Formula (1) and at least one divinyl ether of Formula (3) followed by addition of an appropriate catalyst, and carrying out the reaction at a temperature, for example, from 30° C. to 120° C., such as 70° C. to 90° C., for a time from 2 hours to 24 hours, such as from 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (8b):

{HS—R¹—[S—(CH₂)₂—O—(R²—O)ₘ—(CH₂)₂
—S—R¹—]ₙS—V'—}ᵤB          (8b)

wherein z has an average value of greater than 2, such as an average value within a range from 2.1 to 3, an average value within a range from 2.1 to 2.8, an average value within a range from 2 and 4, an average value within a range from 3 and 6, or an average value within a range from 3 to 6.

Polyfunctionalizing agents suitable for use in preparing such polyfunctional thiol-terminated polythioethers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioether prepolymers can be liquid at room temperature (25° C.) and can have a glass transition temperature $T_g$, for example, less than −20° C., less than −30° C., or less than −40° C., where the glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve according to ASTM D7028.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise 4 Pa-sec to 12 Pa-sec), measured using a Brookfield CAP 2000 viscometer, with a No. 6 spindle, at speed of 300 rpm, and a temperature of 23° C.

It will be appreciated that polythioethers having a backbone of Formula (8) can be terminated or capped with a reactive functional group to adapt the polythioethers for use with a particular curing chemistry. Polythioethers having a backbone of Formula (8) can be terminated, for example, with thiol, epoxy, amine, hydroxyl, isocyanate, alkenyl, silane, alkoxysilyl, or Michael acceptor groups. These modified polythioethers can be prepared by reacting a thiol-terminated polythioether, such as a thiol-terminated polythioether of Formula (8a)-(8b) with a compound having a group that is reactive with a thiol group, and a suitable terminal functional groups. Examples of groups that are reactive with thiol groups include epoxy, thiol, Michael acceptor, alkenyl, and isocyanate groups. The capping compound can have the structure, for example:

$$R^{20}-R^{21}-R^{22}$$

where $R^{20}$ can be selected from an epoxy group, a thiol group, an amine group, a hydroxyl group, an isocyanate group, a Michael acceptor group, a silane group, an alkenyl group, and an alkoxysilyl group; $R^{22}$ can be selected from an epoxy group, a thiol group, an isocyanate group, an alkenyl group, and a Michael acceptor group; and $R^{21}$ can be selected from $C_{1-10}$ alkanediyl, $C_{5-20}$ cycloalkanediyl, $C_{6-20}$ arenediyl, $C_{6-20}$ alkylcycloalkanediyl, $C_{7-20}$ alkylarenediyl, $C_{2-10}$ heteroalkanediyl, $C_{5-20}$ heterocycloalkanediyl, $C_{6-20}$ heteroarenediyl, $C_{6-20}$ heteroalkylcycloalkanediyl, $C_{7-20}$ heteroalkylarenediyl, substituted $C_{1-10}$ alkanediyl, substituted $C_{5-20}$ cycloalkanediyl, substituted $C_{6-20}$ arenediyl, substituted $C_{6-20}$ alkylcycloalkanediyl, substituted $C_{7-20}$ alkylarenediyl, substituted $C_{2-10}$ heteroalkanediyl, substituted $C_{5-20}$ heterocycloalkanediyl, substituted $C_{6-20}$ heteroarenediyl, substituted $C_{6-20}$ heteroalkylcycloalkanediyl, and substituted $C_{7-20}$ heteroalkylarenediyl. A compound used to modify a polythioether prepolymer such as a thiol-terminated prepolymer can have a low molecular weight compared to that of the polythioether prepolymer backbone. For example, the capping compound can have a molecular weight less than 1,000 Daltons, less than 800 Daltons, less than 600 Daltons, or less than 400 Daltons.

Similar compounds and methods can be used to modify the terminal groups of the other thiol-terminated sulfur-containing prepolymer disclosed herein.

For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT Publication No. WO 2018/085650 (sulfur-containing divinyl ether), and PCT Publication Application No. WO 2018/031532 (urethane-containing), each of which is incorporated by reference in its entirety. Incorporating modifying segments into the backbone of the sulfur-containing prepolymer can affect properties of a cured sealant prepared using the prepolymer such as flexibility and adhesion.

A thiol-terminated sulfur-containing prepolymer can comprise a thiol-terminated sulfur-containing polyformal. Sulfur-containing polyformal prepolymers useful in aerospace sealant applications are disclosed, for example, in U.S. Pat. No. 8,729,216 and in U.S. Pat. No. 8,541,513, each of which is incorporated by reference in its entirety.

A thiol-terminated sulfur-containing prepolymer can comprise a thiol-terminated sulfur-containing polyformal comprising a moiety of Formula (9):

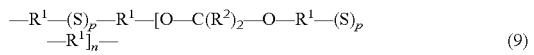

$$-R^1-(S)_p-R^1-[O-C(R^2)_2-O-R^1-(S)_p-R^1]_n- \qquad (9)$$

where n is an integer from 1 to 50; each p can be independently 1 or 2; each $R^1$ is $C_{2-6}$ alkanediyl; each $R^2$ can be independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{6-12}$ cycloalkyl, $C_{6-12}$ aryl, and substituted $C_{6-12}$ aryl.

A thiol-terminated sulfur-containing polyformal prepolymer can have the structure of Formula (9a):

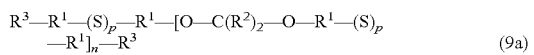

$$R^3-R^1-(S)_p-R^1-[O-C(R^2)_2-O-R^1-(S)_p-R^1]_n-R^3 \qquad (9a)$$

where n is an integer from 1 to 50; each p can be independently 1 or 2; each $R^1$ is $C_{2-6}$ alkanediyl; each $R^2$ can be independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

In sulfur-containing polyformal prepolymers of Formula (9) and Formula (9a), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (9), each $R^1$ can be ethane-1,2-diyl.

In sulfur-containing polyformal prepolymers of Formula (9) and Formula (9a), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (9) and Formula (9a), each $R^2$ can be selected from hydrogen, methyl, and ethyl.

In sulfur-containing polyformal prepolymers of Formula (9) and Formula (9a), each $R^1$ is the same and can be $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (9) and Formula (9a), each $R^1$ can be ethane-1,2-diyl. In sulfur-containing polyformal prepolymers of Formula (9) and Formula (9a), each $R^2$ can be hydrogen. In sulfur-containing polyformal prepolymers of Formula (9) and Formula (9a), each $R^1$ can be ethane-1,2-diyl and each $R^2$ can be hydrogen.

In sulfur-containing polyformal prepolymers of Formula (9) and Formula (9a), n can be an integer selected from 1 to 50, an integer from 2 to 40, an integer from 4 to 30, or n can be an integer from 7 to 30.

In sulfur-containing polyformal prepolymers of Formula (9) and Formula (9a), each p is the same and can be 1, and each p is the same and can be 2.

In sulfur-containing polyformal prepolymers of Formula (9) and Formula (9a) can have a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons.

In sulfur-containing polyformal prepolymers of Formula (9a), each $R^3$ can be a thiol-terminated group and can comprise, for example, a group of Formula (a), Formula (b), Formula (c), Formula (d), Formula (e), or Formula (f):

$$HS-R^7-R^6-O- \qquad (a)$$

$$HS-R^7-O- \qquad (b)$$

$$HS-R^7-NH-C(=O)-O- \qquad (c)$$

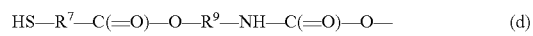

$$HS-R^7-C(=O)-O-R^9-NH-C(=O)-O- \qquad (d)$$

$$HS-R^7-C(=O)-NH-R^9-NH-C(=O)-O- \qquad (e)$$

where each $R^6$ can comprise a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{6-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

Sulfur-containing polyformal prepolymers can have the structure of Formula (9b):

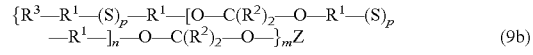

$$\{R^3-R^1-(S)_p-R^1-[O-C(R^2)_2-O-R^1-(S)_p-R^1]_n-O-C(R^2)_2-O-\}_mZ \qquad (9b)$$

where each n is an integer selected from 1 to 50; m is an integer selected from 3 to 6; p can independently be selected from 1 and 2; each $R^1$ can be independently selected from $C_{2-6}$ alkanediyl; each $R^2$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; each $R^3$ comprises a thiol-terminated group; and Z is derived from the core of an m-valent parent polyol $Z(OH)_m$.

In sulfur-containing polyformal prepolymers of Formula (9b), each $R^1$ can independently be selected from $C_{2-6}$ alkanediyl, $C_{2-4}$ alkanediyl, $C_{2-3}$ alkanediyl, and ethane-1,2-diyl. In sulfur-containing polyformal prepolymers of Formula (9b), each $R^1$ can be ethane-1,2-diyl.

In sulfur-containing polyformal prepolymers of Formula (9b), each $R^2$ can independently be selected from hydrogen, $C_{1-6}$ alkyl, $C_{1-4}$ alkyl, $C_{1-3}$ alkyl, and $C_{1-2}$ alkyl. In sulfur-containing polyformal prepolymers of Formula (9b), each $R^2$ can be selected from hydrogen, methyl, and ethyl.

In sulfur-containing polyformal prepolymers of Formula (9b), each $R^1$ can be the same and can be $C_{2-3}$ alkanediyl such as ethane-1,2-diyl or propane-1,3-diyl; and each $R^2$ is the same and can be selected from hydrogen and $C_{1-3}$ alkyl such as methyl, ethyl, or propyl. In sulfur-containing polyformal prepolymers of Formula (9b), each $R^1$ can be ethane-1,2-diyl. In sulfur-containing polyformal prepolymers of Formula (9b), each $R^2$ can be hydrogen. In sulfur-containing polyformal prepolymers of Formula (9b), each $R^1$ can be ethane-1,2-diyl and each $R^2$ can be hydrogen.

In sulfur-containing polyformal prepolymers of Formula (9b), m can be 1, m can be 2, m can be 3, m can be 4, m can be 5, or m can be 6.

In sulfur-containing polyformal prepolymers of Formula (9b) where m is 3, the parent polyol $Z(OH)_m$ is a triol of Formula (10):

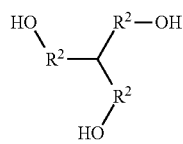
(10)

where each $R^2$ can be independently $C_{1-6}$ alkanediyl, or a triol of Formula (11):

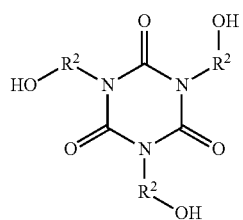
(11)

where each $R^2$ can be independently $C_{1-6}$ alkanediyl. Accordingly, in these embodiments Z can have the structure of Formula (12a) or Formula (12b):

(12a)

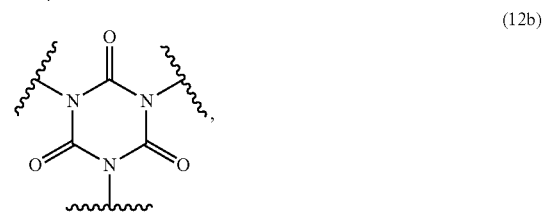
(12b)

respectively.

In sulfur-containing polyformal prepolymers of Formula (9b), each n is an integer selected from 1 to 50, an integer selected from 2 to 40, an integer selected from 4 to 30, or an integer selected from 7 to 30.

In sulfur-containing polyformal prepolymers of Formula (9b), each p is the same and is 1, and each p is the same and is 2.

In sulfur-containing polyformal prepolymers of Formula (9b) has a number average molecular weight from 200 Daltons to 6,000 Daltons, from 500 Daltons to 5,000 Daltons, from 1,000 Daltons to 5,000 Daltons, from 1,500 Daltons to 4,000 Daltons, or from 2,000 Daltons to 3,600 Daltons.

In sulfur-containing polyformal prepolymers of Formula (9b), $R^3$ can be bonded to a polyfunctionalizing agent $B(-V)_z$ through a moiety of Formula (9).

In sulfur-containing polyformal prepolymers of Formula (9b), each $R^3$ can be the same.

In sulfur-containing polyformal prepolymers of Formula (9b), each $R^3$ can comprise a thiol-terminated group of Formula (a), Formula (b), Formula (c), Formula (d), Formula (e), or Formula (f):

(a)

(b)

(c)

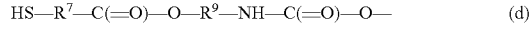
(d)

(e)

where each $R^6$ comprises a moiety derived from a diisocyanate or a moiety derived from an ethylenically unsaturated monoisocyanate; each $R^7$ can be selected from $C_{2-14}$ alkanediyl and $C_{2-14}$ heteroalkanediyl; and each $R^9$ can be selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

A thiol-terminated sulfur-containing prepolymer can comprise a thiol-terminated monosulfide or combination of thiol-terminated monosulfides.

A thiol-terminated monosulfide prepolymer can comprise a thiol-terminated monosulfide prepolymer comprising a moiety of Formula (13):

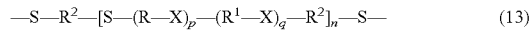
(13)

wherein,
each R can be independently selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;
each $R^1$ can be independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;
each $R^2$ can be independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as a $C_{6-10}$ alkylcycloalkanediyl; and $C_{8-10}$ alkylarenediyl;
each X can be independently selected from O and S;
p can be an integer from 1 to 5;
q can be an integer from 0 to 5; and
n can be an integer from 1 to 60, such as from 2 to 60, from 3 to 60, or from 25 to 35.

In thiol-terminated monosulfide prepolymers having a moiety of Formula (13), each X can be independently selected from S and O; p is an integer from 1 to 5; q is an integer from 0 to 5; n is an integer from 1 to 60; each R can be independently selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can be independently selected from $C_{1-10}$ alkanediyl, $C_{6-8}$ cycloalkanediyl, $C_{1-4}$ alkylcycloalkanediyl, and $C_{8-10}$ alkylarenediyl; and each $R^2$ can be independently selected from $C_{2-10}$ alkanediyl, $C_{6-8}$ cycloalkanediyl, $C_{1-4}$ alkylcycloalkanediyl, and $C_{8-10}$ alkylarenediyl.

A thiol-terminated monosulfide prepolymer can comprise a thiol-terminated monosulfide prepolymer of Formula (13a), a thiol-terminated monosulfide prepolymer of Formula (13b), a thiol-terminated monosulfide prepolymer of Formula (13c), or a combination of any of the foregoing:

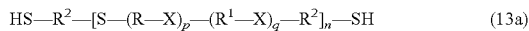

$$HS—R^2—[S—(R—X)_p—(R^1—X)_q—R^2]_n—SH \qquad (13a)$$

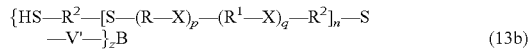

$$\{HS—R^2—[S—(R—X)_p—(R^1—X)_q—R^2]_n—S—V'—\}_zB \qquad (13b)$$

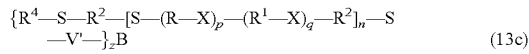

$$\{R^4—S—R^2—[S—(R—X)_p—(R^1—X)_q—R^2]_n—S—V'—\}_zB \qquad (13c)$$

wherein,
each R can be independently selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;
each $R^1$ can be independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{am}$ alkylarenediyl;
each $R^2$ can be independently selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;
each X can be independently selected from O and S;
p can be an integer from 1 to 5;
q can be an integer from 0 to 5; and
n can be an integer from 1 to 60, such as from 2 to 60, from 3 to 60, or from 25 to 35.

In thiol-terminated monosulfide prepolymers of Formula (13)-(13c): each X can be independently selected from S and O; p is an integer from 1 to 5; q is an integer from 0 to 5; n is an integer from 1 to 60; each R can be independently selected from $C_{2-10}$ alkanediyl, $C_{6-8}$ cycloalkanediyl, $C_{1-4}$ alkylcycloalkanediyl, and $C_{8-10}$ alkylarenediyl; each $R^1$ can be independently selected from $C_{1-10}$ alkanediyl, $C_{8-10}$ cycloalkanediyl, $C_{1-4}$ alkylcycloalkanediyl, and $C_{8-10}$ alkylarenediyl; each $R^2$ can be independently selected from $C_{2-10}$ alkanediyl, $C_{6-8}$ cycloalkanediyl, $C_{1-4}$ alkylcycloalkanediyl, and $C_{8-10}$ alkylarenediyl; B represents a core of a z-valent polyfunctionalizing agent $B(—V)_z$ wherein: z is an integer from 3 to 6; and each V is a moiety comprising a terminal group reactive with a thiol group; each —V' is derived from the reaction of —V with a thiol; each $R^4$ independently comprises hydrogen or a bond to a polyfunctionalizing agent $B(—V)_z$.

In thiol-terminated monosulfide prepolymers of Formula (13)-(13c), each X can independently be S or O, each X can be S, or each X can be O.

In thiol-terminated monosulfide prepolymers of Formula (13)-(13c), p can be an integer from 2 to 6, or p can be 1, 2, 3, 4, 5, or 6.

In thiol-terminated monosulfide prepolymers of Formula (13)-(13c), q can be an integer from 1 to 5, q can be an integer from 2 to 5, or q can be 0, 1, 2, 3, 4, or 5.

In thiol-terminated monosulfide prepolymers of Formula (10)-(13c), n can be an integer from 2 to 60, from 3 to 60, or from 25 to 35.

In thiol-terminated monosulfide prepolymers of Formula (13)-(13c), each R can be independently selected from $C_{2-10}$ alkanediyl and $C_{6-8}$ cycloalkanediyl, each R can be $C_{2-10}$ alkanediyl, or each R can be $C_{6-8}$ cycloalkanediyl.

In thiol-terminated monosulfide prepolymers of Formula (13)-(13c), each R can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (13)-(13c), each R can be selected from ethanediyl, 1,3-propanediyl, 1,2-propanediyl, 1,4-butanediyl, and 1,3-butanediyl.

In thiol-terminated monosulfide prepolymers of Formula (13)-(13c), each $R^1$ can independently be selected from $C_{1-10}$ alkanediyl and $C_{6-8}$ cycloalkanediyl, each R can be $C_{1-10}$ alkanediyl, or each $R^1$ can be $C_{6-8}$ cycloalkanediyl.

In thiol-terminated monosulfide prepolymers of Formula (13)-(13c), each $R^1$ can be selected from $C_{1-6}$ alkanediyl, $C_{1-4}$ alkanediyl, $C_{2-10}$ alkanediyl, and $C_{2-6}$ alkanediyl.

In thiol-terminated monosulfide prepolymers of Formula (13)-(13c), each $R^1$ can be selected from methanediyl, ethanediyl, 1,3-propanediyl, 1,2-propanediyl, 1,4-butanediyl, and 1,3-butanediyl.

In thiol-terminated monosulfide prepolymers of Formula (13)-(13c), each $R^2$ can independently be selected from $C_{2-10}$ alkanediyl and $C_{6-8}$ cycloalkanediyl, each $R^2$ can be $C_{2-10}$ alkanediyl, or each $R^2$ can be $C_{6-8}$ cycloalkanediyl.

In thiol-terminated monosulfide prepolymers of Formula (13)-(13c), each $R^2$ can be selected from $C_{2-6}$ alkanediyl, $C_{2-4}$ alkanediyl, $C_{3-10}$ alkanediyl, and $C_{3-6}$ alkanediyl.

In thiol-terminated monosulfide prepolymers of Formula (13)-(13c), each $R^2$ can be selected from ethanediyl, 1,3-propanediyl, 1,2-propanediyl, 1,4-butanediyl, and 1,3-butanediyl.

In thiol-terminated monosulfides of Formula (13)-(13c), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfide prepolymers of Formula (13)-(13c), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfide prepolymers of Formula (13)-(13c), p can be 1 or 2, q can be 1 or 2, n can be an integer from 1 to 60 or an integer from 25 to 35, each X can be O, each R can be $C_2$ alkanediyl, each $R^1$ can be $C_1$ alkanediyl, and each $R^2$ can be $C_2$ alkanediyl.

In thiol-terminated monosulfide prepolymers of Formula (13)-(13c), B(—V)$_z$ can be selected from 1,2,3-trichloropropane, 1,1,1-tris(chloromethyl)propane, 1,1,1-tris(chloromethyl)ethane, and 1,3,5-tris(chloromethyl)benzene, and a combination of any of the foregoing.

In thiol-terminated monosulfide prepolymers of Formula (13c) each $R^4$ can independently selected from hydrogen and a bond to a polyfunctionalizing agent (B(V)$_z$ through a moiety of Formula (13). In thiol-terminated monosulfide prepolymer can have an average thiol functionality, for example, from 2.05 to 2.9, such as from 2.1 to 2.8, or from 2.2 to 2.6.

Thiol-terminated monosulfide prepolymers of Formula (13)-(13c) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfide prepolymers of Formula (13)-(13c) are disclosed, for example, in U.S. Pat. No. 7,875,666, which is incorporated by reference in its entirety.

A thiol-terminated monosulfide prepolymers can comprise a thiol-terminated monosulfide prepolymer comprising a moiety of Formula (14):

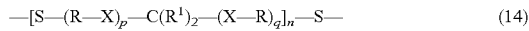

$$—[S—(R—X)_p—C(R^1)_2—(X—R)_q]_n—S— \quad (14)$$

wherein, each R can be independently selected from $C_{2-10}$ alkanediyl, such as $C_{2-6}$ alkanediyl; $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and a $C_{8-10}$ alkylarenediyl;

each $R^1$ can be independently selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; $C_{6-8}$ cycloalkyl group; $C_{6-14}$ alkylcycloalkyl, such as $C_{6-10}$ alkylcycloalkyl; and $C_{8-10}$ alkylaryl;

each X can be independently selected from O and S;

p can be an integer from 1 to 5;

q can be an integer from 1 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (14a), a thiol-terminated monosulfide prepolymer of Formula (14b), a thiol-terminated monosulfide prepolymer of Formula (14c), or a combination thereof:

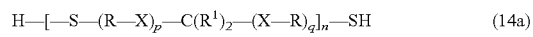

$$H—[—S—(R—X)_p—C(R^1)_2—(X—R)_q]_n—SH \quad (14a)$$

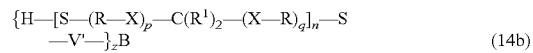

$$\{H—[S—(R—X)_p—C(R^1)_2—(X—R)_q]_n—S—V'—\}_zB \quad (14b)$$

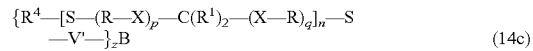

$$\{R^4—[S—(R—X)_p—C(R^1)_2—(X—R)_q]_n—S—V'—\}_zB \quad (14c)$$

where, each R can be independently selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can be independently selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can be independently selected from O and S;

p is an integer from 1 to 5;

q is an integer from 1 to 5;

n is an integer from 1 to 60, such as from 2 to 60, from 3 to 60, or from 25 to 35; B represents a core of a z-valent polyfunctionalizing agent B(V)$_z$ wherein:

z is an integer from 3 to 6; and each V is a moiety comprising a terminal group reactive with a thiol group;

each V' is derived from the reaction of V with a thiol; and each $R^4$ independently comprises hydrogen or a bond to a polyfunctionalizing agent B(V)$_z$.

In thiol-terminated monosulfide moieties or prepolymers of Formula (14)-(14c) each X can independently be S or O; p is an integer from 1 to 5; q is an integer from 1 to 5; n is an integer from 1 to 60; each R independently comprises $C_{2-10}$ alkanediyl; each $R^1$ can be independently selected from hydrogen and $C_{1-10}$ alkyl; B represents a core of a z-valent polyfunctionalizing agent B(—V)$_z$ wherein: z is an integer from 3 to 6; and each V is a moiety comprising a terminal group reactive with a thiol group; each —V'— is derived from the reaction of —V with a thiol; and each $R^4$ can be independently hydrogen or is bonded to a polyfunctionalizing agent B(—V)$_z$.

In thiol-terminated monosulfide moieties or prepolymers of Formula (14)-(14c), each X can be S, or each X can be O.

In thiol-terminated monosulfide moieties or prepolymers of Formula (14)-(14c), p can be an integer from 2 to 5, or q can be 1, 2, 3, 4, or 5.

In thiol-terminated monosulfide moieties or prepolymers of Formula (14)-(14c), p can be an integer from 2 to 5, or q can be 1, 2, 3, 4, or 5.

In thiol-terminated monosulfide moieties or prepolymers of Formula (14)-(14c), n can be an integer from 2 to 60, from 3 to 60, or from 25 to 35.

In thiol-terminated monosulfide moieties or prepolymers of Formula (14)-(14c), each R can be independently selected from $C_{2-6}$ alkanediyl and $C_{2-4}$ alkanediyl.

In thiol-terminated monosulfide moieties or prepolymers of Formula (14)-(14c), each $R^1$ can be selected from ethanediyl, 1,3-propanediyl, 1,2-propanediyl, 1,4-butanediyl, and 1,3-butanediyl.

In thiol-terminated monosulfide prepolymers of Formula (14)-(14c), each R can be selected from $C_{2-10}$ n-alkanediyl, $C_{2-10}$ branched alkanediyl, and a combination thereof.

In thiol-terminated monosulfide moieties or prepolymers of Formula (14)-(14c), each $R^1$ can be independently selected from hydrogen and $C_{2-6}$ alkyl.

In thiol-terminated monosulfide moieties or prepolymers of Formula (14)-(14c), each $R^1$ can be independently selected from hydrogen, ethyl, n-propyl, iso-propyl, n-butanyl, and iso-butyl.

In thiol-terminated monosulfide moieties or prepolymers of Formula (14)-(14c), each $R^1$ can be selected from $C_{1-10}$ n-alkyl, $C_{1-10}$ branched alkyl, and a combination thereof.

In thiol-terminated monosulfide moieties or prepolymers of Formula (14)-(14c), each X is O, p is 1 or 2, q is 1 or 2, n is 1 to 60 such as 2 to 60, each R is $C_{2-4}$ alkanediyl such as ethanediyl, and each $R^1$ is hydrogen.

In thiol-terminated monosulfide moieties or prepolymers of Formula (14)-(14c), each X is O, p is 1, q is 1, n is 1 to 60 such as 2 to 60, each R is $C_{2-4}$ alkanediyl such as ethanediyl, and each $R^1$ is hydrogen.

In thiol-terminated monosulfide moieties or prepolymers of Formula (14)-(14c), each X is O, p is 2, q is 2, n is 1 to 60 such as 2 to 60, each R is $C_{2-4}$ alkanediyl such as ethanediyl, and each $R^1$ is hydrogen.

In thiol-terminated monosulfide moieties or prepolymers of Formula (14)-(14c), B(—V)$_z$ can be selected from 1,2,3-trichloropropane, 1,1,1-tris(chloromethyl)propane, 1,1,1-tris(chloromethyl)ethane, and 1,3,5-tris(chloromethyl)benzene, and a combination of any of the foregoing.

Thiol-terminated monosulfide moieties or prepolymers of Formula (14a) and (14b) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (11)-(11c) are disclosed, for example, in U.S. Pat. No. 8,466,220, which is incorporated by reference in its entirety.

Thiol-terminated monosulfide prepolymers can have a number average molecular weight within a range from 300 Daltons to 10,000 Daltons, such as within a range 1,000 Daltons to 8,000 Daltons, where the molecular weight is determined by gel-permeation chromatography using a polystyrene standard. Thiol-terminated monosulfide prepolymers can have a glass transition temperature $T_g$ less than −40° C., less than −55° C., or less than −60° C. The glass transition temperature $T_g$ is determined by Dynamic Mechanical Analysis (DMA) using a TA Instruments Q800 apparatus with a frequency of 1 Hz, an amplitude of 20 microns, and a temperature ramp of −80° C. to 23° C., with the $T_g$ identified as the peak of the tan δ curve according to ASTM D7028.

A thiol-terminated sulfur-containing prepolymer can comprise a thiol-terminated polysulfide prepolymer. A polysulfide prepolymer refers to a prepolymer that contains one or more polysulfide linkages, i.e., —S$_x$— linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (15):

$$\text{HS—(R—S—S)}_n\text{—R—SH} \quad (15)$$

and the trifunctional polysulfide polymers have the structure of Formula (16):

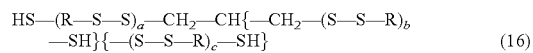

$$\text{HS—(R—S—S)}_a\text{—CH}_2\text{—CH\{—CH}_2\text{—(S—S—R)}_b\text{—SH\}\{—(S—S—R)}_c\text{—SH\}} \quad (16)$$

where each R is $(CH_2)_2$—O—$CH_2$—O—$(CH_2)_2$, and n=a+b+c, where the value for n may be from 7 to 38 depending on the amount of the trifunctional cross-linking agent (1,2,3-trichloropropane; TCP) used during synthesis of the polysulfide polymer. Thioplast™ G polysulfides can have a number average molecular weight from less than 1,000 Daltons to 6,500 Daltons, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Daltons to 7,500 Daltons, a SH content from 0.8% to 7.7%, and a cross-linking density from 0% to 2%. Thiokol LP polysulfides have the general structure of Formula (17):

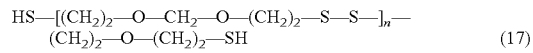

$$\text{HS—[(CH}_2)_2\text{—O—CH}_2\text{—O—(CH}_2)_2\text{—S—S—]}_n\text{—(CH}_2)_2\text{—O—(CH}_2)_2\text{—SH} \quad (17)$$

where n can be such that the number average molecular weight from 1,000 Daltons to 7,500 Daltons, such a, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (18):

$$\text{HS—R—(S}_y\text{—R)}_t\text{—SH} \quad (18)$$

where, t is an integer from 1 to 60;

each y can be independently selected from 1 and 2;

y has a mean value within a range from greater than 1.0 to 1.5;

each R can be independently selected from branched alkanediyl, branched arenediyl, and a moiety having the structure —$(CH_2)_p$—O—$(CH_2)_q$—O—$(CH_2)_r$—;

q can be an integer from 1 to 8;

p can be an integer from 1 to 10;

r can be an integer from 1 to 10;

B represents a core of a z-valent polyfunctionalizing agent B(—V)$_z$ wherein:

z is an integer from 3 to 6; and each V is a moiety comprising a terminal group reactive with a thiol group; and each —V'— is derived from the reaction of —V with a thiol.

In thiol-terminated polysulfide prepolymers of Formula (18), t can be, for example, an integer from 2 to 60, from 1 to 40, or from 1 to 20.

In thiol-terminated polysulfide prepolymers of Formula (18), q can be, for example, an integer from 1 to 6, or an integer from 1 to 4. For example, q can be 1, 2, 3, 4, 5 or 6.

In thiol-terminated polysulfide prepolymers of Formula (18), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (18), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (18), y can have a value of 1.

In thiol-terminated polysulfide prepolymers of Formula (18), y can have a mean value, for example, of greater than 1, such as from 1.05 to 2, or from 1.1 to 1.8.

In thiol-terminated polysulfide prepolymers of Formula (18), R can be —$(CH_2)_p$—O—$(CH_2)_q$—O—$(CH_2)_r$—.

In thiol-terminated polysulfide prepolymers of Formula (18), R can be —$(CH_2)_p$—O—$(CH_2)_q$—O—$(CH_2)_r$—, each q can be 1, 2, 3, or 4, and each p and r can be 1 or 2.

In thiol-terminated polysulfide prepolymers of Formula (18), 0% to 20% of the R groups can be selected from branched alkanediyl and branched arenediyl, and 80% to 100% of the R groups can be —$(CH_2)_p$—O—$(CH_2)_q$—O—$(CH_2)_r$—.

In thiol-terminated polysulfide prepolymers of Formula (18), a branched alkanediyl or a branched arenediyl can be —$R^1$(-A)$_n$- where $R^1$ is a hydrocarbon group, n is 1 or 2, and A is a branching point. A branched alkanediyl can have the structure —$CH_2$—$CH(-CH_2-)$—.

Thiol-terminated polysulfide prepolymers of Formula (18) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (18) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (19):

HS—(R—O—$CH_2$—O—R—$S_m$)$_n$—R—O—$CH_2$—O—R—SH (19)

where R is $C_{2-4}$ alkanediyl, each m can be independently an integer from 2 to 8, and n is an integer from 1 to 370.

In thiol-terminated polysulfide prepolymers of Formula (19), m can have a mean value, for example, greater than 1, such as from 1.05 to 2, or from 1.1 to 1.8.

In thiol-terminated polysulfide prepolymers of Formula (19), each m can independently be, for example, an integer from 2 to 6, an integer from 2 to 4, or the integer 2, 3, 4, 5, 6, 7, or 8.

In thiol-terminated polysulfide prepolymers of Formula (19), n can be, for example, an integer from 2 to 200 or an integer from 2 to 100.

In thiol-terminated polysulfide prepolymers of Formula (19), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (19) are disclosed, for example, in JP 62-53354.

Thiol-terminated polysulfide prepolymers can be liquid at room temperature (25° C.). Thiol-terminated monosulfide prepolymers can have a viscosity, at 100% solids, of no more than 1,500 poise (150 Pa-sec), such as 40 poise to 500 poise (4 Pa-sec to 50 Pa-sec), at a temperature of 23° C. and a pressure of about 760 mm Hg (101 kPa) determined according to ASTM D-2849 § 79-90 using a Brookfield CAP 2000 viscometer with a No. 6 spindle.

Sulfur-containing prepolymers include reactive functional groups suitable for a particular curing chemistry. For example, the sulfur-containing prepolymers may be thiol-, polyalkoxysilyl-, epoxy-, isocyanate-, epoxy-, vinyl ether-, or Michael acceptor-terminated.

Terminal-modified sulfur-containing prepolymers may be adapted for use with certain curing chemistries by modifying a thiol-terminated sulfur-containing prepolymer with suitable reactive functional groups. Examples of suitable reactive terminal groups include polyalkoxysilyl groups, epoxy groups, isocyanate groups, vinyl ether groups, and Michael acceptor groups, and such prepolymers are referred to as terminal-modified sulfur-containing prepolymers.

Terminal-modified sulfur-containing prepolymers may be prepared by reacting a thiol-terminated sulfur-containing prepolymer with a compound having a group that is reactive with a thiol group and a reactive group such as a polyalkoxysilyl group, an epoxy group, an isocyanate group, a vinyl ether group, or a Michael acceptor group.

Methods of preparing terminal-modified sulfur-containing polyformal prepolymers are disclosed, for example, in U.S. Application Publication Nos. 2012/0238707 and 2012/0234255, each of which is incorporated by reference in its entirety. The methods for synthesizing terminal-modified sulfur-containing polyformal prepolymers from a corresponding thiol-terminated, sulfur-containing polyformal prepolymer described in these applications can be adapted to prepare terminal-modified polythioethers, polysulfides, and other terminal-modified sulfur-containing prepolymer.

A terminal-modified sulfur-containing prepolymer can be derived from a sulfur-containing prepolymer having a backbone of Formula (8), Formula (9), Formula (13), or Formula (14). A terminal-modified sulfur-containing prepolymer can be derived from any of the thiol-terminated sulfur-containing prepolymers or combinations thereof disclosed herein.

The preparation of terminal-modified sulfur-containing polythioethers is known in the art. For example, isocyanate-terminated polythioethers are disclosed in U.S. Application Publication No. 2015/0252230, polyalkoxysilyl-terminated polythioethers are disclosed in U.S. Application Publication No. 2015/0252230, alkenyl-terminated polythioethers are disclosed in U.S. Application Publication No. 2006/0270796; and epoxy-terminated polythioethers are disclosed in U.S. Application Publication No. 2005/0010003, each of which is incorporated by reference in its entirety.

In addition to a thiol-terminated sulfur-containing prepolymer, curable compositions provided by the present disclosure can comprise a curing agent comprising groups reactive with thiol groups such as polyepoxides, polyisocyanates, polyalkenyls, and multifunctional Michael acceptors. A curing agent can comprise a prepolymer, a monomer, or a combination thereof.

Compositions and sealants provided by the present disclosure can comprise a curing agent, i.e., crosslinking agent, comprising a compound reactive with thiol groups. Examples of suitable thiol-reactive curing agents include polyepoxides, Michael acceptors, and polyalkenyls. Suitable curing agents can comprise two or more groups reactive with thiol groups.

Sealant compositions provided by the present disclosure can comprise a polyepoxide or a combination of polyepoxides.

Compositions provided by the present disclosure can comprise a polyepoxide curing agent. A polyepoxide refers to a compound having two or more reactive epoxy groups. A polyepoxide may include a combination of polyepoxides. A polyepoxide can be liquid at room temperature (25° C.).

Examples of suitable polyepoxides include polyepoxides such as hydantoin diepoxide, diglycidyl ethers of bisphenol-A, diglycidyl ether of bisphenol-F, novolac type epoxides such as DEN™ 438 (phenol novolac polyepoxide comprising the reaction product of epichlorohydrin and phenol-formaldehyde novolac) and DEN™ 431 (phenol novolac polyepoxide comprising the reaction product of epichlorohydrin and phenol-formaldehyde novolac), available from Dow Chemical Co certain epoxidized unsaturated, and combinations of any of the foregoing.

A polyepoxide curing agent can comprise a phenol novolac polyepoxide such as DEN® 431, a bisphenol A/epichlorohydrin derived polyepoxide such as Epon® 828, or a combination thereof. A polyepoxide curing agent can comprise a combination of a phenol novolac polyepoxide and a bisphenol A/epichlorohydrin derived polyepoxide (a bisphenol A type polyepoxide).

Other examples of suitable polyepoxide curing agents include bisphenol. A type polyepoxides, brominated bisphenol A type polyepoxides, bisphenol F type polyepoxides, biphenyl type polyepoxides, novolac type polyepoxides, alicyclic polyepoxides, naphthalene type polyepoxides, ether series or polyether series polyepoxides, oxirane ring-containing polybutadienes, silicone polyepoxide copolymers, and a combination of any of the foregoing.

Additional examples of suitable bisphenol A/epichlorohydrin derived polyepoxide include a bisphenol A type polyepoxide having a weight average molecular weight of 400 or less; a branched polyfunctional bisphenol. A type polyepoxide such as p-glycidyloxyphenyl dimethyltolyl bisphenol A diglycidyl ether, a bisphenol F type polyepoxide; a phenol novolac type polyepoxide having a weight average molecular weight of 570 or less, an alicyclic polyepoxide such as vinyl(3,4-cyclohexene)dioxide, methyl 3,4-epoxycyclohexylcarboxylate (3,4-epoxycyclohexyl), bis(3,4-epoxy-6-methylcyclohexylmethyl) adipate and 2-(3,4-epoxycyclohexyl)-5,1-spiro(3,4-epoxycyciohexyl)-m-dioxane, a biphenyl type epoxy such as 3,3',5,5'-tetramethyl-4,4'-diglycidyloxybiphenyl; a glycidyl ester type epoxy such as diglycidyl hexahydrophthalate, diglycidyl 3-methythexahydrophthalate and diglycidyl hexahydroterephthatate; a glycidylarnine type polyepoxide such as diglycidylaniline, diglycidyitohliame, triglycidyl-p-aminophenol, tetraglycidyl-m-xylene diamine, tetraglycidylbis(aminomethyl)cyclohexane; a hydantoin type polyepoxide such as 1,3-diglycidyl-5-methyl-5-ethythydantoin; and a naphthalene ring-containing polyepoxide. Also, a polyepoxide having silicone such as 1,3-bis(3-glycidoxy-propyl)-1,1,3,3-tetramethyldisiloxane may be used. Other examples of suitable polyepoxides include (poly)ethylene glycol diglycidyl ether, (poly) propylene glycol diglycidyl ether, butanediol diglycidyl ether and neopentyl glycol diglycidyl ether; and tri-epoxides such as trimethylolpropane triglycidyl ether and glycerin triglycidyl ether.

Examples of commercially available polyepoxides suitable for use in compositions provided by the present disclosure include polyglycidyl derivatives of phenolic compounds, such as those available under the trade names Epon® 828, Epon® 1001, Epon® 1009, and Epon® 1031, from Resolution Performance Products LLC; and DER® 331, DER 332, DER® 334, and DER® 542 from Dow Chemical Co. Other suitable polyepoxides include polyepoxides prepared from polyols and the like and polyglycidyl derivatives of phenol-formaldehyde novolacs, the latter of which are commercially available under the trade names DEN® 431, DEN® 438, and DEN® 439 from Dow Chemical Company. Cresol analogs are also available commercially ECN® 1235, ECN® 1273, and ECN® 1299 from Ciba Specialty Chemicals, Inc. SU-8 is a bisphenol A-type polyepoxide novolac available from Resolution Performance Products LLC. Polyglycidyl adducts of amines, aminoalcohols and polycarboxylic acids are also useful polyepoxides, including Glyamine® 135, Glyamine® 125, and Glyamine® 115 from F.I.C. Corporation, Araldite® MY-720, Araldite® MY-721, Araldite® 0500, and Araldite® 0510 from Ciba Specialty Chemicals.

A polyepoxide curing agent can comprise an epoxy-functional prepolymer. Examples of suitable epoxy-functional prepolymers include the epoxy-functional sulfur-containing polyformal prepolymers disclosed in U.S. Application Publication No. 2012/0238707 and epoxy-functional polythioether prepolymers disclosed in U.S. Pat. No. 7,671,145. In general, when used as a curing agent, an epoxy-functional prepolymer can have a molecular weight less than 2,000 Daltons, less than 1,500 Daltons, less than 1,000 Daltons, or less than 500 Daltons. Epoxy-functional sulfur-containing prepolymers may be formed, for example, by reacting a thiol-functional sulfur-containing prepolymer with a diepoxide or with an epoxy olefin.

In such curable compositions, a composition can comprise, for example, from 0.5 wt % to 20 wt % of a polyepoxide curing agent, from 1 wt % to 10 wt %, from 2 wt % to 8 wt %, from 2 wt % to 6 wt %, or from 3 wt % to 5 wt %, where wt % is based on the total weight of the curable composition.

Compositions provided by the present disclosure can comprise a combination of polyepoxides. A combination of polyepoxides can comprise polyepoxides having different polyepoxides having different functionalities or different average functionalities. For example, a combination of polyepoxides can comprise a polyepoxide having an average epoxy functionality from 2.7 to 2.9 and a polyepoxide having an epoxy functionality of 2. Polyepoxides having a higher average functionality can increase the cross-linking density of a cured polymer network, which can lead to increased tensile strength, but also can reduce the % elongation of a cured sealant. Polyepoxides having a low epoxy functionality such as around 2 can result in a cured composition that is more flexible. Because low density compositions have a high content of filler, which tends to increase the tensile strength of a cured sealant, it can be desirable to use polyepoxides or combinations of polyepoxides having an average epoxy functionality from 2.1 to 3, such as from 2.1 to 2.5, or from 2.1 to 2.3.

Examples of suitable isocyanate curing agents include toluene diisocyanate. Isocyanate curing agents are commercially available and include, for example, products under the tradenames Baydur® (Bayer MaterialScience), Desmodur® (Bayer MaterialScience), Solubond® (DSM), ECCO (ECCO), Vestanat® (Evonik), Irodur® (Huntsman), Rhodocoat™ (Perstorp), and Vanchem® (V. T. Vanderbilt). A polyisocyanate curing agent comprises isocyanate groups that are reactive with thiol groups and that are less reactive with Michael acceptor groups. Examples of useful curing agents that are reactive with amine groups include polymeric polyisocyanates, examples of which include polyisocyanates having backbone linkages chosen from urethane linkages (—NH—C(O)—O—), thiourethane linkages (—NH—C(O)—S—), thiocarbamate linkages (—NH—C(O)—O—), dithiourethane linkages (—NH—C(O)—S—), and combinations of any of the foregoing.

Thiol-terminated polythioethers or combinations of thiol-terminated polythioethers can be reacted with an alkenyl-terminated compound or mixture of alkenyl-terminated compounds in the presence of an encapsulated amine catalyst provided by the present disclosure.

Suitable polyalkenyl curing agents include, for example, polyvinyl ethers such as divinyl ethers of Formula (3), sulfur-containing polyvinyl ethers such as disclosed in PCT Publication No. WO 2018/085650.

Michael acceptor curing agents can comprise an activated alkene, such as an alkenyl group proximate to an electron-withdrawing group such as an enone, nitro, halo, nitrile, carbonyl, or nitro group. In certain embodiments, a Michael acceptor group can be selected from a vinyl ketone, a vinyl sulfone, a quinone, an enamine, a ketimine, an aldimine, and an oxazolidine.

A composition may also include any number of additional additives as appropriate for a certain application. Examples of suitable additives include plasticizers, fillers, reactive diluents, pigments, surfactants, adhesion promoters, thixotropic agents, fire retardants, masking agents, and combinations of any of the foregoing. When used, the additives may be present in a composition in an amount ranging, for example, from 0 wt % to 80 wt %, from 1 wt % to 75 wt %, from 2 wt % to 70 wt %, from 5 wt % to 60 wt %, or from 10 wt % to 40 wt %.

Compositions provided by the present disclosure may comprise one or more additional components suitable for use in aerospace sealants and the selection of suitable additional components can depend at least in part on the desired performance characteristics of the cured sealant under conditions of use.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise a plasticizer or combination of plasticizers. The plasticizer can be in addition to any plasticizer incorporated into a polyurea microcapsule.

Examples of suitable plasticizers include Jayflex™ DINP, Jayflex™ DIDP, Jayflex™ DIUP, and Jayflex™ DTDP available from Exxon Mobil. Fairad® plasticizer is available from PPG Aerospace. A plasticizer can be an α-methyl styrene homopolymer having a room temperature (25° C.) viscosity from 120 poise to 250 poise. α-Methyl styrene plasticizers are available from PPG Aerospace. Other examples of suitable plasticizers include combinations of hydrogenated terphenyls, terphenyls, and partially hydrogenated quarterphenyls and higher polyphenyls such as HB-40 available from Eastman Chemical Co.

Compositions provided by the present disclosure can comprise from 0 wt % to 4 wt %, 0.01 wt % to 3.5 wt % of a plasticizer, from 0.05 wt % to 3 wt %, from 0.1 wt % to 2.5 wt % or from 1 wt % to 3 wt % of a plasticizer, where wt % is based on the total weight of the composition. Certain compositions do not contain any plasticizer. Such composition may contain a low viscosity hydroxyl-functional polyepoxide such as, for example, Epon® 1001-B-80.

A composition provided by the present disclosure can comprise an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R independently comprises hydrogen, alkyl, cycloalkyl, or aryl, and m is 0, 1, or 2. Examples of ethylenically unsaturated silanes are disclosed in U.S. Application Publication No. 2012/0040104.

Compositions provided by the present disclosure can comprise an adhesion promoter or combination of adhesion promoters. An adhesion promoter can include a phenolic resin, a combination of phenolic resins, an organo-functional silane, a combination of organo-functional silanes, or a combination of any of the foregoing. An organosilane can be an amine-functional silane. A one or more adhesion promoter may be present, for example, in amount from 0.1 wt % to 5 wt % of a composition, less than 5 wt %, less than 2 wt %, or less than 1 wt %, based on the total weight of the composition. Examples of adhesion promoters include phenolics, such as Methylon® phenolic resin, and organosilanes, such as epoxy-, mercapto- or amino-functional silanes, such as Silquest® A-187 and Silquest® A-1100. Other useful adhesion promoters are known in the art. An adhesion promoter can include a phenolic resin adhesion promoter such as T-1601, available from PRC-DeSoto International. Suitable adhesion promoters are available, for example, from Gelest and from Momentive.

Compositions and sealants provided by the present disclosure may also contain an adhesion promoter such as sulfur-containing adhesion promoter. Useful sulfur-containing adhesion promoters are disclosed in U.S. Pat. No. 8,513,339. Such adhesion promoters comprise the reaction product of a sulfur-containing compound such as DMDO and a trifunctionalizing agent such as TAC and having at least some terminal thiol groups and some terminal mercaptosilane groups.

Compositions and sealants provided by the present disclosure can comprise a phenolic resin, an organosilane, or a combination thereof. A phenolic resin can comprise a cooked phenolic resin, an un-cooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes. Suitable phenolic resins include cooked phenolic resins.

Compositions and sealants provided by the present disclosure can comprise an adhesion promoter or combination of adhesion promoters. Adhesion promoters can be included in a composition to increase the adhesion of the polymeric matrix to organic filler, inorganic filler, and to surfaces such as titanium composite surfaces, stainless steel surfaces, compositions, aluminum, and other coated and uncoated aerospace surfaces.

An adhesion promoter can include a phenolic adhesion promoter, a combination of phenolic adhesion promoters, an organo-functional silane, a combination of organo-functional silanes, hydrolyzed silanes, a combination of hydrolyzed silanes, or a combination of any of the foregoing. An organo-functional silane can be an amine-functional silane.

Compositions provided by the present disclosure can comprise an organo-functional silane, a phenolic adhesion promoter, and a hydrolyzed organo-functional silane. Examples of suitable adhesion promoters include phenolic resins such as Methylon® phenolic resin, organo-functional silanes, such as epoxy-, mercapto- or amine-functional silanes, such as Silquest® organo-functional silanes, and hydrolyzed silanes.

Compositions and sealants provided by the present disclosure can comprise a phenolic adhesion promoter, an organo-functional silane, or a combination thereof. A phenolic adhesion promoter can comprise a cooked phenolic resin, an un-cooked phenolic resin, or a combination thereof. Phenolic adhesion promoters can comprise the reaction product of a condensation reaction of a phenolic resin with one or more thiol-terminated polysulfides. Phenolic adhesion promoters can be thiol-terminated.

Examples of suitable cooked phenolic resins include T-3920 and T-3921, available for PPG Aerospace.

Examples of suitable phenolics that can be used to provide phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin or a Thiokol® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071. Bakelite phenolic resins are available from Hexion.

Compositions provided by the present disclosure can comprise an organo-functional adhesion promoter such as an organo-functional silane. An organo-functional silane can comprise hydrolysable groups bonded to a silicon atom and at least one organo-functional group. An organo-functional silane can have the structure $R^a$—$(CH_2)_n$—$Si(-OR)_{3-n}R_n$, where $R^a$ comprises an organo-functional group, n is 0, 1, or 2, and R is alkyl such as methyl or ethyl. Examples of suitable organo-functional groups include epoxy, amino, methacryloxy, or sulfide groups. An organo-functional silane can be a dipodal organo-functional silane having two or more silane groups. An organo-functional silane can be a combination of a monosilane and a dipodal silane.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyl)trimethox- ysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethyl(aminomethyl)phenethyltrimethoxysilane and N-(2-aminoethyl)-3-aminopropyltrimethoxysilane.

Examples of suitable secondary amine-functional silanes include 3-(N-allylamino)propyltrimethoxysilane, N-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(N-ethylamino)isobutyl)methyldiethoxysilane, (3-(N-ethylamino) isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional silanes are commercially available, for example, from Gelest Inc. and from Dow Corning Corporation.

Examples of suitable amino-functional silanes include Silquest® A-187, Silquest® A-1100, and Silquest® A-1110, available from Momentive Performance Materials.

Suitable adhesion promoters also include sulfur-containing adhesion promoters such as those disclosed in U.S. Pat. Nos. 8,513,339; 8,952,124; and 9,056,949; and U.S. Application Publication No. 2014/0051789, each of which is incorporated by reference in its entirety.

Examples of suitable phenolic adhesion promoters include T-3920 and T-3921, available from PPG Aerospace.

An example of a suitable hydrolyzed silanes include T-1601 available from PPG Aerospace.

Compositions and sealants provided by the present disclosure can comprise from 0.1 wt % to 5 wt %, from 0.5 wt % to 3.5 wt %, from 0.8 wt % to 3.2 wt %, from 1.0 wt % to 4.0 wt %, from 1.0 wt % to 3.0 wt %, from 1.5 wt % to 3.0 wt %, or from 1.7 wt % to 2.8 wt %, of an adhesion promoter or combination of adhesion promoters, where wt % is based on the total weight of the composition. For example, an adhesion promoter can comprise a combination of cooked phenolics, amino-functional silanes, and hydrolyzed silanes.

Compositions provided by the present disclosure can comprise an adhesion promoter comprising a phenolic adhesion promoter or combination of phenolic adhesion promoters, and an amine-functional silane or combination of amine-functional silanes.

An adhesion promoter can comprise, for example, from 70 wt % to 95 wt % of a phenolic adhesion promoter; and from 5 wt % to 30 wt % of an amine-functional silane, where wt % is based on the total weight of the adhesion promoter in a composition.

An adhesion promoter can comprise, for example, from 75 wt % to 92 wt % of a phenolic adhesion promoter, and from 8 wt % to 25 wt % of an organo-functional silane, where wt % is based on the total weight of the adhesion promoter in a composition.

Compositions provided by the present disclosure may comprise one or more different types of filler. Suitable fillers include those commonly known in the art, including inorganic fillers, such as carbon black and calcium carbonate ($CaCO_3$), silica such as fumed silica, precipitated silica, and silica gel, polymer particles, and lightweight fillers. Suitable lightweight fillers include, for example, those described in U.S. Pat. No. 6,525,168.

Compositions of the present disclosure can comprise at least one inorganic filler. An inorganic filler can be included to provide mechanical reinforcement and to control the rheological properties of the sealant composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, and combinations of any of the foregoing. Inorganic filler can comprise a combination precipitated calcium carbonate, hydrated alumina, fumed silica, calcium hydroxide, and carbon black. Inorganic filler can improve the tensile strength of a cured composition. Compositions provided by the present disclosure can comprise from 1 wt % to 25 wt % of an inorganic filler or combination of inorganic fillers, from 5 wt % to 20 wt %, from 10 wt % to 25 wt %, from 10 wt % to 20 wt %, or from 5 wt % to 15 wt %, where wt % is based on the total weight of the composition.

Sulfur-containing polymeric particles can be used in compositions such as coating and sealant compositions having a low specific gravity. A low-density coating or sealant composition can have a low specific gravity, for example, less than 2.0, less than 1.8, less than 1.6, less than 1.4, or less than 1.2. A low-density sealant composition can be characterized by a specific gravity, for example, within a range from 1.0 to 2.0, within a range from 1.0 to 1.6, or within a range from 1.0 to 1.4, where the specific gravity is determined according to ASTM D792.

Sulfur-containing polymeric particles can be the only filler in a composition or can be combined with other filler particles. Inorganic filler is often added to a composition to enhance the tensile strength and elongation. Some or all of an inorganic filler can be replaced with sulfur-containing polymeric particles with the benefit that the composition can have a lower density and maintain high tensile strength and % elongation.

Use of sulfur-containing polymeric particles can be particularly useful in compositions having a high filler content such as a filler content greater than 20 wt %. In such compositions, a higher filler content can be used to enhance the physical properties of the cured composition, or in the case of low density filler, can be used to provide low density cured compositions. Because sulfur-containing polymeric particles have a density less than that of typical inorganic fillers, when used to replace some or all of the inorganic filler, the density of the cured composition can be reduced. Low-density sealant compositions such as sealant compositions having specific gravity less than 1 can have in addition to low density filler characterized, for example, by a specific gravity less than 0.9, a certain amount of inorganic filler such as, for example, from 5 wt % to 25 wt % of inorganic filler can be included in the composition to impart desired physical properties. In such compositions, all or some of the inorganic filler can be replaced with sulfur-containing polymeric particles. The density of such low-density sealant compositions can thereby be further reduced without degrading the physical properties and solvent resistance of the cured composition.

Examples of sealant compositions having a high filler content include non-chromate corrosion inhibiting sealants such as disclosed in U.S. Application Publication No. 2017/014259, which is incorporated by reference in its entirety. Sulfur-containing polymeric particles can be used in a composition comprising a thiol-terminated polythioether prepolymer, a polyepoxide curing agent, and a non-chromate corrosion inhibitor. In such compositions a polyepoxide curing agent can comprise an epoxy novolac resin, a bisphenol A/epichlorohydrin epoxy resin, or a combination thereof. In such compositions, a non-chromate corrosion inhibitor can comprise zinc borate, 2-benzothiazolylthiobutanedioic acid, zinc orthophosphate, sodium titanate, tricalcium phosphate, or a combination of any of the foregoing. In such compositions, a non-chromate corrosion inhibitor can comprise from 2 wt % to 6 wt % of zinc borate; from 1 wt % to 5 wt % of 2-benzothiazolylthiobutanedioic acid; from 35 wt % to 70 wt % of zinc orthophosphate; from 20 wt % to 50 wt % of sodium titanate; and from 3 wt % to 8 wt % of tricalcium phosphate, where wt % is based on the total weight of the non-chromate corrosion inhibitor.

Sulfur-containing polymeric particles may be used, for example, in compositions comprising a high loading of filler particles. For example, sulfur-containing polymeric particles may be used in compositions having a vol % loading of filler greater than 20 vol %, greater than 25 vol %, greater than 30 vol %, greater than 35 vol %, greater than 40 vol %, or greater than 45 vol %, where vol % is based on the total volume of the composition. For example, sulfur-containing polymeric particles may be used in compositions having a vol % loading within a range from 20 vol % to 50 vol %, within a range from 20 vol % to 45 vol %, within a range from 25 vol % to 45 vol %, or within a range from 25 vol % to 40 vol %, where vol % is based on the total volume of the composition.

A composition comprising sulfur-containing polymeric particles may also comprise inorganic filler particles such as silica, fumed silica, precipitated silica, silica gel, calcium carbonate, precipitated calcium carbonate, calcium hydroxide, hydrated alumina, or a combination of any of the foregoing.

A composition comprising sulfur-containing polymeric particles may also comprise organic filler particles. Suitable organic fillers can comprise thermoplastics, thermosets, or a combination thereof. Examples of suitable organic fillers include epoxies, epoxy-amides, ETFE copolymers, polyethylenes, polypropylenes, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing. Examples of suitable organic fillers include polyamides such as polyamide 6 and polyamide 12, polyimides, polyethylene, polyphenylene sulfides, and combinations of any of the foregoing.

Use of polyphenylene sulfide resin particles are disclosed, for example, in U.S. Pat. No. 9,422,451, which is incorporated by reference in its entirety.

An organic filler can include a low-density filler such as an expanded thermoplastic microcapsule and/or a modified expanded thermoplastic microcapsule. Suitable modified expanded thermoplastic microcapsules can include an exterior coating of a melamine or urea/formaldehyde resin.

A thermally expandable microcapsule refers to a hollow shell comprising a volatile material that expands at a predetermined temperature and is different than the polyurea microcapsules provided by the present disclosure. Thermally expandable thermoplastic microcapsules can have a mean initial particle size of 5 μm to 70 μm, in some cases 10 μm to 24 μm, or from 10 μm to 17 μm. The term "mean initial particle size" refers to the mean particle size (numerical weighted mean of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon or volatile halogenated hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low density microcapsules are also available from Kureha Corporation.

Low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ISO 787 (Part 10). Low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ISO 787 (Part 10).

Low-density microcapsules can be characterized by a mean particle diameter from 1 μm to 100 μm and can have a substantially spherical shape. Low-density microcapsules can be characterized, for example, by a mean particle diameter from 10 μm to 100 μm, from 10 μm to 60 μm, from 10 μm to 40 μm, or from 10 μm to 30 μm, as determined according to ASTM D1921.

Low-density filler can comprise uncoated microcapsules, coated microcapsules, or combinations thereof.

Low-density filler such as low density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low-density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 μm, less than 1 μm, or less than 0.5 μm. The melamine coating on the light weight microcapsules is believed to render the microcapsules reactive with the thiol-terminated polythioether prepolymer and/or the polyepoxide curing agent, which can enhance the fuel resistance, and render the microcapsules resistant to pressure.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel™ 3745, Cymel™ XW-3106, Cymel™ MM-100, Cymel™ 370, Cymel™ 373, Cymel™ 380, ASTRO MEL™ 601, ASTRO MEL™ 601ULF, ASTRO MEL™ 400, ASTRO MEL™ NVV-3A, Aricel PC-6A, ASTRO MEL™ CR-1, and ASTRO SET™ 90. A suitable aminoplast resin can comprise a urea-formaldehyde resin.

Fillers can also include electrically conductive filler and can be used, for example, to impart EMI/RFI shielding effectiveness and/or surface conductivity.

Suitable low-density filler particles are also disclosed, for example, in U.S. Pat. No. 8,993,691, and in U.S. Application Publication No. 2018/0215974.

Compositions provided by the present disclosure can comprise a photochromic agent. The optical properties of a photochromic agent are sensitive to the extent of cure of the composition. For example, when incorporated into a curable composition, when the composition is uncured the photochromic agent can have one color and when the composition is fully cured the photochromic agent can exhibit another color. The color or optical property can be reversible or irreversible. The optical property can be in the visual wavelength range or in another region of the electromagnetic spectrum. The photochromic agent can be used to qualitatively or quantitatively assess the extent of cure of the composition.

In addition to a polyurea encapsulated amine catalyst provided by the present disclosure, a composition can comprise a non-encapsulated catalyst. The encapsulated catalyst and the non-encapsulated catalyst can be used in combination to establish a desirable curing profile.

Compositions provided by the present disclosure may include one or more suitable non-encapsulated catalysts. A catalyst can be selected as appropriate for the curing chemistry employed. For example, when curing thiol-terminated sulfur-containing prepolymer and polyepoxides, the catalyst can be an amine catalyst. A cure catalyst may be present, for example, in an amount from 0.1 wt % to 5 wt %, based on the total weight of the composition. The cure catalyst can include the encapsulated catalyst and any additional non-encapsulated catalyst, if present. Examples of suitable amine catalysts include 1,4-diazabicyclo[2.2.2]octane (Dabco®, commercially available from Air Products) and DMP-30® (an accelerant composition including 2,4,6-tris(dimethylaminomethyl)phenol. Other examples of suitable amine catalysts include, dimethylcyclohexylamine (DMCHA), dimethylethanolamine (DMEA), bis-(2-dimethylaminoethyl) ether, N-ethylmorpholine, triethylamine, 1,8-diazabicyclo [5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

Compositions containing thiol-terminated polythioether prepolymers can be formulated as sealants.

Uncured sealant compositions provided by the present disclosure can be formulated as suitable for a particular aerospace sealant application. For example, sealant compositions can be formulated as Class A, Class B, or as Class C fuel resistant aerospace sealants.

A Class A sealant can be formulated for use at service temperatures from −65° F. (−54° C.) to 250° F. (121° C.) with intermittent excursions to 275° F. (135° F.). A Class A sealant is intended to be applied by brushing and can be used, for example, for as brush sealing fasteners in fuel tanks and other aircraft fuselage sealing applications. A Class A sealant can have an initial viscosity from 1 poise to 500 poise (0.1 Pa-sec to 50 Pa-sec).

A Class B sealant can be formulated for use at service temperatures from −65° F. to 250° F. (−54° C. to 121° C.) and is intended for fillet sealing and other aircraft fuselage sealing applications. A Class B sealant can have an initial viscosity from 4,500 poise to 20,000 poise (450 Pa-sec to 1,000 Pa-sec). A Class B sealant can be applied by extrusion, injection gun, or spatula.

A Class C sealant can be formulated for use at service temperatures from −65° F. to 250° F. (−54° C. to 121° C.) and is intended for brush and fay sealing of fuel tanks and other aircraft fuselage sealing applications. A Class C sealant can have an initial viscosity from 500 poise to 4,500 poise (50 Pa-sec to 450 Pa-sec). A Class C sealant can be applied by brush, roller, spatula, or extrusion.

Compositions, such as sealants, may be provided as multi-pack compositions, such as two-pack compositions, wherein one package comprises one or more thiol-terminated sulfur-containing prepolymers provided by the present disclosure and a second package comprises one or more polyepoxide curing agents. Additives and/or other materials may be added to either package as desired or necessary. The two packages may be combined and mixed prior to use.

Curable sealant systems of the present disclosure can be provided as two-part sealant compositions. The two-parts can be maintained separately and can be combined prior to use. A first part can comprise, for example, thiol-terminated polythioether prepolymers, filler, adhesion promoter, catalyst, and other optional additives. A second part can comprise, for example, a polyepoxide curing agent, filler, adhesion promoter, plasticizer, and other optional additives. The optional additives can include plasticizers, pigments, solvents, reactive diluents, surfactants, thixotropic agents, fire retardants, and a combination of any of the foregoing.

Compositions, such as sealants, may be provided as multi-part compositions, such as two-part compositions, wherein one part comprises one or more thiol-terminated polythioether prepolymers and a second part comprises one or more polyepoxide curing agents. Additives and/or other materials may be added to either part as desired or necessary. The two parts may be combined and mixed prior to use.

The first part and the second part can be formulated to be rendered compatible when combined such that the constituents of the base and accelerator components can intermix and be homogeneously dispersed to provide a sealant or coating composition for application to a substrate. Factors affecting the compatibility of the first and second parts include, for example, viscosity, pH, density, and temperature.

A first part can comprise, for example, from 40 wt % to 80 wt % of a thiol-terminated sulfur-containing prepolymer, from 50 wt % to 70 wt %, or from 55 wt % to 65 wt %, of a thiol-terminated sulfur-containing prepolymer, where wt % is based on the total weight of the first part.

A second part can comprise, for example, from 30 wt % to 80 wt % of a polyepoxide, from 35 wt % to 80 wt %, or from 40 wt % to 80 wt %, where wt % is based on the total weight of the second part.

The first part, the second part, or both the first and second parts can comprise polyurea encapsulated amine catalysts provided by the present disclosure.

The first part and second part can be combined at a wt % ratio within a range, for example, from 100:10 to 100:25, within a range from 100:12 to 100:23, or within a range from 100:14 to 100:21.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquids and gases. A coating can comprise a covering that is applied to the surface of a substrate to, for example, improve the properties of the substrate such as the appearance, adhesion, wettability, corrosion resistance, wear resistance, fuel resistance, and/or abrasion resistance. A sealant can be used to seal surfaces, smooth surfaces, fill gaps, seal joints, seal apertures, and other features. A potting composition can comprise a material useful in an electronic assembly to provide resistance to shock and vibration and to exclude moisture and corrosive agents. Sealant compositions provided by the present disclosure are useful, e.g., to seal parts on aerospace vehicles that can come into contact with phosphate ester hydraulic fluids such as Skydrol®.

Curable compositions provided by the present disclosure can be used as aerospace sealants or coatings, and in particular, as sealants or coatings where resistance to hydraulic fluid is desired. A sealant refers to a curable composition that has the ability when cured to resist atmospheric conditions such as moisture and temperature, for example, from 0% RH to 99% RH and from −30° C. to 50° C., and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process. Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

A composition provided by the present disclosure may be cured under ambient conditions, where ambient conditions refers to a temperature from 20° C. to 25° C., and atmospheric humidity (0% RH to 99% RH). A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

Methods provided by the present disclosure include methods of coating or sealant a part or surface of a part by applying a coating or sealant composition comprising polyurea encapsulated amine catalysts provided by the present disclosure to a part or surface of a part or surface and curing the applied coating or sealant to provide a coated or sealed part or surface. Curing can involve leaving the applied coating or sealant at ambient conditions such as 25° C. and 50% RH.

The cure profile of sealants can be controlled using polyurea encapsulated amine catalysts provided by the present disclosure. A higher amount of an acyclic diisocyanate (HPDI) compared to an alicyclic diisocyanate (IPDI) will result in a longer working time, a longer time to initial cure and a longer time to cure. The working time of a sealant can be extended from a few hours to up to about 10 days by increasing the relative amount of the acyclic diisocyanate (HDI) from 25% to 75%. By varying the relative amount of acyclic diisocyanate to alicyclic diisocyanate the time to cure (time to hardness of Shore 10A) can be adjusted from about 2 days (25% HDI) to about 10 days (75% HDI). The time to cure to a hardness of Shore 40A can be extended from about 4 days to about 18 days by increasing the HDI content from 25% to 75%.

The cure profile of a coating or sealant can be further controlled by changing the amount of polyurea encapsulated amine catalyst and/or by adding a non-encapsulated catalyst.

Furthermore, as demonstrated by the experimental results, a 9 wt % loading of a polyurea encapsulated amine catalyst does not appreciably impact the physical properties of a cured sealant such as the tensile strength and the % elongation.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; and polymers including thermoplastics and thermosets. The substrate may be cleaned and/or treated with a primer such as a corrosion resistant primer or with an adhesion promoting composition prior to application of the sealant. Compositions provided by the present disclosure may be applied to a coating on a substrate, such as an electrocoating, and organic coating, or a primer coating.

Compositions provided by the present disclosure may be applied directly onto the surface of a substrate or over an underlayer by any suitable coating process.

Furthermore, methods are provided for sealing aperture surface utilizing a composition provided by the present disclosure. These methods comprise, for example, applying a sealant provided by the present disclosure to a surface to seal a surface, and curing the sealant. A method for sealing a surface can comprise applying a sealant composition provided by the present disclosure to surfaces defining a surface and curing the sealant, to provide a sealed surface.

A composition may be cured under ambient conditions, where an ambient condition refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or, at least 50° C. A composition may be cured at room temperature, e.g., 25° C. A composition may be cured upon exposure to actinic radiation, such as ultraviolet radiation.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured sealants of the present disclosure becomes fully developed within 7 days following mixing and application of a curable composition to a surface.

A thickness of an applied composition can range, for example, from 5 mils to 25 mils (127 µm to 635 µm), from 10 mils to 20 mils (254 µm to 508 µm), from 20 mils (0.02 inches) to 0.75 inches (0.05 cm to 1.9 cm), from 0.05 inches to 0.6 inches (0.13 cm to 1.54 cm), from 0.1 inches to 0.5 inches (0.25 cm to 1.3 cm), from 0.15 inches to 0.4 inches (0.38 cm to 1.02 cm), or from 0.2 inches to 0.3 inches (0.51 cm to 0.76 cm).

Compositions containing a thiol-terminated sulfur-containing prepolymer provided by the present disclosure and a polyepoxide curing agent can cure, for example, in from 0.5 hours to 3 hours, from 1 hour to 2.5 hours, or from 1 hour to 2 hours, where time to cure refers the time after mixing the prepolymer and curing agent to the time at which the composition exhibits a hardness Shore 30A. The curing time to exhibit a hardness Shore 30A can range, for example, from 1 hour to 4 hours, from 1.5 hour to 3.5 hour, or from 2 hours to 3 hours. Shore A hardness is determined according to ASTM D2240.

Cured compositions provided by the present disclosure, such as cured sealants, exhibit properties acceptable for use in aerospace sealant applications. In general, it is desirable that sealants used in aviation and aerospace applications exhibit the following properties: peel strength greater than 20 pounds per linear inch (pli) determined according to AS 5127 § 7.4/7.5 in Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.06 MPa to 2.76 MPa); tear strength greater than 50 pounds per linear inch (pli) (8.75 N/mm); elongation between 250% and 300%; and hardness greater than 40 Durometer A. Tensile strength and % elongation are determined according to ASTM D412, tear strength according to AS 5127 § 8, and hardness is determined according to ASTM D2240. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 140° F. (60° C.) and ambient pressure in Jet Reference Fluid (JRF) Type I. Other properties, ranges, and/or thresholds may be appropriate for other sealant applications. Percent volume swell is determined according to AS 5127 § 7.4/7.5.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure can provide a cured product, such as a sealant, exhibiting a tensile elongation of at least 200% and a tensile strength of at least 200 psi (1.38 MPa) when measured in accordance with the procedure described in ASTM D412. In general, for a Class A sealant there is no tensile and elongation requirement. For a Class B sealant, as a general requirement, tensile strength is equal to or greater than 200 psi (1.38 MPa) and elongation is equal to or greater than 200%, determined according to ASTM D412. Acceptable elongation and tensile strength can be different depending on the application.

A cured sealant prepared from a composition provided by the present disclosure can meet or exceed the requirements for aerospace sealants as set forth in AMS 3277.

Apertures, surfaces, joints, fillets, fay surfaces including apertures, surfaces, fillets, joints, fay surfaces, and fasteners of vehicles such as aerospace vehicles, sealed with compositions provided by the present disclosure are also disclosed. For example, compositions provided by the present disclosure may be used to seal a surface of a part.

Compositions provided by the present disclosure can be used to seal parts exposed or potentially exposed to fluids such as solvents, hydraulic fluids, and/or fuel.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F (produced by McDonnell Douglas/Boeing and Northrop); in the Boeing 787 Dreamliner, 737, 747, 717 passenger jet aircraft, an related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

Cured sealants comprising polyurea microcapsules provided by the present disclosure can exhibit increased peel strength without decreasing the tensile strength, % elongation or % swell compared to a sealant without the polyurea microcapsules.

ASPECTS OF THE INVENTION

Aspect 1. A microcapsule comprising a polyurea shell at least partially encapsulating a core, wherein the polyurea shell comprises a reaction product of reactants comprising: a combination of polyisocyanates, wherein the combination of polyisocyanates comprises an alicyclic diisocyanate, and an acyclic diisocyanate; and a crosslinker, wherein the crosslinker comprises a polyamine.

Aspect 2. The microcapsule of aspect 1, wherein the alicyclic diisocyanate comprises isophorone diisocyanate.

Aspect 3. The microcapsule of any one of aspects 1 to 2, wherein the acyclic diisocyanate comprises hexamethylene diisocyanate.

Aspect 4. The microcapsule of any one of aspects 1 to 3, wherein the combination of polyisocyanates comprises an alicyclic diisocyanate trimer, an acyclic diisocyanate trimer, or a combination thereof.

Aspect 5. The microcapsule of aspect 4, wherein the alicyclic diisocyanate trimer comprises an isophorone diisocyanate trimer and/or the acyclic diisocyanate trimer comprises hexamethylene diisocyanate trimer.

Aspect 6. The microcapsule of aspect 1, wherein the combination of polyisocyanates comprises: isophorone diisocyanate and hexamethylene diisocyanate; and isophorone diisocyanate trimer, hexamethylene diisocyanate, or a combination thereof.

Aspect 7. The microcapsule of any one of aspects 1 to 6, wherein an equivalents ratio of the alicyclic diisocyanate to the acyclic diisocyanate is from 10:90 to 90:10.

Aspect 8. The microcapsule of any one of aspects 1 to 6, wherein an equivalents ratio of the alicyclic diisocyanate to the acyclic diisocyanate is from 25:75 to 75:25.

Aspect 9. The microcapsule of any one of aspects 1 to 8, wherein the polyamine comprises diethylenetriamine.

Aspect 10. The microcapsule of any one of aspects 1 to 9, wherein the polyurea shell further comprises a silica nanopowder, calcium carbonate, or a combination thereof, and a weight stabilizer.

Aspect 11. The microcapsule of aspect 10, wherein the silica nanopowder is characterized by a mean average diameter from 5 nm to 20 nm.

Aspect 12. The microcapsule of any one of aspects 10 or 11, wherein the silica nanopowder is characterized by a surface area from 100 $m^2$/g to 300 $m^2$/g (BET).

Aspect 13. The microcapsule of any one of aspects 10 to 12, wherein the polyurea shell comprises calcium carbonate.

Aspect 14. The microcapsule of any one of aspects 10 to 13, wherein the weight stabilizer comprises an amine weight stabilizer.

Aspect 15. The microcapsule of any one of aspects 10 to 14, wherein the weight stabilizer comprises polyethyleneimine.

Aspect 16. The microcapsule of any one of aspects 1 to 15, wherein the microcapsule comprises a core encapsulated within the polyurea shell.

Aspect 17. The microcapsule of aspect 16, wherein the core comprises a catalyst.

Aspect 18. The microcapsule of aspect 17, wherein the core comprises an amine catalyst.

Aspect 19. The microcapsule of aspect 18, wherein the core comprises N,N-dimethylcyclohexylamine.

Aspect 20. The microcapsule of any one of aspects 1 to 19, wherein the core further comprises a plasticizer.

Aspect 21. The microcapsule of aspect 20, wherein the plasticizer comprises a hydrogenated terphenyl.

Aspect 22. The microcapsule of any one of aspects 1 to 21, wherein the microcapsule has a diameter from 5 μm to 30 μm.

Aspect 23. A composition comprising the microcapsule of any one of aspects 1 to 22.

Aspect 24. An encapsulated catalyst comprising a catalyst encapsulated within the microcapsule of any one of aspects 1 to 22.

Aspect 25. The encapsulated catalyst of aspect 24, wherein the catalyst comprises an amine catalyst.

Aspect 26. The encapsulated catalyst of aspect 24, wherein the catalyst comprises N,N-dimethylcyclohexylamine.

Aspect 27. The encapsulated catalyst of any one of aspects 24 to 26, wherein the core further comprises a plasticizer encapsulated within the polyurea shell.

Aspect 28. The encapsulated catalyst of aspect 27, wherein the plasticizer comprises a combination of terphenyl, hydrogenated terphenyl, and partially hydrogenated quaterphenyls and higher polyphenyls.

Aspect 29. The encapsulated catalyst of aspect 24, wherein the catalyst comprises an amine catalyst; and the core further comprises a plasticizer encapsulated within the polyurea shell; and a weight percent ratio of the amine catalyst to the plasticizer is from 2:1 to 4:1.

Aspect 30. A composition comprising the encapsulated catalyst of any one of aspects 24 to 29.

Aspect 31. The composition of aspect 30, wherein the catalyst comprises an amine catalyst.

Aspect 32. The composition of any one of aspects 30 to 31, wherein the composition further comprises: a polythiol; and a polyfunctional compound reactive with the polythiol, wherein the polyfunctional compound comprises a polyepoxide, a polyisocyanate, a polyalkenyl, a multifunctional Michael acceptor, or combination of any of the foregoing.

Aspect 33. The composition of aspect 32, wherein, the polythiol comprises a polythiol prepolymer, a polythiol monomer, or a combination thereof; and the polyfunctional compound comprises a polyfunctional prepolymer, a polyfunctional monomer, or a combination thereof.

Aspect 34. The composition of aspect 32, wherein, the polythiol comprises a thiol-terminated sulfur-containing prepolymer; and the polyfunctional compound comprises a polyepoxide.

Aspect 35. The composition of aspect 34, wherein, the polyepoxide comprises a prepolymer, a monomer, or a combination thereof.

Aspect 36. The composition of any one of aspects 31 to 35, wherein the composition comprises from 0.5 wt % to 6 wt % of the amine catalyst, wherein wt % is based on the total weight of the composition.

Aspect 37. The composition of any one of aspects 30 to 36, wherein the composition comprises from 4 wt % to 14 wt % of the encapsulated catalyst, wherein wt % is based on is based on the total weight of the microcapsules with respect to the total weight of the composition.

Aspect 38. A cured composition prepared from the composition of any one of aspects 30 to 36.

Aspect 39. A part comprising the cured composition of aspect 38.

Aspect 40. A vehicle comprising the cured composition of aspect 38.

Aspect 41. An aerospace vehicle comprising the cured composition of aspect 38.

Aspect 42. A method of sealing a surface, comprising: applying the composition of any one of aspects 30 to 36 to a surface; and curing the applied composition to provide a sealed surface.

Aspect 43. The method of aspect 42, wherein curing takes place at a temperature from 20° C. to 25° C.

Aspect 44. A part sealed using the method of any one of aspects 42 or 43.

Aspect 45. A vehicle comprising a surface sealed using the method of any one of aspects 42 or 43.

Aspect 46. An aerospace vehicle comprising a surface sealed using the any one of method of aspects 42 or 43.

Aspect 47. A sealant system, comprising: a first part, wherein the first part comprises a polythiol; a second part, wherein the second part comprises a polyfunctional compound comprising a polyepoxide, a polyisocyanate, a polyalkenyl, a multifunctional Michael acceptor, or a combination of any of the foregoing; and wherein the first part, the second part, or both the first and second parts comprise the encapsulated catalyst of any one of aspects 24 to 29.

Aspect 48. The sealant system of aspect 47, wherein the first part and the second part are combined.

Aspect 49. A cured sealant prepared from the sealant system of any one of aspects 47 or 48.

Aspect 50. A part comprising the cured sealant of aspect 49.

Aspect 51. A vehicle comprising the cured sealant of aspect 49.

Aspect 52. An aerospace vehicle comprising the cured sealant of aspect 49.

Aspect 53. A method of making an encapsulated catalyst, comprising: mixing a solution comprising water and an emulsion stabilizer at high shear to provide a first mixture; adding a composition to the first mixture to provide a second mixture, wherein the composition comprises: a combination of polyisocyanates, wherein the combination of polyisocyanates comprises an alicyclic diisocyanate and an acyclic diisocyanate; a catalyst; and a plasticizer; mixing the second mixture at high shear; adding a crosslinker and a weight stabilizer to the mixed second mixture to provide a third mixture; mixing the third mixture at high shear to provide microcapsules comprising the catalyst encapsulated within a polyurea shell; and heating the third mixture to a temperature from 60° C. to 100° C. or mixing the third mixture with a tin catalyst to cure the polyurea shell.

Aspect 54. The method of aspect 53, wherein, the emulsion stabilizer comprises a silica nanopowder; the catalyst comprises an amine; the cross-linker comprises a polyamine; and the weight stabilizer comprises an amine weight stabilizer.

Aspect 55. An encapsulated catalyst prepared by the method of any one of aspects 53 to 54.

EXAMPLES

Embodiments provided by the present disclosure are further illustrated by reference to the following examples, which describe polyurea microcapsules, polyurea encapsulated amine catalysts, methods of synthesizing polyurea microcapsules, compositions comprising polyurea encapsulated amine catalysts, and properties of cured sealants prepared from compositions comprising the polyurea encapsulated amine catalysts. It will be apparent to those skilled in the art that many modifications, both to materials, and methods, may be practiced without departing from the scope of the disclosure.

Example 1

Synthesis of Polyurea Encapsulated Catalyst

Polyurea microcapsules encapsulating a polyamine catalyst were prepared by first adding an emulsion stabilizer (2 wt % silica nanopowder) to water and mixing at a high shear rate (1,500 rpm) to provide an mixture.

The shell diisocyanate or combination of diisocyanates, the core materials including a plasticizer (HB-40), and an amine catalyst were added to the mixture and mixed at a high shear rate (1,500 rpm). Hexamethylene diisocyanate (HDI, an acyclic diisocyanate) and isophorone diisocyanate (IPDI, an alicyclic diisocyanate) were used as the shell diisocyanates. Polyurea microcapsules were prepared with different equivalents of HDI and IPDI, such as 25% HDI/75% IPDI (25HDI/75IPDI) and 75% HDI/25% IPDI (75HDI/25IPDI).

Polycat® 8 (N,N-dimethylcyclohexylamine) was used as the amine catalyst. The amine catalyst and plasticizer were combined in a 3:1 weight ratio. The isocyanates and the core materials were first combined and mixed before adding to the mixture.

After microcapsules having a diisocyanate shell containing the amine catalyst and plasticizer were formed, an amine crosslinker (diethylenetriamine, DETA) and a weight stabilizer (polyethyleneimine, PEI) were added and mixed at a high shear rate (1,500 rpm).

The suspension was then heated at 90° C. for 16 hours, the cured polyurea microcapsules filtered from the solution, air dried, and sifted through a 75 µm sieve.

Figure 1B:
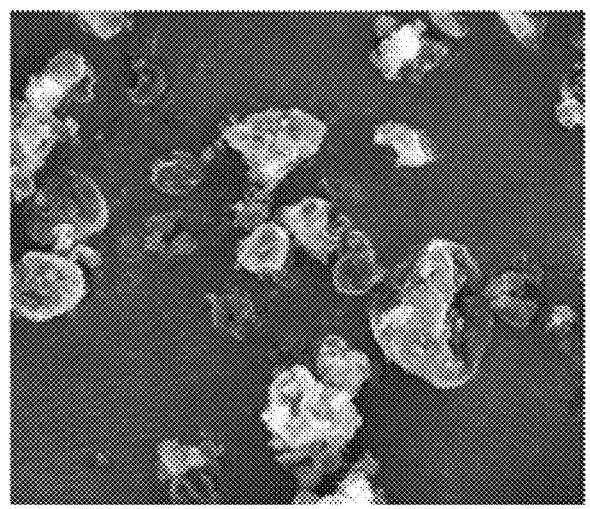

Scanning electron microscope (SEM) images of microcapsules prepared using 25HDI/75IPDI and 75HDI/25IPDI microcapsules are shown in FIGS. 1A and 1B. It is typical that 25HDI capsules appear more intact and spherical than 75HDI capsules, which appear amorphous in shape and are irregularly sized. The amine MEQ (generally 1.4-1.6 for these microcapsules) can be a predictor of batch-to-batch differences in cure time; however, amine MEQ does not explain the difference in cure time between 25HDI and 75HDI when used in a sealant. The polyurea microcapsules had a diameter from about 5 µm to about 15 µm.

Example 2

Sealants Containing Polyurea Encapsulated Catalysts

Sealants were prepared using a polythioether prepolymer epoxy-cured sealant system available from PPG Aerospace. The prepolymer-containing base component and the epoxy-containing accelerator component were combined in a 100:18 weight percent ratio. The two components were thoroughly mixed using a DAC mixer. The content of the base and accelerator components are shown in Tables 1 and 2, respectively.

TABLE 1

Base Component.

| Material | wt % |
|---|---|
| Thiol-terminated Polythioether[1] | 50.5 |
| Thiol-terminated Polythioether[2] | 11.2 |
| Phenol Resin | 0.9 |
| Tung Oil | 0.8 |
| Amorphous Silica | 0.8 |
| Calcium Carbonate | 28.1 |
| Aluminum Hydroxide | 5.6 |
| Rutile TIO$_2$ | 0.6 |

[1]Permapol ® L-1633, thiol-terminated polythioether, average thiol functionality 2.3, available from PPG Aerospace.
[2]Permapol ® L-56086, thiol-terminated polythioether, average thiol functionality 2.8, available from PPG Aerospace.

TABLE 2

Accelerator Component.

| Material | wt % |
|---|---|
| Glycidyl Epoxy | 22.7 |
| Epoxidized Novolac | 22.7 |
| Hydrogenated Terphenyl | 10.9 |
| Calcium Carbonate | 22.7 |
| Carbon Black | 0.2 |
| DI Water | 1.1 |
| Trimethoxysilane | 1.3 |
| Ferbam; Ferric dimethyldithocarbamate | 0.007 |
| Hydrogenated Terphenyl | 0.2 |
| Calcium Carbonate | 18.2 |

Dabco® 33LV (1,4-diazabicycl(2.2.2)octane solution) was used as the control catalyst at a loading 0.6 wt %, based on the total weight of the base component.

Polyurea microcapsules containing Polycat® 8 catalyst (dimethylcyclohexylamine, DMCHA) prepared according to Example 1 were added to the base component at a loading of 9 wt %, based on the total weight of the base component. The amounts are shown in Tables 5 and 6. Assuming 100% encapsulation efficiency, the theoretical loading of Polycat® 8 catalyst was from 30 wt % to 35 wt % based on the total weight of the microcapsule. This translates into a theoretical loading of Polycat® 8 in the base composition of about 2.7 wt % to 3.2 wt %, based on the total weight of the base component, and an average of 2.5 wt % based on the total weight of the sealant composition.

Example 3

Sealant Properties

Hardness measurements were made using a Shore A Durometer on cured sealant samples in plastic cups.

Tensile, elongation and thermal stability measurements were made on 0.125 inch-thick (3.175 mm) flowouts and samples for the tensile and elongation measurements were cut with an ISO 37-2 die. An Instron 3345 was used to obtain tensile and elongation measurements.

Figure 2:
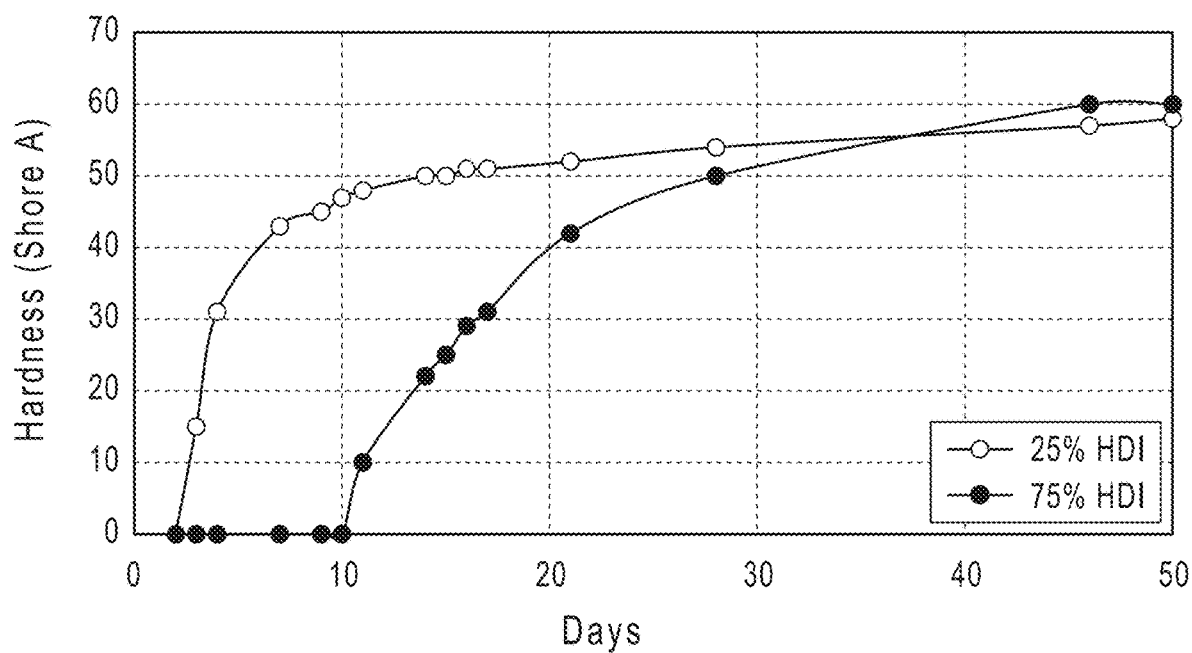
FIG. 2 shows cure profiles for sealants incorporating encapsulated amine catalysts having 25HDI/75IPDI and 75HDI/25IPDI polyurea shells provided by the present disclosure.

FIG. 2 shows the cure rate of sealants using two different ratios of HDI and IPDI; (a) 25HDI/75IPDI and (b) 75HDI/25HDI. The sealant had a loading of 9 wt % polyurea microcapsules, which corresponds to about 2.5 wt % of the amine catalyst.

Figure 3:
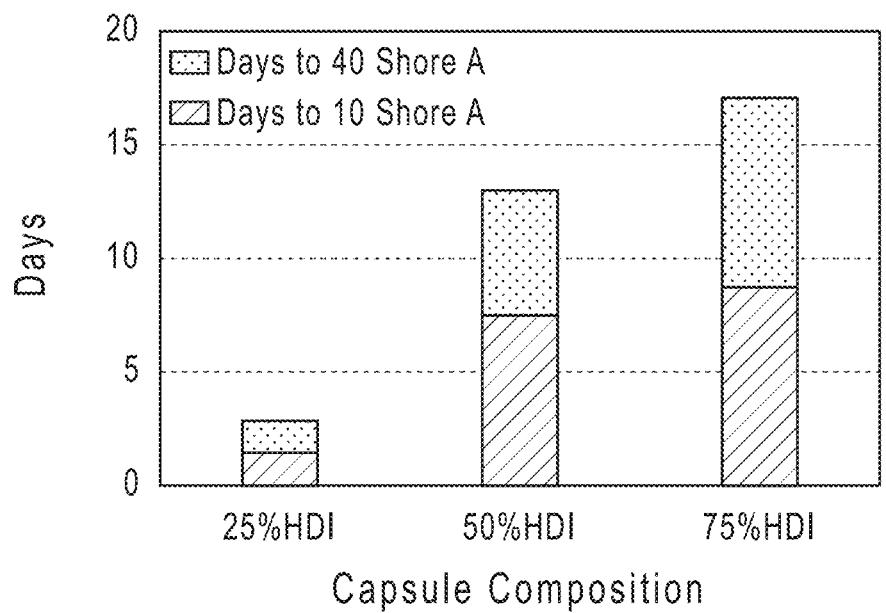
FIG. 3 shows the time to initial cure (time to reach a hardness of Shore 10A after mixing) and the time to full cure (time to hardness of Shore 40A after mixing) for sealants incorporating encapsulated catalysts having 25HDI/75IPDI, 50HDI/50IPDI, and 75HDI/25IPDI polyurea shells provided by the present disclosure.

FIG. 3 shows the average time to the start of cure (Shore 10A) and the time to the end of cure (Shore 40A) of a thiol-epoxy sealant determined for several different batches of polyurea microcapsules. The results from the 75HDI/25IPDI microcapsules align fairly well with the average results; although the 25HDI/75IPDI microcapsules cause a slightly slower cure than expected.

Figure 4:
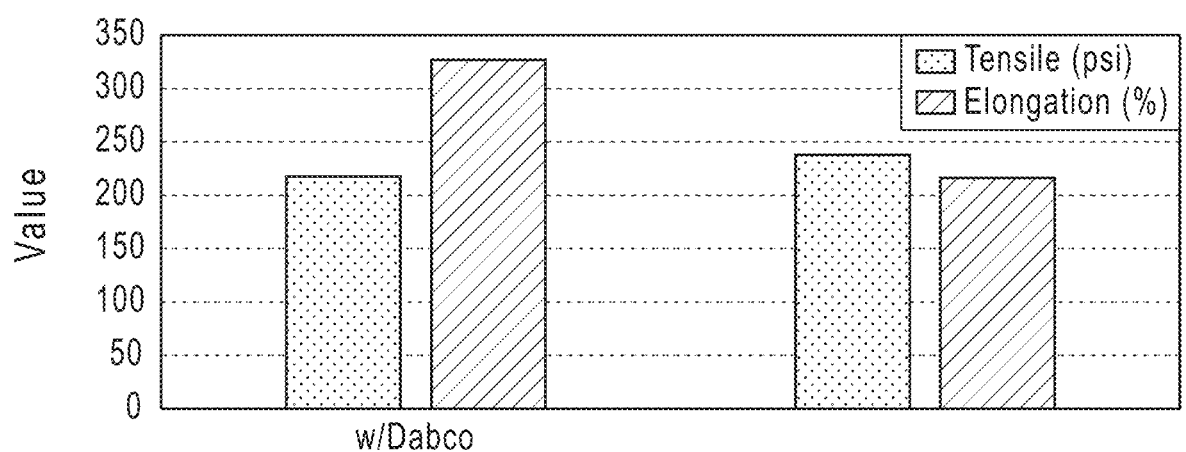
FIG. 4 shows the tensile strength (psi) and elongation (%) for a sealant having 0.6 wt % Dabco® 33LV or having 9 wt % of an encapsulated amine catalyst having a 25HDI/75IPDI polyurea shell.

Trends in tensile and elongation during cure are presented in FIG. 4. The addition of polyurea microcapsules to the thiol-epoxy sealant caused an increase in tensile strength and a decrease in elongation. The data presented in FIG. 4 is based on a particular set of samples and values should not be taken to be absolute; rather qualitatively compare properties of the inventive sample on the right hand side having 9 wt % of an encapsulated amine catalyst having a 25HDI/75IPDI polyurea shell to the control sample with 0.6 wt % Dabco® 33LV control on the left hand side. Lap shear strength obtained using an Instron according to in AS 5127 § 8 is presented in Table 3.

TABLE 3

Lap shear measurements.

| | Dabco ® 33LV | 25HDI/75IPDI | 75HDI/25IPDI |
|---|---|---|---|
| Max Stress (MPa) | 4.9 | 4.7 | 4.6 |

Example 5

Thermal Stability of Sealants

Figure 5A:
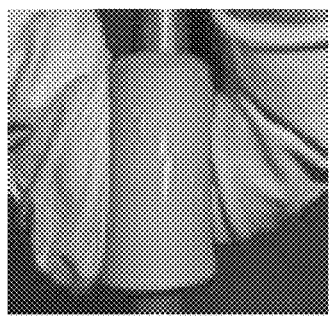
FIGS. 5A-5C show the results of a crack test for cured sealants incorporating either Dabco® 33LV (FIG. 5A), an encapsulated amine catalyst having a 25HDI/75IPDI polyurea shell (FIG. 5B), or an encapsulated amine catalyst having a 75HDI/25IPDI polyurea shell (FIG. 5C).
Figure 5B:
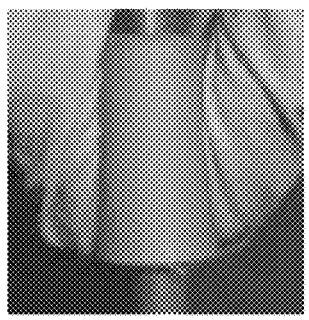
Figure 5C:
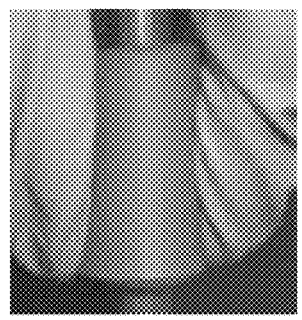

Thermal stability of the polythiol-polyepoxy-based sealant cured with polyurea microcapsules containing diethylenetriamine and HB-40 was tested by heating 0.125-inch (3.175-mm) thick samples in an oven at 300° F. (149° C.) for 48 hours and then bending those samples, once cooled, over a 0.25-inch (6.35 mm) diameter mandrel. Photographs of the sealant samples bent over the mandrels are shown in FIGS. 5A-5C. The cured sealants incorporate either Dabco® 33LV (FIG. 5A), an encapsulated amine catalyst having a 25HDI/75IPDI polyurea shell (FIG. 5B), or an encapsulated amine catalyst having a 75HDI/25IPDI polyurea shell (FIG. 5C).

Figure 6:
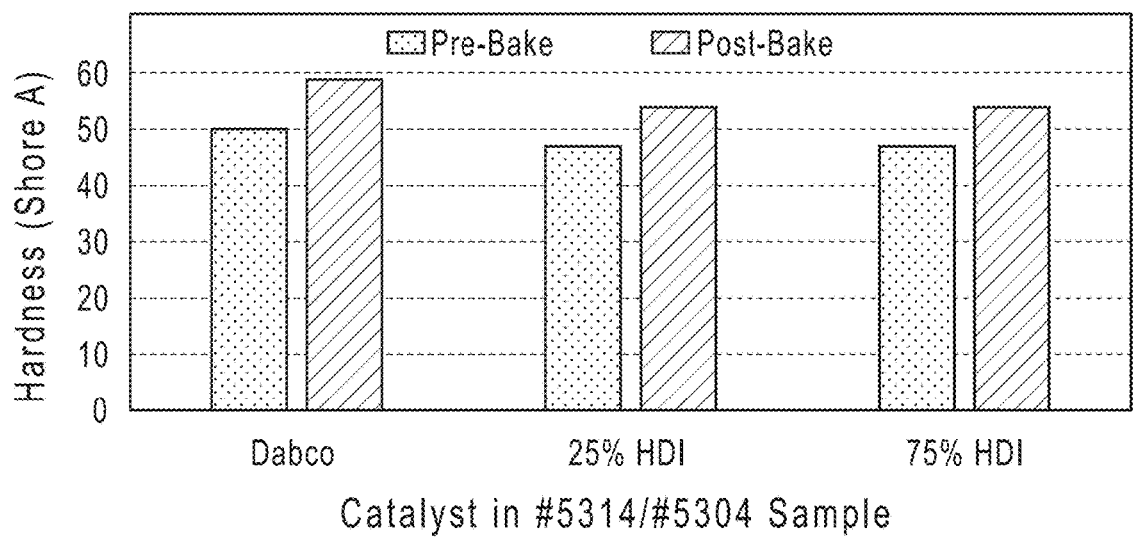
FIG. 6 shows the Shore A hardness of cured sealants incorporating either Dabco® 33LV, an encapsulated amine catalyst having a 25HDI/75IPDI polyurea shell, or an encapsulated amine catalyst having a 75HDI/25IPDI polyurea shell before and after exposure to 300° F. (149° C.) for 48 hours.

The control sample prepared with 0.6 wt % Dabco® 33LV was prone to cracking after the bake, while the experimental samples with 9% loading of microcapsules (about 2.5 wt % loading of amine catalyst) did not show signs of cracking. The change in hardness of the samples after the bake is shown in FIG. 6. The hardness of all samples increased following the bake.

Example 6

Sealant Solvent Resistance

Samples of the thiol-epoxy sealant of Example 2 were prepared for swell tests to determine fuel resistance. The experimental sample was the sealant of Example 2 (full formulation with 0.6 wt % Dabco® 33LV) with 9 wt % 25HDI/75IPDI microcapsules (about 2.5 wt % amine catalyst). In this particular set of samples, the addition of 25HDI/75 IPDI microcapsules in a sealant at a loading of 9 wt % on base pack results in a 5.6% increase in swell compared to the control sealant (Example 2 sealant with 0.6 wt % Dabco® 33LV) in 3% salt water and a 4.2% decrease in swell compared to the control sealant in JRF Type I. The % swell data is provided in Table 4.

TABLE 4

Average % swell of cured sealants.

|  | Average % Swell | |
|---|---|---|
|  | Example 2 Sealant with Dabco® 33LV | Example 2 Sealant with 25HDI/75IPDI encapsulated amine catalyst |
| 3% Salt/DI Water | 2.5 | 2.6 |
| Jet Reference Fluid Type I | 18.1 | 17.4 |

Example 7

Polyurea Encapsulant Stability

Studies were performed to determine how the stability of the polyurea microcapsules age in either the base pack or in the accelerator pack. The results are presented in FIG. 7.

Figure 7:
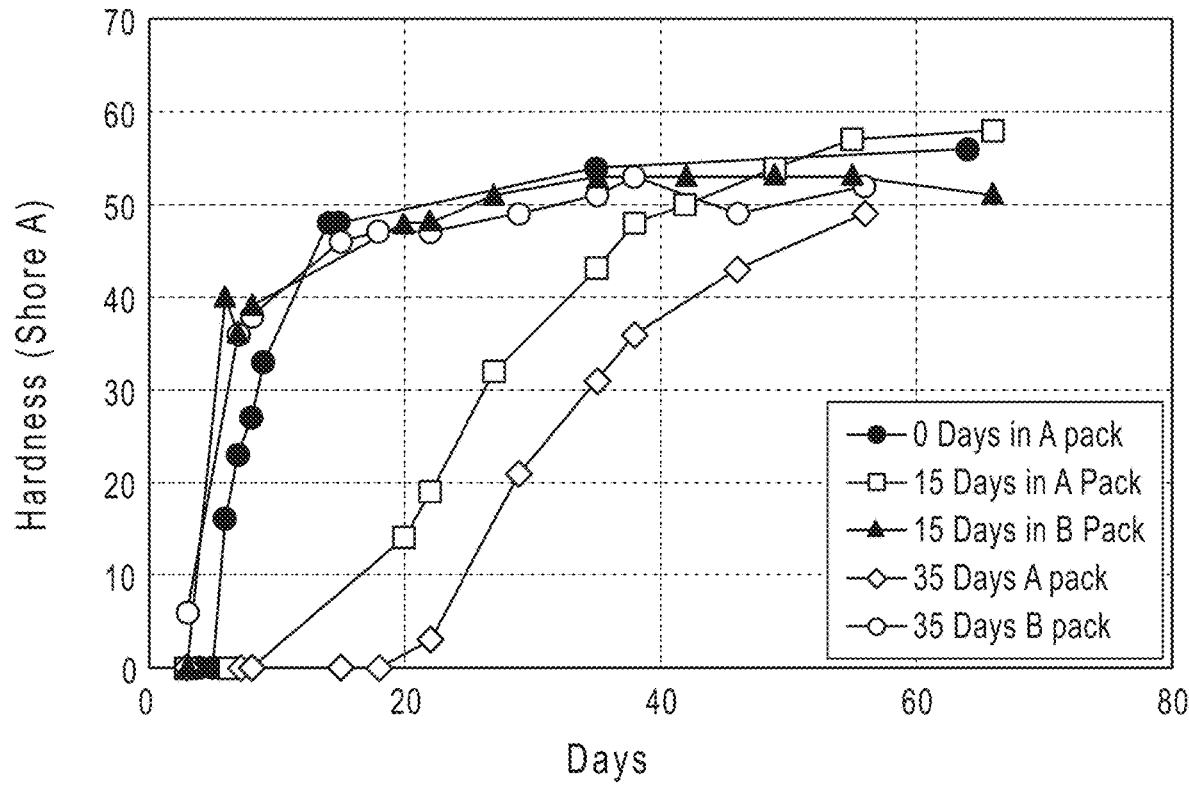
FIG. 7 shows the effects on the hardness of cured sealants using an encapsulated amine catalyst having a 25MDI/75IPDI polyurea shell aged in either the accelerator (A pack) or the base (B pack) prior to combining the accelerator and base packs to form a curable sealant.

FIG. 7 shows data in which 25HDI/75IPDI polyurea microcapsules containing the Polycat® 8 amine catalyst prepared according to Example 1 were separately stored in either the base component or the accelerator component. After 0, 15, or 30 days of storage in room temperature (25° C.), the base and the accelerator components were combined, mixed, and the hardness measured to determine the cure profiles of the sealant. When the polyurea encapsulated catalyst was stored in the base component, there was no change in the cure profile (15 days in accelerator; 35 days in accelerator) compared to a sealant in which the polyurea microcapsules were added at the time the base and accelerator components were combined (0 days in accelerator component). When the polyurea encapsulated catalyst was stored in the accelerator pack for just 15 days, the curing rate decreased and further decreased after 35 days of storage. It should be noted that adding a 9 wt % loading of the polyurea encapsulated catalyst into the accelerator component resulted in a composition having a powder/grainy consistency, which was difficult to combine with the base component. When the polyurea encapsulated catalyst was first combined with the accelerator component, the accelerator and base components may not have been homogenously mixed.

The stability of the encapsulated polyurea catalysts following exposure to elevated temperature was also evaluated. 25HDI/75IPDI polyurea microcapsules containing Polycat® 8 catalyst prepared according to Example 1 were (a) stored (as a dry powder) for 2 weeks at room temperature (25° C.), (b) stored in the base component (see Example 2) for 2 weeks at 49° C., or (c) stored in the base component (see Example 2) for 4 weeks at room temperature (25° C.).

Figure 8A:
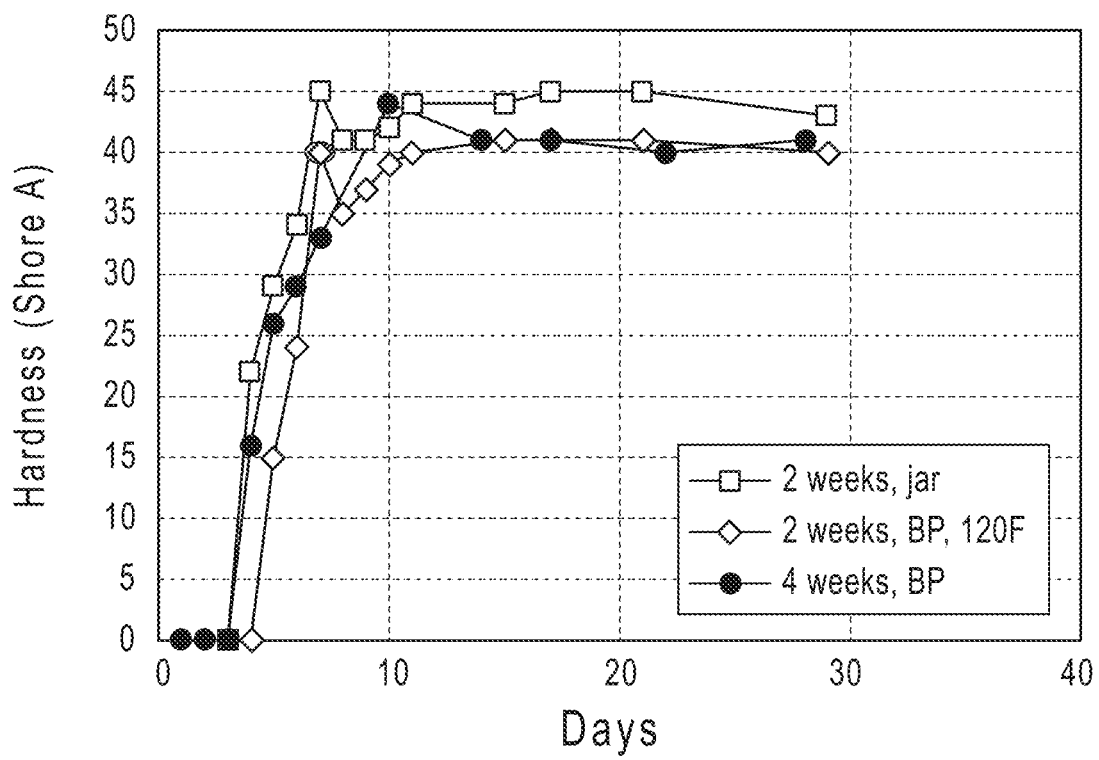
FIGS. 8A and 8B show the effects on the hardness of a cured sealant incorporating an encapsulated amine catalyst having a 25HDI/75IPDI or 75HDI/25IPDI polyurea shell aged on the shelf, aged in the base (B pack) for four weeks at 25° C., or aged in the base (B pack) for two weeks at 49° C.
Figure 8B:
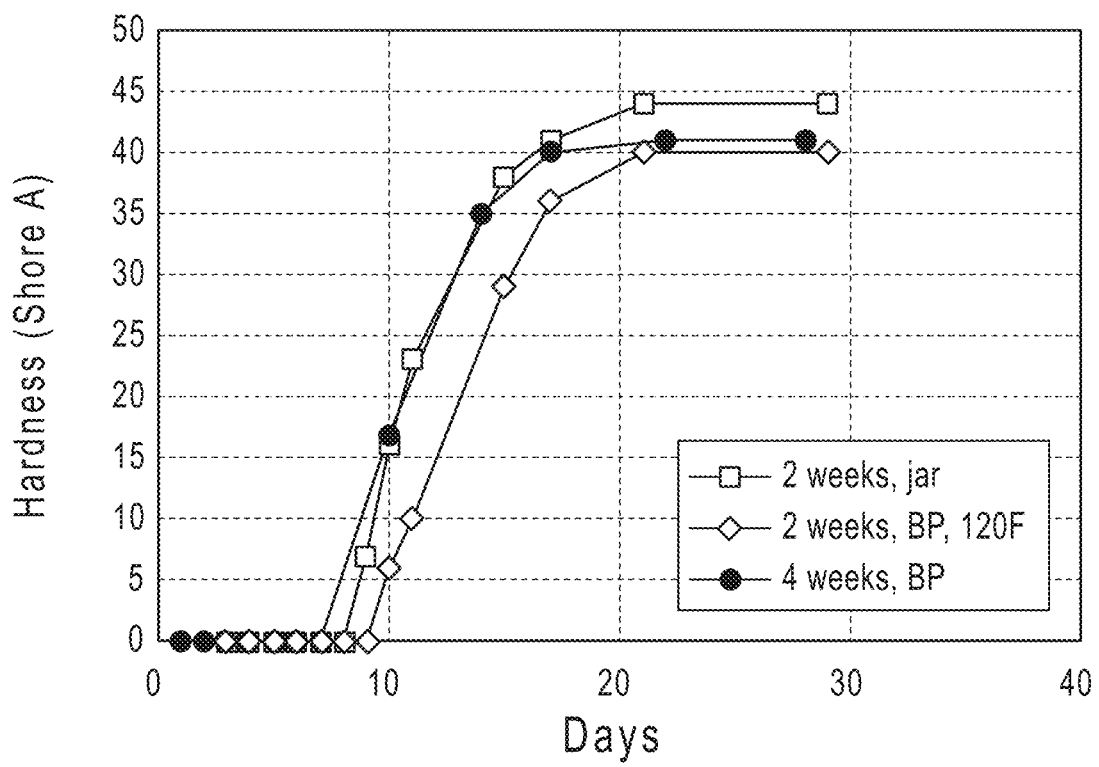

The encapsulated polyurea catalysts were then either added to the combined accelerator and base components (a) or the accelerator component and the base component containing the aged encapsulated polyurea catalyst were combined (b and c). The results are presented in FIGS. 8A and 8B. There were no significant changes in the cure of sealant after aging, although aging of the encapsulated polyurea catalyst in the base component at 49° C. for 2 weeks delayed the time to cure to a hardness of Shore 40A by a couple of days.

Example 8

Various polyurea encapsulated amine catalysts were prepared according to the method of Example 1. The constituents and amounts of constituents were changed. The weight of the constituents used to prepare various polyurea encapsulated amine catalysts is provided in FIG. 10 (Table 5).

The weight percent (based on the total weight of the polyurea encapsulated amine catalyst) of the constituents used to prepare various polyurea encapsulated amine catalysts is provided in FIG. 11 (Table 6).

In addition to isophorone diisocyanate and hexamethylene diisocyanate, encapsulated catalyst F included a dithiol. The IPDI trimer was Desmodur® Z4470 BA.

Figure 9:
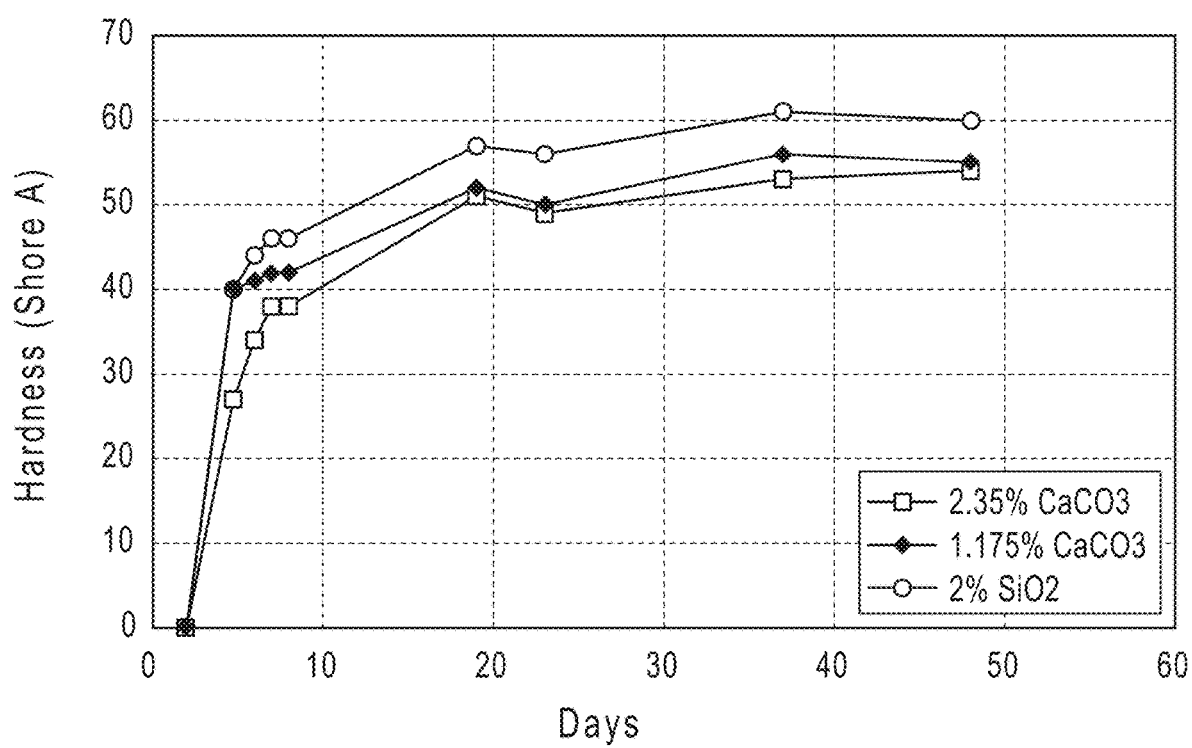
FIG. 9 shows the cure profile of sealants incorporating polyurea encapsulated amine catalysts prepared using 25HDI/75IPDI and with either silicon dioxide or calcium carbonate as the emulsion stabilizer.

For example, formulations M and N were prepared to determine the effects of replacing the $SiO_2$ nanopowder emulsion stabilizer with calcium carbonate $CaCO_3$. The silicon dioxide nanopowder or calcium carbonate was combined with 225 g distilled water (M: 2.35 wt % calcium carbonate; N: 1.175 wt % calcium carbonate). Polyurea encapsulated amine catalysts of formulation M exhibited a mean diameter of 8.9 μm (SD 1.4) and those of formulation N exhibited a mean diameter of 6.6 μm (SD 1.5). The cure rate of sealants prepared according to Example 2 using 9 wt % of the polyurea encapsulated amine catalysts of formulation M, N, and Example 1 (2 wt % $SiO_2$ in the mixture) with 25HDI/75IPDI is shown in FIG. 9.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled their full scope and equivalents thereof.

What is claimed is:

1. An encapsulated catalyst comprising a polyurea shell encapsulating a core, wherein,
    the polyurea shell comprises a reaction product of reactants comprising:
        isophorone diisocyanate;
        hexamethylene diisocyanate; and
        diethylenetriamine;
        wherein an equivalents ratio of the isophorone diisocyanate to the hexamethylene diisocyanate is from 10:90 to 90:10; and
    the core comprises:
        a catalyst, wherein the catalyst comprises an amine catalyst; and
        a plasticizer,
    wherein the catalyst diffuses from the polyurea shell at temperatures from 20° C. to 25° C.

2. A composition comprising the encapsulated catalyst of claim 1.

3. The composition of claim 2, wherein the composition further comprises:
    a thiol-terminated sulfur-containing prepolymer; and
    a polyfunctional compound reactive with the polythiol, wherein the polyfunctional compound comprises a polyepoxide, a polyisocyanate, a polyalkenyl, a multifunctional Michael acceptor, or a combination of any of the foregoing.

4. A cured composition prepared from the composition of claim 2.

5. A part comprising the cured composition of claim 4.

6. A vehicle comprising the cured composition of claim 4.

7. An aerospace vehicle comprising the cured composition of claim 4.

8. A method of sealing a surface, comprising:
    applying the composition of claim 2 to a surface; and
    curing the applied composition to provide a sealed surface.

9. A sealant system, comprising:
- a first part, wherein the first part comprises a thiol-terminated sulfur-containing prepolymer;
- a second part, wherein the second part comprises a polyfunctional compound comprising a polyepoxide, a polyisocyanate, a polyalkenyl, a multifunctional Michael acceptor, or a combination of any of the foregoing; and
- wherein the first part, the second part, or both the first and second parts comprise the encapsulated catalyst of claim 1.

10. The encapsulated catalyst of claim 1, wherein the reactants comprise a diisocyanate trimer.

11. The encapsulated catalyst of claim 1, wherein the polyurea shell further comprises a silica nanopowder, calcium carbonate, a weight stabilizer, or a combination of any of the foregoing.

12. The encapsulated catalyst of claim 1, wherein the catalyst comprises N,N-dimethylcyclohexylamine.

13. The encapsulated catalyst of claim 12, wherein the plasticizer comprises a partially hydrogenated polyphenyl.

14. The encapsulated catalyst of claim 1, wherein a wt % ratio of the catalyst to the plasticizer is from 1:1 to 5:1.

15. The encapsulated catalyst of claim 1, wherein the encapsulant comprises from 60 wt % to 90 wt % of the catalyst and from 10 wt % to 40 wt % of the plasticizer, wherein wt % is based on the total weight of the catalyst and the plasticizer.

16. The composition of claim 3, wherein the thiol-terminated sulfur-containing prepolymer comprises a thiol-terminated polythioether prepolymer, a thiol-terminated polysulfide prepolymer, a thiol-terminated monosulfide prepolymer, a thiol-terminated sulfur-containing polyformal prepolymer, or a combination of any of the foregoing.

17. The composition of claim 3, wherein the composition is formulated as an aerospace sealant.

* * * * *